United States Patent
Fu et al.

(10) Patent No.: US 12,441,781 B2
(45) Date of Patent: Oct. 14, 2025

(54) INTERLEUKIN 15 FUSION PROTEINS, AND COMPOSITIONS AND THERAPEUTIC METHODS THEREOF

(71) Applicant: IMMUNE TARGETING INC., Dallas, TX (US)

(72) Inventors: Yang-Xin Fu, Dallas, TX (US); Hua Peng, Beijing (CN); Jingya Guo, Beijing (CN)

(73) Assignee: IMMUNE TARGETING INC., Dallas, TX (US)

( * ) Notice: Subject to any disclaimer, the term of this patent is extended or adjusted under 35 U.S.C. 154(b) by 345 days.

(21) Appl. No.: 17/051,160

(22) PCT Filed: May 3, 2019

(86) PCT No.: PCT/US2019/030594
§ 371 (c)(1),
(2) Date: Oct. 27, 2020

(87) PCT Pub. No.: WO2019/213517
PCT Pub. Date: Nov. 7, 2019

(65) Prior Publication Data
US 2024/0218047 A1    Jul. 4, 2024

(30) Foreign Application Priority Data
May 4, 2018    (CN) .......................... 201810420739.6

(51) Int. Cl.
| C07K 14/715 | (2006.01) |
| A61K 38/00 | (2006.01) |
| A61P 35/00 | (2006.01) |
| C07K 14/54 | (2006.01) |
| C12N 15/62 | (2006.01) |

(52) U.S. Cl.
CPC .......... *C07K 14/7155* (2013.01); *A61P 35/00* (2018.01); *C07K 14/5443* (2013.01); *C12N 15/62* (2013.01); *A61K 38/00* (2013.01); *C07K 2319/30* (2013.01)

(58) Field of Classification Search
None
See application file for complete search history.

(56) References Cited

U.S. PATENT DOCUMENTS

| 2009/0238791 A1 | 9/2009 | Jacques |
| 2016/0318986 A1 | 11/2016 | Morisseau et al. |
| 2017/0088597 A1 | 3/2017 | Wong |
| 2018/0118805 A1* | 5/2018 | Bernett ................... A61P 35/00 |

FOREIGN PATENT DOCUMENTS

| CN | 103370339 A | 10/2013 |
| CN | 105017429 A | 11/2015 |
| CN | 106380521 A | 2/2017 |
| CN | 106457070 A | 2/2017 |
| CN | 106459219 A | 2/2017 |
| CN | 107880136 A | 4/2018 |
| JP | 2014524737 A | 9/2014 |
| WO | 2018071918 A1 | 4/2018 |

OTHER PUBLICATIONS

Mortier et al. "IL-15Ralpha chaperones IL-15 to stabledendritic cell membrane complexes that activate NK cells via trans presentation", J Exp Med. May 12, 2008;205(5):1213-25. (Year: 2008).*
Kessenbrock et al. "Matrix Metalloproteinases: Regulators of the Tumor Microenvironment", Cell. Apr. 2, 2010; 141(1): 52-67. (Year : 2010).*
Croce et al. "Immunotherapeutic applications of IL-15", Immunotherapy. Sep. 2012;4(9):957-69. (Year: 2012).*
Vartak et al. "Matrix metalloproteases: Underutilized targets for drug delivery", J Drug Target. Jan. 2007; 15(1):1-20. (Year: 2007).*
Dubois, et al. (2008) J. Immunol. 180, 4, 2099-2106.
Robinson, et al. (2017) Immunol. Lett. 190, 159-168.
CN 201810420739.6, Office Actions and Notice of Grant.
PCT/US2019/030594, Int'l Search Report & Written Opinion of ISA (2019).
EP 19796151.9, Extended European Search Report (2022).
The first office action of counterpart JP application No. 2020-560958 issued on Jan. 5, 2023.
The first search report of CN application No. 201810420739.6 issued on Sep. 24, 2020.
The supplementary search report of CN application No. 201810420739.6 issued on Jul. 14, 2021.

* cited by examiner

*Primary Examiner* — Daniel E Kolker
*Assistant Examiner* — Peter Johansen
(74) *Attorney, Agent, or Firm* — The Sun IP Law

(57) ABSTRACT

The invention provides novel fusion proteins of Interleukin 15 and prodrugs, and compositions and methods of preparation thereof, useful in treating various diseases and disorders (e.g., hyperplasia, solid tumor or hematopoietic malignancy).

21 Claims, 10 Drawing Sheets

Specification includes a Sequence Listing.

Serum Cytokine Levels after Prodrug or Super IL15 Intravenous Injection

Survival Curve after Prodrug or Super IL15 Intravenous Injection

Serum Cytokine Levels after Prodrug or Super IL15 Intraperitoneal Injection

SEQUENCE LISTING

```
<160> NUMBER OF SEQ ID NOS: 43

<210> SEQ ID NO 1
<211> LENGTH: 114
<212> TYPE: PRT
<213> ORGANISM: Mus sp.

<400> SEQUENCE: 1
```

Asn Trp Ile Asp Val Arg Tyr Asp Leu Glu Lys Ile Glu Ser Leu Ile
1               5                   10                  15

Gln Ser Ile His Ile Asp Thr Thr Leu Tyr Thr Asp Ser Asp Phe His
            20                  25                  30

Pro Ser Cys Lys Val Thr Ala Met Asn Cys Phe Leu Leu Glu Leu Gln
            35                  40                  45

Val Ile Leu His Glu Tyr Ser Asn Met Thr Leu Asn Glu Thr Val Arg
    50                  55                  60

Asn Val Leu Tyr Leu Ala Asn Ser Thr Leu Ser Ser Asn Lys Asn Val
65                  70                  75                  80

Ala Glu Ser Gly Cys Lys Glu Cys Glu Glu Leu Glu Glu Lys Thr Phe
                85                  90                  95

Thr Glu Phe Leu Gln Ser Phe Ile Arg Ile Val Gln Met Phe Ile Asn
            100                 105                 110

Thr Ser

<210> SEQ ID NO 2
<211> LENGTH: 114
<212> TYPE: PRT
<213> ORGANISM: Homo sapiens

<400> SEQUENCE: 2

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
            35                  40                  45

Val Ile Ser Leu Glu Ser Gly Asp Ala Ser Ile His Asp Thr Val Glu
    50                  55                  60

Asn Leu Ile Ile Leu Ala Asn Asn Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser

<210> SEQ ID NO 3
<211> LENGTH: 232
<212> TYPE: PRT
<213> ORGANISM: Homo sapiens

<400> SEQUENCE: 3

Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
            35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln

```
                    85                  90                  95
Asp Trp Leu Asn Gly Lys Glu Tyr Lys Cys Lys Val Ser Asn Lys Ala
                100                 105                 110
Leu Pro Ala Pro Ile Glu Lys Thr Ile Ser Lys Ala Lys Gly Gln Pro
            115                 120                 125
Arg Glu Pro Gln Val Tyr Thr Leu Pro Pro Ser Arg Asp Glu Leu Thr
        130                 135                 140
Lys Asn Gln Val Ser Leu Thr Cys Leu Val Lys Gly Phe Tyr Pro Ser
145                 150                 155                 160
Asp Ile Ala Val Glu Trp Glu Ser Asn Gly Gln Pro Glu Asn Asn Tyr
                165                 170                 175
Lys Thr Thr Pro Pro Val Leu Asp Ser Asp Gly Ser Phe Phe Leu Tyr
                180                 185                 190
Ser Lys Leu Thr Val Asp Lys Ser Arg Trp Gln Gln Gly Asn Val Phe
            195                 200                 205
Ser Cys Ser Val Met His Glu Ala Leu His Asn His Tyr Thr Gln Lys
        210                 215                 220
Ser Leu Ser Leu Ser Pro Gly Lys
225                 230

<210> SEQ ID NO 4
<211> LENGTH: 78
<212> TYPE: PRT
<213> ORGANISM: Mus sp.

<400> SEQUENCE: 4

Gly Thr Thr Cys Pro Pro Pro Val Ser Ile Glu His Ala Asp Ile Arg
1               5                   10                  15
Val Lys Asn Tyr Ser Val Asn Ser Arg Glu Arg Tyr Val Cys Asn Ser
            20                  25                  30
Gly Phe Lys Arg Lys Ala Gly Thr Ser Thr Leu Ile Glu Cys Val Ile
        35                  40                  45
Asn Lys Asn Thr Asn Val Ala His Trp Thr Thr Pro Ser Leu Lys Cys
    50                  55                  60
Ile Arg Asp Pro Ser Leu Ala His Tyr Ser Pro Val Pro Thr
65                  70                  75

<210> SEQ ID NO 5
<211> LENGTH: 77
<212> TYPE: PRT
<213> ORGANISM: Homo sapiens

<400> SEQUENCE: 5

Ile Thr Cys Pro Pro Pro Met Ser Val Glu His Ala Asp Ile Trp Val
1               5                   10                  15
Lys Ser Tyr Ser Leu Tyr Ser Arg Glu Arg Tyr Ile Cys Asn Ser Gly
            20                  25                  30
Phe Lys Arg Lys Ala Gly Thr Ser Ser Leu Thr Glu Cys Val Leu Asn
        35                  40                  45
Lys Ala Thr Asn Val Ala His Trp Thr Thr Pro Ser Leu Lys Cys Ile
    50                  55                  60
Arg Asp Pro Ala Leu Val His Gln Arg Pro Ala Pro Pro
65                  70                  75

<210> SEQ ID NO 6
<211> LENGTH: 214
<212> TYPE: PRT
```

<213> ORGANISM: Mus sp.

<400> SEQUENCE: 6

```
Ala Val Lys Asn Cys Ser His Leu Glu Cys Phe Tyr Asn Ser Arg Ala
1               5                   10                  15

Asn Val Ser Cys Met Trp Ser His Glu Glu Ala Leu Asn Val Thr Thr
            20                  25                  30

Cys His Val His Ala Lys Ser Asn Leu Arg His Trp Asn Lys Thr Cys
        35                  40                  45

Glu Leu Thr Leu Val Arg Gln Ala Ser Trp Ala Cys Asn Leu Ile Leu
    50                  55                  60

Gly Ser Phe Pro Glu Ser Gln Ser Leu Thr Ser Val Asp Leu Leu Asp
65                  70                  75                  80

Ile Asn Val Val Cys Trp Glu Glu Lys Gly Trp Arg Arg Val Lys Thr
                85                  90                  95

Cys Asp Phe His Pro Phe Asp Asn Leu Arg Leu Val Ala Pro His Ser
            100                 105                 110

Leu Gln Val Leu His Ile Asp Thr Gln Arg Cys Asn Ile Ser Trp Lys
        115                 120                 125

Val Ser Gln Val Ser His Tyr Ile Glu Pro Tyr Leu Glu Phe Glu Ala
    130                 135                 140

Arg Arg Arg Leu Leu Gly His Ser Trp Glu Asp Ala Ser Val Leu Ser
145                 150                 155                 160

Leu Lys Gln Arg Gln Gln Trp Leu Phe Leu Glu Met Leu Ile Pro Ser
                165                 170                 175

Thr Ser Tyr Glu Val Gln Val Arg Val Lys Ala Gln Arg Asn Asn Thr
            180                 185                 190

Gly Thr Trp Ser Pro Trp Ser Gln Pro Leu Thr Phe Arg Thr Arg Pro
        195                 200                 205

Ala Asp Pro Met Lys Glu
    210
```

<210> SEQ ID NO 7
<211> LENGTH: 214
<212> TYPE: PRT
<213> ORGANISM: Homo sapiens

<400> SEQUENCE: 7

```
Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
```

```
                130                 135                 140
Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr
    210

<210> SEQ ID NO 8
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Ser Gly Gly Gly Ser Gly Gly Gly Ser Gly Gly Gly Ser Gly
1               5                   10                  15

Gly Gly Gly Ser Gly Gly Gly Ser Leu Gln
            20                  25

<210> SEQ ID NO 9
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Gly Gly Gly Gly Ser
1               5

<210> SEQ ID NO 10
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Gly Gly Gly Gly Ser Pro Val Gly Leu Ile Gly Gly Gly Gly Ser
1               5                   10                  15

<210> SEQ ID NO 11
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Gly Gly Gly Gly Ser Ser Gly Ala Arg Tyr Arg Trp Leu Thr Ala Gly
1               5                   10                  15

Gly Gly Gly Ser
            20
```

<210> SEQ ID NO 12
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gly Gly Gly Gly Ser Ser Gly Arg Ile Gly Phe Leu Arg Thr Ala Gly
1               5                  10                  15

Gly Gly Gly Ser
            20

<210> SEQ ID NO 13
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Gly Gly Gly Gly Ser Ser Gly Ala Ile Gly Phe Leu Arg Thr Ala Gly
1               5                  10                  15

Gly Gly Gly Ser
            20

<210> SEQ ID NO 14
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Gly Gly Gly Gly Ser Ser Gly Arg Ala Met His Met Tyr Thr Ala Gly
1               5                  10                  15

Gly Gly Gly Ser
            20

<210> SEQ ID NO 15
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Gly Gly Gly Gly Ser Ser Gly Ala Ala Met His Met Tyr Thr Ala Gly
1               5                  10                  15

Gly Gly Gly Ser
            20

<210> SEQ ID NO 16
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

```
Gly Gly Gly Gly Ser Ser Gly Arg Ser Glu Asn Ile Arg Thr Ala Gly
1               5                   10                  15

Gly Gly Gly Ser
            20

<210> SEQ ID NO 17
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Gly Gly Gly Gly Ser Ser Gly Ala Ser Glu Asn Ile Arg Thr Ala Gly
1               5                   10                  15

Gly Gly Gly Ser
            20

<210> SEQ ID NO 18
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Gly Gly Gly Gly Ser Ser Gly Arg Pro Glu Asn Ile Arg Thr Ala Gly
1               5                   10                  15

Gly Gly Gly Ser
            20

<210> SEQ ID NO 19
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Gly Gly Gly Gly Ser Ser Gly Ala Pro Glu Asn Ile Arg Thr Ala Gly
1               5                   10                  15

Gly Gly Gly Ser
            20

<210> SEQ ID NO 20
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Gly Gly Gly Gly Ser Ser Gly Leu Ile Ser His Ser Ile Thr Ala Gly
1               5                   10                  15

Gly Gly Gly Ser
            20

<210> SEQ ID NO 21
<211> LENGTH: 20
<212> TYPE: PRT
<213> ORGANISM: Artificial Sequence
```

```
<220> FEATURE:
<223> OTHER INFORMATION: Description of Artificial Sequence: Synthetic
      peptide

<400> SEQUENCE: 21

Gly Gly Gly Gly Ser Ser Gly Asn Leu Arg Ser Lys Leu Thr Ala Gly
1               5                   10                  15

Gly Gly Gly Ser
            20

<210> SEQ ID NO 22
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Gly Gly Gly Gly Ser Ser Gly Val Phe Ser Ile Pro Leu Thr Ala Gly
1               5                   10                  15

Gly Gly Gly Ser
            20

<210> SEQ ID NO 23
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Gly Gly Gly Gly Ser Ser Gly Ile Lys Tyr His Ser Leu Thr Ala Gly
1               5                   10                  15

Gly Gly Gly Ser
            20

<210> SEQ ID NO 24
<211> LENGTH: 455
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

Gly Thr Thr Cys Pro Pro Pro Val Ser Ile Glu His Ala Asp Ile Arg
1               5                   10                  15

Val Lys Asn Tyr Ser Val Asn Ser Arg Glu Arg Tyr Val Cys Asn Ser
                20                  25                  30

Gly Phe Lys Arg Lys Ala Gly Thr Ser Thr Leu Ile Glu Cys Val Ile
            35                  40                  45

Asn Lys Asn Thr Asn Val Ala His Trp Thr Thr Pro Ser Leu Lys Cys
        50                  55                  60

Ile Arg Asp Pro Ser Leu Ala His Tyr Ser Pro Val Pro Thr Ser Gly
65                  70                  75                  80

Gly Gly Ser Gly Gly Gly Gly Ser Gly Gly Gly Gly Ser Gly Gly Gly
                85                  90                  95

Gly Ser Gly Gly Gly Ser Leu Gln Asn Trp Ile Asp Val Arg Tyr Asp
            100                 105                 110

Leu Glu Lys Ile Glu Ser Leu Ile Gln Ser Ile His Ile Asp Thr Thr
```

```
                115                 120                 125
Leu Tyr Thr Asp Ser Asp Phe His Pro Ser Cys Lys Val Thr Ala Met
130                 135                 140

Asn Cys Phe Leu Leu Glu Leu Gln Val Ile Leu His Glu Tyr Ser Asn
145                 150                 155                 160

Met Thr Leu Asn Glu Thr Val Arg Asn Val Leu Tyr Leu Ala Asn Ser
                165                 170                 175

Thr Leu Ser Ser Asn Lys Asn Val Ala Glu Ser Gly Cys Lys Glu Cys
            180                 185                 190

Glu Glu Leu Glu Glu Lys Thr Phe Thr Glu Phe Leu Gln Ser Phe Ile
        195                 200                 205

Arg Ile Val Gln Met Phe Ile Asn Thr Ser Gly Gly Gly Gly Ser Glu
210                 215                 220

Pro Lys Ser Ser Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350

Glu Pro Gln Val Tyr Thr Leu Pro Pro Ser Arg Asp Glu Leu Thr Lys
        355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
            420                 425                 430

Cys Ser Val Met His Glu Ala Leu His Asn His Tyr Thr Gln Lys Ser
        435                 440                 445

Leu Ser Leu Ser Pro Gly Lys
    450                 455

<210> SEQ ID NO 25
<211> LENGTH: 448
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Ile Thr Cys Pro Pro Pro Met Ser Val Glu His Ala Asp Ile Trp Val
1               5                   10                  15
```

-continued

```
Lys Ser Tyr Ser Leu Tyr Ser Arg Glu Arg Tyr Ile Cys Asn Ser Gly
            20                  25                  30

Phe Lys Arg Lys Ala Gly Thr Ser Ser Leu Thr Glu Cys Val Leu Asn
            35                  40                  45

Lys Ala Thr Asn Val Ala His Trp Thr Thr Pro Ser Leu Lys Cys Ile
 50                  55                  60

Arg Asp Pro Ala Leu Val His Gln Arg Pro Ala Pro Pro Gly Gly Gly
 65                  70                  75                  80

Ser Gly Gly Gly Ser Gly Gly Gly Ser Gly Gly Gly Ser
                 85                  90                  95

Gly Gly Gly Ser Leu Gln Asn Trp Val Asn Val Ile Ser Asp Leu Lys
            100                 105                 110

Lys Ile Glu Asp Leu Ile Gln Ser Met His Ile Asp Ala Thr Leu Tyr
            115                 120                 125

Thr Glu Ser Asp Val His Pro Ser Cys Lys Val Thr Ala Met Lys Cys
            130                 135                 140

Phe Leu Leu Glu Leu Gln Val Ile Ser Leu Glu Ser Gly Asp Ala Ser
145                 150                 155                 160

Ile His Asp Thr Val Glu Asn Leu Ile Ile Leu Ala Asn Asn Ser Leu
            165                 170                 175

Ser Ser Asn Gly Asn Val Thr Glu Ser Gly Cys Lys Glu Cys Glu Glu
            180                 185                 190

Leu Glu Glu Lys Asn Ile Lys Glu Phe Leu Gln Ser Phe Val His Ile
            195                 200                 205

Val Gln Met Phe Ile Asn Thr Ser Glu Pro Lys Ser Ser Asp Lys Thr
 210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
            290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
            325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
            370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
```

<210> SEQ ID NO 26
<211> LENGTH: 455
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Asn Trp Ile Asp Val Arg Tyr Asp Leu Glu Lys Ile Glu Ser Leu Ile
1               5                   10                  15

Gln Ser Ile His Ile Asp Thr Thr Leu Tyr Thr Asp Ser Asp Phe His
            20                  25                  30

Pro Ser Cys Lys Val Thr Ala Met Asn Cys Phe Leu Leu Glu Leu Gln
        35                  40                  45

Val Ile Leu His Glu Tyr Ser Asn Met Thr Leu Asn Glu Thr Val Arg
    50                  55                  60

Asn Val Leu Tyr Leu Ala Asn Ser Thr Leu Ser Ser Asn Lys Asn Val
65                  70                  75                  80

Ala Glu Ser Gly Cys Lys Glu Cys Glu Glu Leu Glu Glu Lys Thr Phe
                85                  90                  95

Thr Glu Phe Leu Gln Ser Phe Ile Arg Ile Val Gln Met Phe Ile Asn
            100                 105                 110

Thr Ser Ser Gly Gly Ser Gly Gly Gly Ser Gly Gly Gly Gly
        115                 120                 125

Ser Gly Gly Gly Gly Ser Gly Gly Ser Leu Gln Gly Thr Thr Cys
    130                 135                 140

Pro Pro Pro Val Ser Ile Glu His Ala Asp Ile Arg Val Lys Asn Tyr
145                 150                 155                 160

Ser Val Asn Ser Arg Glu Arg Tyr Val Cys Asn Ser Gly Phe Lys Arg
                165                 170                 175

Lys Ala Gly Thr Ser Thr Leu Ile Glu Cys Val Ile Asn Lys Asn Thr
            180                 185                 190

Asn Val Ala His Trp Thr Thr Pro Ser Leu Lys Cys Ile Arg Asp Pro
        195                 200                 205

Ser Leu Ala His Tyr Ser Pro Val Pro Thr Gly Gly Gly Gly Ser Glu
    210                 215                 220

Pro Lys Ser Ser Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350

```
Glu Pro Gln Val Tyr Thr Leu Pro Ser Arg Asp Glu Leu Thr Lys
            355                 360                 365

Asn Gln Val Ser Leu Thr Cys Leu Val Lys Gly Phe Tyr Pro Ser Asp
        370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
            420                 425                 430

Cys Ser Val Met His Glu Ala Leu His Asn His Tyr Thr Gln Lys Ser
            435                 440                 445

Leu Ser Leu Ser Pro Gly Lys
    450                 455

<210> SEQ ID NO 27
<211> LENGTH: 454
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
        35                  40                  45

Val Ile Ser Leu Glu Ser Gly Asp Ala Ser Ile His Asp Thr Val Glu
    50                  55                  60

Asn Leu Ile Ile Leu Ala Asn Asn Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser Ser Gly Gly Gly Ser Gly Gly Gly Ser Gly Gly Gly Gly
            115                 120                 125

Ser Gly Gly Gly Gly Ser Gly Gly Gly Ser Leu Gln Ile Thr Cys Pro
    130                 135                 140

Pro Pro Met Ser Val Glu His Ala Asp Ile Trp Val Lys Ser Tyr Ser
145                 150                 155                 160

Leu Tyr Ser Arg Glu Arg Tyr Ile Cys Asn Ser Gly Phe Lys Arg Lys
            165                 170                 175

Ala Gly Thr Ser Ser Leu Thr Glu Cys Val Leu Asn Lys Ala Thr Asn
            180                 185                 190

Val Ala His Trp Thr Thr Pro Ser Leu Lys Cys Ile Arg Asp Pro Ala
        195                 200                 205

Leu Val His Gln Arg Pro Ala Pro Gly Gly Gly Gly Ser Glu Pro
    210                 215                 220

Lys Ser Ser Asp Lys Thr His Thr Cys Pro Pro Cys Pro Ala Pro Glu
225                 230                 235                 240

Leu Leu Gly Gly Pro Ser Val Phe Leu Phe Pro Pro Lys Pro Lys Asp
                245                 250                 255
```

```
Thr Leu Met Ile Ser Arg Thr Pro Glu Val Thr Cys Val Val Asp
            260                 265                 270

Val Ser His Glu Asp Pro Glu Val Lys Phe Asn Trp Tyr Val Asp Gly
275                 280                 285

Val Glu Val His Asn Ala Lys Thr Lys Pro Arg Glu Glu Gln Tyr Asn
        290                 295                 300

Ser Thr Tyr Arg Val Val Ser Val Leu Thr Val Leu His Gln Asp Trp
305                 310                 315                 320

Leu Asn Gly Lys Glu Tyr Lys Cys Lys Val Ser Asn Lys Ala Leu Pro
                325                 330                 335

Ala Pro Ile Glu Lys Thr Ile Ser Lys Ala Lys Gly Gln Pro Arg Glu
            340                 345                 350

Pro Gln Val Tyr Thr Leu Pro Pro Ser Arg Asp Glu Leu Thr Lys Asn
        355                 360                 365

Gln Val Ser Leu Thr Cys Leu Val Lys Gly Phe Tyr Pro Ser Asp Ile
370                 375                 380

Ala Val Glu Trp Glu Ser Asn Gly Gln Pro Glu Asn Asn Tyr Lys Thr
385                 390                 395                 400

Thr Pro Pro Val Leu Asp Ser Asp Gly Ser Phe Phe Leu Tyr Ser Lys
                405                 410                 415

Leu Thr Val Asp Lys Ser Arg Trp Gln Gln Gly Asn Val Phe Ser Cys
            420                 425                 430

Ser Val Met His Glu Ala Leu His Asn His Tyr Thr Gln Lys Ser Leu
        435                 440                 445

Ser Leu Ser Pro Gly Lys
    450

<210> SEQ ID NO 28
<211> LENGTH: 684
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Ala Val Lys Asn Cys Ser His Leu Glu Cys Phe Tyr Asn Ser Arg Ala
1               5                   10                  15

Asn Val Ser Cys Met Trp Ser His Glu Glu Ala Leu Asn Val Thr Thr
            20                  25                  30

Cys His Val His Ala Lys Ser Asn Leu Arg His Trp Asn Lys Thr Cys
        35                  40                  45

Glu Leu Thr Leu Val Arg Gln Ala Ser Trp Ala Cys Asn Leu Ile Leu
    50                  55                  60

Gly Ser Phe Pro Glu Ser Gln Ser Leu Thr Ser Val Asp Leu Leu Asp
65                  70                  75                  80

Ile Asn Val Val Cys Trp Glu Glu Lys Gly Trp Arg Arg Val Lys Thr
                85                  90                  95

Cys Asp Phe His Pro Phe Asp Asn Leu Arg Leu Val Ala Pro His Ser
            100                 105                 110

Leu Gln Val Leu His Ile Asp Thr Gln Arg Cys Asn Ile Ser Trp Lys
        115                 120                 125

Val Ser Gln Val Ser His Tyr Ile Glu Pro Tyr Leu Glu Phe Glu Ala
    130                 135                 140

Arg Arg Arg Leu Leu Gly His Ser Trp Glu Asp Ala Ser Val Leu Ser
```

```
               145                 150                 155                 160
Leu Lys Gln Arg Gln Gln Trp Leu Phe Leu Glu Met Leu Ile Pro Ser
                    165                 170                 175

Thr Ser Tyr Glu Val Gln Val Arg Val Lys Ala Gln Arg Asn Asn Thr
                180                 185                 190

Gly Thr Trp Ser Pro Trp Ser Gln Pro Leu Thr Phe Arg Thr Arg Pro
            195                 200                 205

Ala Asp Pro Met Lys Glu Gly Gly Gly Ser Pro Val Gly Leu Ile
        210                 215                 220

Gly Gly Gly Gly Gly Ser Asn Trp Ile Asp Val Arg Tyr Asp Leu Glu
225                 230                 235                 240

Lys Ile Glu Ser Leu Ile Gln Ser Ile His Ile Asp Thr Thr Leu Tyr
                245                 250                 255

Thr Asp Ser Asp Phe His Pro Ser Cys Lys Val Thr Ala Met Asn Cys
            260                 265                 270

Phe Leu Leu Glu Leu Gln Val Ile Leu His Glu Tyr Ser Asn Met Thr
        275                 280                 285

Leu Asn Glu Thr Val Arg Asn Val Leu Tyr Leu Ala Asn Ser Thr Leu
    290                 295                 300

Ser Ser Asn Lys Asn Val Ala Glu Ser Gly Cys Lys Glu Cys Glu Glu
305                 310                 315                 320

Leu Glu Glu Lys Thr Phe Thr Glu Phe Leu Gln Ser Phe Ile Arg Ile
                325                 330                 335

Val Gln Met Phe Ile Asn Thr Ser Ser Gly Gly Gly Ser Gly Gly Gly
            340                 345                 350

Gly Ser Gly Gly Gly Ser Gly Gly Gly Ser Gly Gly Gly Ser
        355                 360                 365

Leu Gln Gly Thr Thr Cys Pro Pro Val Ser Ile Glu His Ala Asp
    370                 375                 380

Ile Arg Val Lys Asn Tyr Ser Val Asn Ser Arg Glu Arg Tyr Val Cys
385                 390                 395                 400

Asn Ser Gly Phe Lys Arg Lys Ala Gly Thr Ser Thr Leu Ile Glu Cys
                405                 410                 415

Val Ile Asn Lys Asn Thr Asn Val Ala His Trp Thr Thr Pro Ser Leu
            420                 425                 430

Lys Cys Ile Arg Asp Pro Ser Leu Ala His Tyr Ser Pro Val Pro Thr
        435                 440                 445

Gly Gly Gly Gly Ser Glu Pro Lys Ser Cys Asp Lys Thr His Thr Cys
450                 455                 460

Pro Pro Cys Pro Ala Pro Glu Leu Leu Gly Gly Pro Ser Val Phe Leu
465                 470                 475                 480

Phe Pro Pro Lys Pro Lys Asp Gln Leu Met Ile Ser Arg Thr Pro Glu
                485                 490                 495

Val Thr Cys Val Val Val Asp Val Ser His Glu Asp Pro Glu Val Lys
            500                 505                 510

Phe Asn Trp Tyr Val Asp Gly Val Glu Val His Asn Ala Lys Thr Lys
        515                 520                 525

Pro Arg Glu Glu Gln Tyr Asn Ser Thr Tyr Arg Val Val Ser Val Leu
    530                 535                 540

Thr Val Leu His Gln Asp Trp Leu Asn Gly Lys Glu Tyr Lys Cys Lys
545                 550                 555                 560

Val Ser Asn Lys Ala Leu Pro Ala Pro Ile Glu Lys Thr Ile Ser Lys
                565                 570                 575
```

```
Ala Lys Gly Gln Pro Arg Glu Pro Gln Val Tyr Thr Leu Pro Pro Ser
                580                 585                 590

Arg Asp Glu Leu Thr Lys Asn Gln Val Ser Leu Thr Cys Leu Val Lys
            595                 600                 605

Gly Phe Tyr Pro Ser Asp Ile Ala Val Glu Trp Glu Ser Asn Gly Gln
        610                 615                 620

Pro Glu Asn Asn Tyr Lys Thr Thr Pro Pro Val Leu Asp Ser Asp Gly
625                 630                 635                 640

Ser Phe Leu Tyr Ser Lys Leu Thr Val Asp Lys Ser Arg Trp Gln Gln
                645                 650                 655

Gly Asn Val Phe Ser Cys Ser Val Leu His Glu Ala Leu His Asn His
            660                 665                 670

Tyr Thr Gln Lys Ser Leu Ser Leu Ser Pro Gly Lys
        675                 680

<210> SEQ ID NO 29
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 29

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Gly Ala Arg Tyr
    210                 215                 220

Arg Trp Leu Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
```

```
                245                 250                 255
Ala Thr Leu Tyr Thr Glu Ser Asp Val His Pro Ser Cys Lys Val Thr
            260                 265                 270
Ala Met Lys Cys Phe Leu Leu Glu Leu Gln Val Ile Ser Leu Glu Ser
            275                 280                 285
Gly Asp Ala Ser Ile His Asp Thr Val Glu Asn Leu Ile Ile Leu Ala
            290                 295                 300
Asn Asn Ser Leu Ser Ser Asn Gly Asn Val Thr Glu Ser Gly Cys Lys
305                 310                 315                 320
Glu Cys Glu Glu Leu Glu Glu Lys Asn Ile Lys Glu Phe Leu Gln Ser
                325                 330                 335
Phe Val His Ile Val Gln Met Phe Ile Asn Thr Ser Ser Gly Gly Gly
            340                 345                 350
Ser Gly Gly Gly Gly Ser Gly Gly Gly Ser Gly Gly Gly Gly Gly Ser
            355                 360                 365
Gly Gly Gly Ser Leu Gln Ile Thr Cys Pro Pro Met Ser Val Glu
            370                 375                 380
His Ala Asp Ile Trp Val Lys Ser Tyr Ser Leu Tyr Ser Arg Glu Arg
385                 390                 395                 400
Tyr Ile Cys Asn Ser Gly Phe Lys Arg Lys Ala Gly Thr Ser Ser Leu
                405                 410                 415
Thr Glu Cys Val Leu Asn Lys Ala Thr Asn Val Ala His Trp Thr Thr
            420                 425                 430
Pro Ser Leu Lys Cys Ile Arg Asp Pro Ala Leu Val His Gln Arg Pro
            435                 440                 445
Ala Pro Pro Gly Gly Gly Ser Glu Pro Lys Ser Ser Asp Lys Thr
            450                 455                 460
His Thr Cys Pro Pro Cys Pro Ala Pro Glu Leu Gly Gly Pro Ser
465                 470                 475                 480
Val Phe Leu Phe Pro Pro Lys Pro Lys Asp Thr Leu Met Ile Ser Arg
                485                 490                 495
Thr Pro Glu Val Thr Cys Val Val Val Asp Val Ser His Glu Asp Pro
            500                 505                 510
Glu Val Lys Phe Asn Trp Tyr Val Asp Gly Val Glu Val His Asn Ala
            515                 520                 525
Lys Thr Lys Pro Arg Glu Glu Gln Tyr Asn Ser Thr Tyr Arg Val Val
            530                 535                 540
Ser Val Leu Thr Val Leu His Gln Asp Trp Leu Asn Gly Lys Glu Tyr
545                 550                 555                 560
Lys Cys Lys Val Ser Asn Lys Ala Leu Pro Ala Pro Ile Glu Lys Thr
                565                 570                 575
Ile Ser Lys Ala Lys Gly Gln Pro Arg Glu Pro Gln Val Tyr Thr Leu
            580                 585                 590
Pro Pro Ser Arg Asp Glu Leu Thr Lys Asn Gln Val Ser Leu Thr Cys
            595                 600                 605
Leu Val Lys Gly Phe Tyr Pro Ser Asp Ile Ala Val Glu Trp Glu Ser
            610                 615                 620
Asn Gly Gln Pro Glu Asn Asn Tyr Lys Thr Thr Pro Pro Val Leu Asp
625                 630                 635                 640
Ser Asp Gly Ser Phe Phe Leu Tyr Ser Lys Leu Thr Val Asp Lys Ser
                645                 650                 655
Arg Trp Gln Gln Gly Asn Val Phe Ser Cys Ser Val Met His Glu Ala
            660                 665                 670
```

Leu His Asn His Tyr Thr Gln Lys Ser Leu Ser Leu Ser Pro Gly Lys
            675                 680                 685

<210> SEQ ID NO 30
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Arg Ile Gly
    210                 215                 220

Phe Leu Arg Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly

```
            340                 345                 350
Ser Gly Gly Gly Ser Gly Gly Gly Ser Gly Gly Gly Ser
            355                 360                 365

Gly Gly Gly Ser Leu Gln Ile Thr Cys Pro Pro Met Ser Val Glu
        370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
    450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
    530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
    610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 31
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Ala Val Asn Gly Thr Ser Gln Phe Thr Cys Phe Tyr Asn Ser Arg Ala
1               5                   10                  15
```

```
Asn Ile Ser Cys Val Trp Ser Gln Asp Gly Ala Leu Gln Thr Ser
            20                  25                  30
Cys Gln Val His Ala Trp Pro Asp Arg Arg Trp Asn Gln Thr Cys
        35                  40                  45
Glu Leu Leu Pro Val Ser Gln Ala Ser Trp Ala Cys Asn Leu Ile Leu
    50                  55                  60
Gly Ala Pro Asp Ser Gln Lys Leu Thr Thr Val Asp Ile Val Thr Leu
65                  70                  75                  80
Arg Val Leu Cys Arg Glu Gly Val Arg Trp Arg Val Met Ala Ile Gln
                85                  90                  95
Asp Phe Lys Pro Phe Glu Asn Leu Arg Leu Met Ala Pro Ile Ser Leu
            100                 105                 110
Gln Val Val His Val Glu Thr His Arg Cys Asn Ile Ser Trp Glu Ile
        115                 120                 125
Ser Gln Ala Ser His Tyr Phe Glu Arg His Leu Glu Phe Glu Ala Arg
    130                 135                 140
Thr Leu Ser Pro Gly His Thr Trp Glu Ala Pro Leu Leu Thr Leu
145                 150                 155                 160
Lys Gln Lys Gln Glu Trp Ile Cys Leu Glu Thr Leu Thr Pro Asp Thr
                165                 170                 175
Gln Tyr Glu Phe Gln Val Arg Val Lys Pro Leu Gln Gly Glu Phe Thr
            180                 185                 190
Thr Trp Ser Pro Trp Ser Gln Pro Leu Ala Phe Arg Thr Lys Pro Ala
        195                 200                 205
Ala Leu Gly Lys Asp Thr Gly Gly Gly Ser Ser Gly Ala Ile Gly
    210                 215                 220
Phe Leu Arg Thr Ala Gly Gly Gly Ser Asn Trp Val Asn Val Ile
225                 230                 235                 240
Ser Asp Leu Lys Lys Ile Glu Asp Leu Ile Gln Ser Met His Ile Asp
                245                 250                 255
Ala Thr Leu Tyr Thr Glu Ser Asp Val His Pro Ser Cys Lys Val Thr
            260                 265                 270
Ala Met Lys Cys Phe Leu Leu Glu Leu Gln Val Ile Ser Leu Glu Ser
        275                 280                 285
Gly Asp Ala Ser Ile His Asp Thr Val Glu Asn Leu Ile Ile Leu Ala
    290                 295                 300
Asn Asn Ser Leu Ser Ser Asn Gly Asn Val Thr Glu Ser Gly Cys Lys
305                 310                 315                 320
Glu Cys Glu Glu Leu Glu Glu Lys Asn Ile Lys Glu Phe Leu Gln Ser
                325                 330                 335
Phe Val His Ile Val Gln Met Phe Ile Asn Thr Ser Ser Gly Gly Gly
            340                 345                 350
Ser Gly Gly Gly Gly Ser Gly Gly Gly Gly Ser Gly Gly Gly Gly Ser
        355                 360                 365
Gly Gly Gly Ser Leu Gln Ile Thr Cys Pro Pro Met Ser Val Glu
    370                 375                 380
His Ala Asp Ile Trp Val Lys Ser Tyr Ser Leu Tyr Ser Arg Glu Arg
385                 390                 395                 400
Tyr Ile Cys Asn Ser Gly Phe Lys Arg Lys Ala Gly Thr Ser Ser Leu
                405                 410                 415
Thr Glu Cys Val Leu Asn Lys Ala Thr Asn Val Ala His Trp Thr Thr
            420                 425                 430
Pro Ser Leu Lys Cys Ile Arg Asp Pro Ala Leu Val His Gln Arg Pro
```

```
                435                 440                 445
Ala Pro Pro Gly Gly Gly Ser Glu Pro Lys Ser Ser Asp Lys Thr
450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
                500                 505                 510

Glu Val Lys Phe Asn Trp Tyr Val Asp Gly Val Glu Val His Asn Ala
                515                 520                 525

Lys Thr Lys Pro Arg Glu Glu Gln Tyr Asn Ser Thr Tyr Arg Val Val
530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
                580                 585                 590

Pro Pro Ser Arg Asp Glu Leu Thr Lys Asn Gln Val Ser Leu Thr Cys
                595                 600                 605

Leu Val Lys Gly Phe Tyr Pro Ser Asp Ile Ala Val Glu Trp Glu Ser
610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
                660                 665                 670

Leu His Asn His Tyr Thr Gln Lys Ser Leu Ser Leu Ser Pro Gly Lys
                675                 680                 685

<210> SEQ ID NO 32
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
                20                  25                  30

Cys Gln Val His Ala Trp Pro Asp Arg Arg Arg Trp Asn Gln Thr Cys
                35                  40                  45

Glu Leu Leu Pro Val Ser Gln Ala Ser Trp Ala Cys Asn Leu Ile Leu
        50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
                100                 105                 110
```

-continued

```
Gln Val Val His Val Glu Thr His Arg Cys Asn Ile Ser Trp Glu Ile
            115                 120                 125

Ser Gln Ala Ser His Tyr Phe Glu Arg His Leu Glu Phe Glu Ala Arg
130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Arg Ala Met
    210                 215                 220

His Met Tyr Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Gly Ser Gly Gly Gly Ser Gly Gly Gly Gly Ser
        355                 360                 365

Gly Gly Gly Ser Leu Gln Ile Thr Cys Pro Pro Met Ser Val Glu
    370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
    450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
```

```
                530             535             540
Ser Val Leu Thr Val Leu His Gln Asp Trp Leu Asn Gly Lys Glu Tyr
545                 550             555                 560

Lys Cys Lys Val Ser Asn Lys Ala Leu Pro Ala Pro Ile Glu Lys Thr
                565             570             575

Ile Ser Lys Ala Lys Gly Gln Pro Arg Glu Pro Gln Val Tyr Thr Leu
                580             585             590

Pro Pro Ser Arg Asp Glu Leu Thr Lys Asn Gln Val Ser Leu Thr Cys
            595             600             605

Leu Val Lys Gly Phe Tyr Pro Ser Asp Ile Ala Val Glu Trp Glu Ser
            610             615             620

Asn Gly Gln Pro Glu Asn Asn Tyr Lys Thr Thr Pro Pro Val Leu Asp
625             630             635             640

Ser Asp Gly Ser Phe Phe Leu Tyr Ser Lys Leu Thr Val Asp Lys Ser
                645             650             655

Arg Trp Gln Gln Gly Asn Val Phe Ser Cys Ser Val Met His Glu Ala
                660             665             670

Leu His Asn His Tyr Thr Gln Lys Ser Leu Ser Leu Ser Pro Gly Lys
                675             680             685

<210> SEQ ID NO 33
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
                20                  25                  30

Cys Gln Val His Ala Trp Pro Asp Arg Arg Arg Trp Asn Gln Thr Cys
            35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
                100                 105                 110

Gln Val Val His Val Glu Thr His Arg Cys Asn Ile Ser Trp Glu Ile
            115                 120                 125

Ser Gln Ala Ser His Tyr Phe Glu Arg His Leu Glu Phe Glu Ala Arg
130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
                180                 185                 190

Thr Trp Ser Pro Trp Ser Gln Pro Leu Ala Phe Arg Thr Lys Pro Ala
            195                 200                 205
```

-continued

```
Ala Leu Gly Lys Asp Thr Gly Gly Gly Ser Ser Gly Ala Ala Met
210                 215                 220
His Met Tyr Thr Ala Gly Gly Gly Ser Asn Trp Val Asn Val Ile
225                 230                 235                 240
Ser Asp Leu Lys Lys Ile Glu Asp Leu Ile Gln Ser Met His Ile Asp
                    245                 250                 255
Ala Thr Leu Tyr Thr Glu Ser Asp Val His Pro Ser Cys Lys Val Thr
                260                 265                 270
Ala Met Lys Cys Phe Leu Leu Glu Leu Gln Val Ile Ser Leu Glu Ser
            275                 280                 285
Gly Asp Ala Ser Ile His Asp Thr Val Glu Asn Leu Ile Ile Leu Ala
290                 295                 300
Asn Asn Ser Leu Ser Ser Asn Gly Asn Val Thr Glu Ser Gly Cys Lys
305                 310                 315                 320
Glu Cys Glu Glu Leu Glu Glu Lys Asn Ile Lys Glu Phe Leu Gln Ser
                325                 330                 335
Phe Val His Ile Val Gln Met Phe Ile Asn Thr Ser Ser Gly Gly Gly
                340                 345                 350
Ser Gly Gly Gly Gly Ser Gly Gly Gly Gly Ser Gly Gly Gly Gly Ser
            355                 360                 365
Gly Gly Gly Ser Leu Gln Ile Thr Cys Pro Pro Met Ser Val Glu
370                 375                 380
His Ala Asp Ile Trp Val Lys Ser Tyr Ser Leu Tyr Ser Arg Glu Arg
385                 390                 395                 400
Tyr Ile Cys Asn Ser Gly Phe Lys Arg Lys Ala Gly Thr Ser Ser Leu
                405                 410                 415
Thr Glu Cys Val Leu Asn Lys Ala Thr Asn Val Ala His Trp Thr Thr
                420                 425                 430
Pro Ser Leu Lys Cys Ile Arg Asp Pro Ala Leu Val His Gln Arg Pro
                435                 440                 445
Ala Pro Pro Gly Gly Gly Ser Glu Pro Lys Ser Ser Asp Lys Thr
450                 455                 460
His Thr Cys Pro Pro Cys Pro Ala Pro Glu Leu Leu Gly Gly Pro Ser
465                 470                 475                 480
Val Phe Leu Phe Pro Pro Lys Pro Lys Asp Thr Leu Met Ile Ser Arg
                485                 490                 495
Thr Pro Glu Val Thr Cys Val Val Val Asp Val Ser His Glu Asp Pro
                500                 505                 510
Glu Val Lys Phe Asn Trp Tyr Val Asp Gly Val Glu Val His Asn Ala
            515                 520                 525
Lys Thr Lys Pro Arg Glu Glu Gln Tyr Asn Ser Thr Tyr Arg Val Val
530                 535                 540
Ser Val Leu Thr Val Leu His Gln Asp Trp Leu Asn Gly Lys Glu Tyr
545                 550                 555                 560
Lys Cys Lys Val Ser Asn Lys Ala Leu Pro Ala Pro Ile Glu Lys Thr
                565                 570                 575
Ile Ser Lys Ala Lys Gly Gln Pro Arg Glu Pro Gln Val Tyr Thr Leu
                580                 585                 590
Pro Pro Ser Arg Asp Glu Leu Thr Lys Asn Gln Val Ser Leu Thr Cys
                595                 600                 605
Leu Val Lys Gly Phe Tyr Pro Ser Asp Ile Ala Val Glu Trp Glu Ser
610                 615                 620
Asn Gly Gln Pro Glu Asn Asn Tyr Lys Thr Thr Pro Pro Val Leu Asp
```

```
                625                 630                 635                 640
Ser Asp Gly Ser Phe Phe Leu Tyr Ser Lys Leu Thr Val Asp Lys Ser
                    645                 650                 655

Arg Trp Gln Gln Gly Asn Val Phe Ser Cys Ser Val Met His Glu Ala
                    660                 665                 670

Leu His Asn His Tyr Thr Gln Lys Ser Leu Ser Leu Ser Pro Gly Lys
                    675                 680                 685

<210> SEQ ID NO 34
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
                20                  25                  30

Cys Gln Val His Ala Trp Pro Asp Arg Arg Trp Asn Gln Thr Cys
            35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Arg Ser Glu
    210                 215                 220

Asn Ile Arg Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300
```

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
            325                 330                 335

Phe Val His Ile Val Gln Met Phe Ile Asn Thr Ser Ser Gly Gly Gly
        340                 345                 350

Ser Gly Gly Gly Gly Ser Gly Gly Gly Ser Gly Gly Gly Gly Ser
    355                 360                 365

Gly Gly Gly Ser Leu Gln Ile Thr Cys Pro Pro Met Ser Val Glu
370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
            405                 410                 415

Thr Glu Cys Val Leu Asn Lys Ala Thr Asn Val Ala His Trp Thr Thr
        420                 425                 430

Pro Ser Leu Lys Cys Ile Arg Asp Pro Ala Leu Val His Gln Arg Pro
    435                 440                 445

Ala Pro Pro Gly Gly Gly Ser Glu Pro Lys Ser Ser Asp Lys Thr
450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
            485                 490                 495

Thr Pro Glu Val Thr Cys Val Val Val Asp Val Ser His Glu Asp Pro
        500                 505                 510

Glu Val Lys Phe Asn Trp Tyr Val Asp Gly Val Glu Val His Asn Ala
    515                 520                 525

Lys Thr Lys Pro Arg Glu Glu Gln Tyr Asn Ser Thr Tyr Arg Val Val
530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
            565                 570                 575

Ile Ser Lys Ala Lys Gly Gln Pro Arg Glu Pro Gln Val Tyr Thr Leu
        580                 585                 590

Pro Pro Ser Arg Asp Glu Leu Thr Lys Asn Gln Val Ser Leu Thr Cys
    595                 600                 605

Leu Val Lys Gly Phe Tyr Pro Ser Asp Ile Ala Val Glu Trp Glu Ser
610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
            645                 650                 655

Arg Trp Gln Gln Gly Asn Val Phe Ser Cys Ser Val Met His Glu Ala
        660                 665                 670

Leu His Asn His Tyr Thr Gln Lys Ser Leu Ser Leu Ser Pro Gly Lys
    675                 680                 685

<210> SEQ ID NO 35
<211> LENGTH: 688
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 35

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Ala Ser Glu
    210                 215                 220

Asn Ile Arg Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Gly Ser Gly Gly Gly Ser Gly Gly Gly Ser
        355                 360                 365

Gly Gly Gly Ser Leu Gln Ile Thr Cys Pro Pro Met Ser Val Glu
    370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
            405                 410                 415

Thr Glu Cys Val Leu Asn Lys Ala Thr Asn Val Ala His Trp Thr Thr
        420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
    450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
    530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
    610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 36
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

```
Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Arg Pro Glu
    210                 215                 220

Asn Ile Arg Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Gly Ser Gly Gly Gly Ser Gly Gly Gly Gly Ser
        355                 360                 365

Gly Gly Gly Ser Leu Gln Ile Thr Cys Pro Pro Met Ser Val Glu
    370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
    450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495
```

```
Thr Pro Glu Val Thr Cys Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Gln Tyr Asn Ser Thr Tyr Arg Val Val
    530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
    610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 37
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175
```

```
Gln Tyr Glu Phe Gln Val Arg Val Lys Pro Leu Gln Gly Glu Phe Thr
                180                 185                 190

Thr Trp Ser Pro Trp Ser Gln Pro Leu Ala Phe Arg Thr Lys Pro Ala
            195                 200                 205

Ala Leu Gly Lys Asp Thr Gly Gly Gly Ser Ser Gly Ala Pro Glu
        210                 215                 220

Asn Ile Arg Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
        290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Gly Ser Gly Gly Gly Ser Gly Gly Gly Gly Ser
        355                 360                 365

Gly Gly Gly Ser Leu Gln Ile Thr Cys Pro Pro Met Ser Val Glu
        370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
        450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
        530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590
```

```
Pro Pro Ser Arg Asp Glu Leu Thr Lys Asn Gln Val Ser Leu Thr Cys
            595                 600                 605

Leu Val Lys Gly Phe Tyr Pro Ser Asp Ile Ala Val Glu Trp Glu Ser
    610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
            675                 680                 685

<210> SEQ ID NO 38
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Leu Ile Ser
    210                 215                 220

His Ser Ile Thr Ala Gly Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270
```

```
Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
        290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Ser Gly Gly Gly Ser Gly Gly Gly Ser
        355                 360                 365

Gly Gly Gly Ser Leu Gln Ile Thr Cys Pro Pro Met Ser Val Glu
        370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
        530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
        610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685
```

<210> SEQ ID NO 39
<211> LENGTH: 688
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 39

```
Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Ser Gly Asn Leu Arg
    210                 215                 220

Ser Lys Leu Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
            260                 265                 270

Ala Met Lys Cys Phe Leu Leu Glu Leu Gln Val Ile Ser Leu Glu Ser
        275                 280                 285

Gly Asp Ala Ser Ile His Asp Thr Val Glu Asn Leu Ile Ile Leu Ala
    290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
            340                 345                 350

Ser Gly Gly Gly Gly Ser Gly Gly Gly Gly Ser Gly Gly Gly Gly Ser
        355                 360                 365
```

Gly Gly Gly Ser Leu Gln Ile Thr Cys Pro Pro Met Ser Val Glu
            370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
            420                 425                 430

Pro Ser Leu Lys Cys Ile Arg Asp Pro Ala Leu Val His Gln Arg Pro
        435                 440                 445

Ala Pro Pro Gly Gly Gly Ser Glu Pro Lys Ser Ser Asp Lys Thr
450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
            500                 505                 510

Glu Val Lys Phe Asn Trp Tyr Val Asp Gly Val Glu Val His Asn Ala
        515                 520                 525

Lys Thr Lys Pro Arg Glu Glu Gln Tyr Asn Ser Thr Tyr Arg Val Val
530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 40
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys

```
                35                  40                  45
Glu Leu Leu Pro Val Ser Gln Ala Ser Trp Ala Cys Asn Leu Ile Leu
 50                  55                  60

Gly Ala Pro Asp Ser Gln Lys Leu Thr Thr Val Asp Ile Val Thr Leu
 65                  70                  75                  80

Arg Val Leu Cys Arg Glu Gly Val Arg Trp Arg Val Met Ala Ile Gln
                 85                  90                  95

Asp Phe Lys Pro Phe Glu Asn Leu Arg Leu Met Ala Pro Ile Ser Leu
                100                 105                 110

Gln Val Val His Val Glu Thr His Arg Cys Asn Ile Ser Trp Glu Ile
            115                 120                 125

Ser Gln Ala Ser His Tyr Phe Glu Arg His Leu Glu Phe Glu Ala Arg
130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
                180                 185                 190

Thr Trp Ser Pro Trp Ser Gln Pro Leu Ala Phe Arg Thr Lys Pro Ala
            195                 200                 205

Ala Leu Gly Lys Asp Thr Gly Gly Gly Ser Ser Gly Val Phe Ser
210                 215                 220

Ile Pro Leu Thr Ala Gly Gly Gly Ser Asn Trp Val Asn Val Ile
225                 230                 235                 240

Ser Asp Leu Lys Lys Ile Glu Asp Leu Ile Gln Ser Met His Ile Asp
                245                 250                 255

Ala Thr Leu Tyr Thr Glu Ser Asp Val His Pro Ser Cys Lys Val Thr
                260                 265                 270

Ala Met Lys Cys Phe Leu Leu Glu Leu Gln Val Ile Ser Leu Glu Ser
            275                 280                 285

Gly Asp Ala Ser Ile His Asp Thr Val Glu Asn Leu Ile Ile Leu Ala
290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
                340                 345                 350

Ser Gly Gly Gly Gly Ser Gly Gly Gly Ser Gly Gly Gly Gly Ser
            355                 360                 365

Gly Gly Gly Ser Leu Gln Ile Thr Cys Pro Pro Met Ser Val Glu
370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
                420                 425                 430

Pro Ser Leu Lys Cys Ile Arg Asp Pro Ala Leu Val His Gln Arg Pro
            435                 440                 445

Ala Pro Pro Gly Gly Gly Ser Glu Pro Lys Ser Ser Asp Lys Thr
450                 455                 460
```

```
His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
            485                 490                 495

Thr Pro Glu Val Thr Cys Val Val Val Asp Val Ser His Glu Asp Pro
        500                 505                 510

Glu Val Lys Phe Asn Trp Tyr Val Asp Gly Val Glu Val His Asn Ala
            515                 520                 525

Lys Thr Lys Pro Arg Glu Glu Gln Tyr Asn Ser Thr Tyr Arg Val Val
        530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
            595                 600                 605

Leu Val Lys Gly Phe Tyr Pro Ser Asp Ile Ala Val Glu Trp Glu Ser
        610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 41
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
```

-continued

```
                130                 135                 140
Thr Leu Ser Pro Gly His Thr Trp Glu Glu Ala Pro Leu Leu Thr Leu
145                 150                 155                 160
Lys Gln Lys Gln Glu Trp Ile Cys Leu Glu Thr Leu Thr Pro Asp Thr
                165                 170                 175
Gln Tyr Glu Phe Gln Val Arg Val Lys Pro Leu Gln Gly Glu Phe Thr
            180                 185                 190
Thr Trp Ser Pro Trp Ser Gln Pro Leu Ala Phe Arg Thr Lys Pro Ala
        195                 200                 205
Ala Leu Gly Lys Asp Thr Gly Gly Gly Ser Ser Gly Ile Lys Tyr
    210                 215                 220
His Ser Leu Thr Ala Gly Gly Gly Ser Asn Trp Val Asn Val Ile
225                 230                 235                 240
Ser Asp Leu Lys Lys Ile Glu Asp Leu Ile Gln Ser Met His Ile Asp
                245                 250                 255
Ala Thr Leu Tyr Thr Glu Ser Asp Val His Pro Ser Cys Lys Val Thr
            260                 265                 270
Ala Met Lys Cys Phe Leu Leu Glu Leu Gln Val Ile Ser Leu Glu Ser
        275                 280                 285
Gly Asp Ala Ser Ile His Asp Thr Val Glu Asn Leu Ile Ile Leu Ala
    290                 295                 300
Asn Asn Ser Leu Ser Ser Asn Gly Asn Val Thr Glu Ser Gly Cys Lys
305                 310                 315                 320
Glu Cys Glu Glu Leu Glu Glu Lys Asn Ile Lys Glu Phe Leu Gln Ser
                325                 330                 335
Phe Val His Ile Val Gln Met Phe Ile Asn Thr Ser Ser Gly Gly Gly
            340                 345                 350
Ser Gly Gly Gly Ser Gly Gly Gly Ser Gly Gly Gly Ser
        355                 360                 365
Gly Gly Gly Ser Leu Gln Ile Thr Cys Pro Pro Met Ser Val Glu
    370                 375                 380
His Ala Asp Ile Trp Val Lys Ser Tyr Ser Leu Tyr Ser Arg Glu Arg
385                 390                 395                 400
Tyr Ile Cys Asn Ser Gly Phe Lys Arg Lys Ala Gly Thr Ser Ser Leu
                405                 410                 415
Thr Glu Cys Val Leu Asn Lys Ala Thr Asn Val Ala His Trp Thr Thr
            420                 425                 430
Pro Ser Leu Lys Cys Ile Arg Asp Pro Ala Leu Val His Gln Arg Pro
        435                 440                 445
Ala Pro Pro Gly Gly Gly Ser Glu Pro Lys Ser Ser Asp Lys Thr
    450                 455                 460
His Thr Cys Pro Pro Cys Pro Ala Pro Glu Leu Leu Gly Gly Pro Ser
465                 470                 475                 480
Val Phe Leu Phe Pro Pro Lys Pro Lys Asp Thr Leu Met Ile Ser Arg
                485                 490                 495
Thr Pro Glu Val Thr Cys Val Val Val Asp Val Ser His Glu Asp Pro
            500                 505                 510
Glu Val Lys Phe Asn Trp Tyr Val Asp Gly Val Glu Val His Asn Ala
        515                 520                 525
Lys Thr Lys Pro Arg Glu Glu Gln Tyr Asn Ser Thr Tyr Arg Val Val
    530                 535                 540
Ser Val Leu Thr Val Leu His Gln Asp Trp Leu Asn Gly Lys Glu Tyr
545                 550                 555                 560
```

```
Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
    610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655

Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 42
<211> LENGTH: 688
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
        35                  40                  45

Glu Leu Leu Pro Val Ser Gln Ala Ser Trp Ala Cys Asn Leu Ile Leu
    50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
                85                  90                  95

Asp Phe Lys Pro Phe Glu Asn Leu Arg Leu Met Ala Pro Ile Ser Leu
            100                 105                 110

Gln Val Val His Val Glu Thr His Arg Cys Asn Ile Ser Trp Glu Ile
        115                 120                 125

Ser Gln Ala Ser His Tyr Phe Glu Arg His Leu Glu Phe Glu Ala Arg
    130                 135                 140

Thr Leu Ser Pro Gly His Thr Trp Glu Glu Ala Pro Leu Leu Thr Leu
145                 150                 155                 160

Lys Gln Lys Gln Glu Trp Ile Cys Leu Glu Thr Leu Thr Pro Asp Thr
                165                 170                 175

Gln Tyr Glu Phe Gln Val Arg Val Lys Pro Leu Gln Gly Glu Phe Thr
            180                 185                 190

Thr Trp Ser Pro Trp Ser Gln Pro Leu Ala Phe Arg Thr Lys Pro Ala
        195                 200                 205

Ala Leu Gly Lys Asp Thr Gly Gly Gly Ser Gly Gly Gly Ser
    210                 215                 220

Gly Gly Gly Gly Ser Gly Gly Gly Gly Ser Asn Trp Val Asn Val Ile
```

```
                225                 230                 235                 240
Ser Asp Leu Lys Lys Ile Glu Asp Leu Ile Gln Ser Met His Ile Asp
                    245                 250                 255

Ala Thr Leu Tyr Thr Glu Ser Asp Val His Pro Ser Cys Lys Val Thr
                260                 265                 270

Ala Met Lys Cys Phe Leu Leu Glu Leu Gln Val Ile Ser Leu Glu Ser
            275                 280                 285

Gly Asp Ala Ser Ile His Asp Thr Val Glu Asn Leu Ile Ile Leu Ala
        290                 295                 300

Asn Asn Ser Leu Ser Ser Asn Gly Asn Val Thr Glu Ser Gly Cys Lys
305                 310                 315                 320

Glu Cys Glu Glu Leu Glu Glu Lys Asn Ile Lys Glu Phe Leu Gln Ser
                325                 330                 335

Phe Val His Ile Val Gln Met Phe Ile Asn Thr Ser Ser Gly Gly Gly
                340                 345                 350

Ser Gly Gly Gly Gly Ser Gly Gly Gly Ser Gly Gly Gly Gly Ser
            355                 360                 365

Gly Gly Gly Ser Leu Gln Ile Thr Cys Pro Pro Met Ser Val Glu
        370                 375                 380

His Ala Asp Ile Trp Val Lys Ser Tyr Ser Leu Tyr Ser Arg Glu Arg
385                 390                 395                 400

Tyr Ile Cys Asn Ser Gly Phe Lys Arg Lys Ala Gly Thr Ser Ser Leu
                405                 410                 415

Thr Glu Cys Val Leu Asn Lys Ala Thr Asn Val Ala His Trp Thr Thr
                420                 425                 430

Pro Ser Leu Lys Cys Ile Arg Asp Pro Ala Leu Val His Gln Arg Pro
            435                 440                 445

Ala Pro Pro Gly Gly Gly Ser Glu Pro Lys Ser Ser Asp Lys Thr
        450                 455                 460

His Thr Cys Pro Pro Cys Pro Ala Pro Glu Leu Leu Gly Gly Pro Ser
465                 470                 475                 480

Val Phe Leu Phe Pro Pro Lys Pro Lys Asp Thr Leu Met Ile Ser Arg
                485                 490                 495

Thr Pro Glu Val Thr Cys Val Val Val Asp Val Ser His Glu Asp Pro
                500                 505                 510

Glu Val Lys Phe Asn Trp Tyr Val Asp Gly Val Glu Val His Asn Ala
            515                 520                 525

Lys Thr Lys Pro Arg Glu Glu Gln Tyr Asn Ser Thr Tyr Arg Val Val
        530                 535                 540

Ser Val Leu Thr Val Leu His Gln Asp Trp Leu Asn Gly Lys Glu Tyr
545                 550                 555                 560

Lys Cys Lys Val Ser Asn Lys Ala Leu Pro Ala Pro Ile Glu Lys Thr
                565                 570                 575

Ile Ser Lys Ala Lys Gly Gln Pro Arg Glu Pro Gln Val Tyr Thr Leu
            580                 585                 590

Pro Pro Ser Arg Asp Glu Leu Thr Lys Asn Gln Val Ser Leu Thr Cys
        595                 600                 605

Leu Val Lys Gly Phe Tyr Pro Ser Asp Ile Ala Val Glu Trp Glu Ser
        610                 615                 620

Asn Gly Gln Pro Glu Asn Asn Tyr Lys Thr Thr Pro Pro Val Leu Asp
625                 630                 635                 640

Ser Asp Gly Ser Phe Phe Leu Tyr Ser Lys Leu Thr Val Asp Lys Ser
                645                 650                 655
```

```
Arg Trp Gln Gln Gly Asn Val Phe Ser Cys Ser Val Met His Glu Ala
            660                 665                 670

Leu His Asn His Tyr Thr Gln Lys Ser Leu Ser Leu Ser Pro Gly Lys
        675                 680                 685

<210> SEQ ID NO 43
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Gly Gly Gly Ser
1
```

INTERLEUKIN 15 FUSION PROTEINS, AND COMPOSITIONS AND THERAPEUTIC METHODS THEREOF

SEQUENCE LISTING

The instant application contains a Sequence Listing which has been submitted electronically in ASCII format and is hereby incorporated by reference in its entirety. Said ASCII copy, created on Feb. 23, 2021, is named ITI-002US_SL.txt and is 120,908 bytes in size.

PRIORITY CLAIMS AND RELATED APPLICATIONS

This application claims the benefit to Chinese Application No. 201810420739.6, filed May 4, 2018, the entire content of which is incorporated herein by reference for all purposes.

TECHNICAL FIELD OF THE INVENTION

The invention generally relates to novel fusion proteins and therapeutic uses thereof. More particularly, the invention provides novel fusion proteins of Interleukin 15 and prodrugs, and compositions and methods of preparation thereof, useful in treating various diseases and disorders (e.g., hyperplasia, solid tumor or hematopoietic malignancy).

BACKGROUND OF THE INVENTION

Interleukin 15 (IL15), a 14-15 kDa glycoprotein, is a soluble cytokine that was first discovered in 1994. (Grabstein et al. 1994 *Science* 264:965-8.) Similar to Interleukin 2, IL15 belongs to the family of the four-helix-bundle cytokines. The human IL15 gene was mapped to chromosome 4 region q25-35. Mature IL15 consists of 112 amino acid and containing 3 N-glycosylation sites. The expression of IL15 is tightly regulated. Although IL-15 mRNA can be found in many tissues and cells, including fibroblasts, muscle cells, keratinocytes, kidney cells, lymphocytes, mast cells, and tumor cells, a mature protein mainly produced by dendritic cells, monocytes, macrophages, and stromal cells, but not T cells. Expression of IL-15 is stimulated by cytokines such as granulocyte-macrophage colony-stimulating factor (GM-CSF), interferons, and agonists of Toll-like receptors (TLRs). (Marek et al. 2011 *Cytokine & Growth Factor Reviews* 22:99-108.)

IL15 receptor (IL15R) belongs to the super family of hemopoietic system. The heterotrimeric IL15R comprises α, β (CD122) and γ (CD132, common gamma chain, γc) subunits. The β subunit (IL15RP) is shared with the IL2 receptor. Human IL15Rα belongs to type I transmembrane protein. Both IL2Rα and IL15Rα contain a conserved sushi domain. IL15 would have some similar functions as IL2, such as promoting the proliferation of T and NK cells[3]. (Thomas et al. 2006 *J of Immunology* 177:6072-6080.)

IL15Rα is mainly expressed in dendritic cells (DCs) and monocytes. In most cases, IL15 binds to the receptor in a trans-presented form. In a trans-presentation model, IL15 and IL15Rα are synthesized in the same cell. IL15 and IL15Rα sushi domain bind to each other with high affinity in cytoplasm and transports IL-15 to the cell membrane. IL15Rα can then trans-present IL-15 to responding cells, such as T cells and NK cells.

IL15 displays pleiotropic functions in homeostasis and activation of both innate and adaptive immunity as follows:

(1) IL15 plays an important role in the activation, proliferation and survival of CD8$^+$ T cells;
(2) IL15 plays an important role in the activation and homeostasis of memory CD8$^+$ T cells;
(3) IL15 plays an important role in the development, activation and proliferation of NK cells and NKT cells;
(4) IL15 plays an important role in the production of anti-tumor antibody;
(5) IL15 plays an important role in the activation, proliferation and differentiation of DC by autocrine model, promotes the expression of MHC II and CD80/CD86 on DC and increases the presentation of DC to CD8$^+$ T cells;
(6) IL15 plays an important role in the activation of monocyte and macrophage; and
(7) IL15 plays an important role in the inhibition of AICD, protects T cells from inhibition by Treg and overcomes the resistance to tumor antigen.

IL2 has been approved by the FDA for the treatment of metastatic renal cell carcinoma and malignant melanoma. The effectiveness of IL-2 as an anti-cancer therapeutic, however, has been questioned due to its pivotal role in the maintenance of CD4$^+$ CD25$^+$ T-regulatory cells and in activation-induced cell death (AICD). This process leads to the elimination of stimulated T cells and induction of T-cell tolerance, thereby limiting the therapeutic effects.

Unlike IL2, IL15 is not involved in the activation-induced cell death (AICD) and maintenance of regulatory T cells. Thus, IL15 may have significant advantages over IL2 in treating cancer. Recent reports have shown that administration of preformed complexes of IL15 with its soluble receptor IL15Rα enhanced the half-life of IL15 and elevated the proliferation of T and NK cells. (Thomas et al. 2006 *J of Immunology* 177:6072-6080.)

Importantly, the soluble fusion protein of IL15Rα sushi domain and IL15, linked by a flexible peptide, exhibited enhanced half-life of IL15 and proliferation of T and NK cells. In mouse B16F10 and DEN-induced HCC tumor models, this fusion protein could inhibit tumor growth and suppress metastasis of tumor. In addition, IL15 exhibited enhanced anti-tumor effect or suppressed the growth of tumor in combination studies. (Cheng et al. 2014 *J of Hepatology* 61:1297-1303; Guo et al. 2017 *Cytokine and Growth Factor Reviews* 38:10-21.)

Various side-effects have been associated with IL15 therapy, such as:

(1) Induction of cytokine cascade, including TNFα, IL1, IL6, GM-CSF and pro-inflammatory cytokines;
(2) Promotion of proliferation, survival, and metastasis of some tumor cells;
(3) Activation of autoimmune T cells and participation of autoimmune diseases
(4) Induction of coronary heart disease; and
(5) Induction the expression of inhibitory molecules PD1/PDL1.

The therapeutics and methods currently available for e.g., hyperplasia, solid tumor or hematopoietic malignancy are inadequate. There remains an urgent and ongoing need for novel and improved therapeutics to effectively treat such diseases and conditions.

SUMMARY OF THE INVENTION

The invention is based in part on the surprising discovery of novel fusion proteins and therapeutic uses thereof. Novel fusion proteins of IL15 and prodrugs thereof, compositions and methods of preparation thereof, are disclosed herein which are useful in treating various diseases and disorders, e.g., hyperplasia, solid tumor or hematopoietic malignancy.

In one aspect, the invention generally relates to a fusion protein. The fusion protein comprises: a first structural unit: a subunit, or a fragment thereof, of interleukin 15 receptor alpha (IL15Rα); a second structural unit: an active IL15; a third structural unit: an antibody Fc fragment, located at the C-terminus of the fusion protein; and a first linker segment (L1) covalently linking the first, second and third structural units, wherein at the N-terminus of the fusion protein is the first structural unit, and the second structural unit is located between the first structural unit and the third structural unit.

In another aspect, the invention generally relates to a fusion protein. The fusion protein comprises: a first structural unit: a subunit, or a fragment thereof, of interleukin 15 receptor alpha (IL15Rα); a second structural unit: an active IL15; a third structural unit: an antibody Fc fragment, located at the C-terminus of the fusion protein; and a first linker segment (L1) covalently linking the first, second and third structural units, wherein at the N-terminus of the fusion protein is the second structural unit, the first structural unit is located between the second structural unit and the third structural unit.

In yet another aspect, the invention generally relates to a fusion protein. The fusion protein comprises: a first structural unit: a subunit, or a fragment thereof, of interleukin 15 receptor alpha (IL15Rα); a second structural unit: an active IL15; a third structural unit: an antibody Fc fragment, located at the C-terminus of the fusion protein; a fourth structural unit: a subunit, or a fragment thereof, of interleukin 15 receptor beta (IL15Rβ); and a first linker segment (L1) covalently linking the first, second, third and fourth structural units, wherein at the N-terminus of the fusion protein is the fourth structural unit, the second structural unit is located between the fourth and the first structural unit, and the first structural unit is located between the second structural unit and the third structural unit.

In yet another aspect, the invention generally relates to a fusion protein. The fusion protein comprises: a first structural unit: a subunit, or a fragment thereof, of interleukin 15 receptor (IL15R); a second structural unit: an active IL15; a third structural unit: an antibody Fc fragment, located at the C-terminus of the fusion protein; a fourth structural unit: a subunit, or a fragment thereof, of interleukin 15 receptor beta (IL15Rβ); a first linker segment (L1) covalently linking the first, second and third structural units, wherein the first structural unit is located between the second structural unit and the third structural unit; and a second linker segment (L2) covalently linking the fourth structural unit to the second structural unit, wherein at the N-terminus of the fusion protein is the fourth structural unit.

In yet another aspect, the invention generally relates to a homodimeric or heterodimeric protein, comprising a fusion protein disclosed herein.

In yet another aspect, the invention generally relates to a substantially purified protein, such as a fusion protein or a fragment, disclosed herein.

In yet another aspect, the invention generally relates to a polynucleotide encoding a protein, such as a fusion protein or a fragment thereof, disclosed herein.

In yet another aspect, the invention generally relates to an expression vector comprising a polynucleotide encoding a protein, such as a fusion protein or a fragment thereof, disclosed herein.

In yet another aspect, the invention generally relates to a pharmaceutical composition comprising a protein, such as a fusion protein or a fragment thereof, disclosed herein and a pharmaceutically acceptable excipient, carrier, or diluent.

In yet another aspect, the invention generally relates to a pharmaceutical composition comprising a polynucleotide encoding a protein, such as a fusion protein or a fragment thereof, disclosed herein and a pharmaceutically acceptable excipient, carrier, or diluent.

In yet another aspect, the invention generally relates to a method for treating a disease or condition. The method comprises administering to a patient in need thereof a therapeutically effective amount of a polynucleotide encoding a protein, such as a fusion protein or a fragment thereof, disclosed herein, wherein the disease or condition is selected from hyperplasia, solid tumor or hematopoietic malignancy.

In yet another aspect, the invention generally relates to use of a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to a cell line comprising a polynucleotide encoding a protein, such as a fusion protein or a fragment thereof, disclosed herein.

In yet another aspect, the invention generally relates to a method for making a protein, comprising culturing the cell line. In certain embodiments, the method further comprises purifying or isolating a produced protein, such as a fusion protein or a fragment thereof, disclosed herein.

In yet another aspect, the invention generally relates to a method for making a protein. The method comprises: providing an expression vector encoding a protein, such as a fusion protein or a fragment thereof, disclosed herein; introducing the expression vector into a host cell; culturing the host cell in media under conditions sufficient to express the protein; and purifying the protein from the host cell or media.

In yet another aspect, the invention generally relates to an isolated protein produced by a method disclosed herein.

BRIEF DESCRIPTION OF THE DRAWINGS

FIG. 1A shows schematic diagram of the structure of the IL15-Fc. FIG. 1B and FIG. 1C show schematic diagrams of two IL15 super agonists (both referred to as super IL15): RA-IL15-Fc and IL15-RA-Fc. FIG. 1D shows a schematic diagram of the fusion protein RB-IL15-RA-Fc.

FIG. 5 shows exemplary results on the therapeutic effects of super IL15 in A20 tumor model.

FIG. 6 shows exemplary results on the therapeutic effects of super IL15 in MC38 tumor model.

FIG. 8 shows exemplary comparison of therapeutic effects of RB-IL15-RA-Fc and super IL15 in A20 tumor model after intravenous injection.

FIG. 9 shows exemplary comparison of therapeutic effects of RB-IL15-RA-Fc and super IL15 in the mouse A20 tumor model after intraperitoneal injection.

DEFINITIONS

Figure 1:
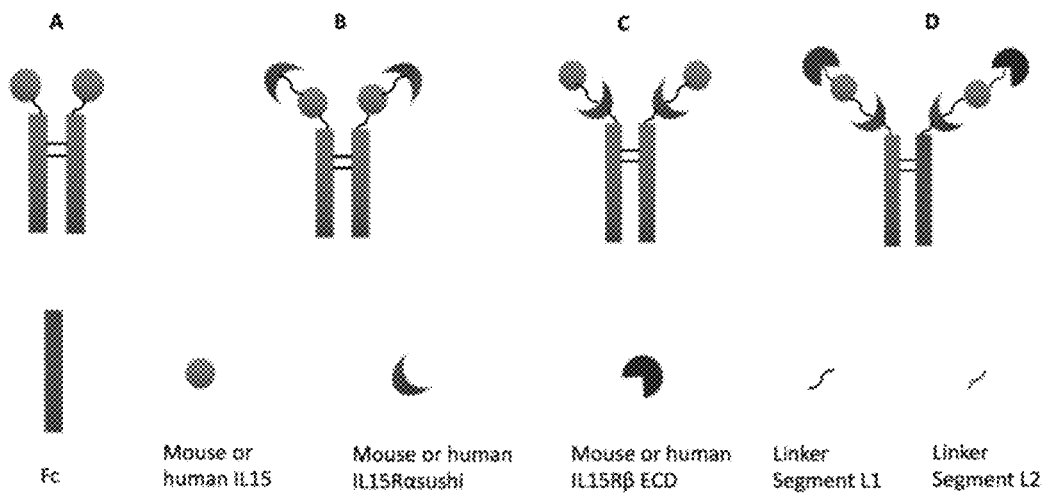
FIG. 1 shows a schematic diagram of the structure of the fusion protein.

Unless defined otherwise, all technical and scientific terms used herein have the same meaning as commonly understood by one of ordinary skill in the art to which this invention belongs. The following terms, unless indicated otherwise according to the context wherein the terms are found, are intended to have the following meanings.

When trade names are used herein, the trade name includes the product formulation, the generic drug, and the active pharmaceutical ingredient(s) of the trade name product, unless otherwise indicated by context.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, "at least" a specific value is understood to be that value and all values greater than that value.

As used herein, "more than one" is understood as 2, 3, 4, 5, 6, 7, 8, 9, 10, 11, 12, 13, 14, 15, 16, 17, 18, 19, 20, 25, 30, 40, 50, 100, etc., or any value therebetween.

In this specification and the appended claims, the singular forms "a," "an," and "the" include plural reference, unless the context clearly dictates otherwise.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about.

Unless specifically stated or obvious from context, as used herein, the term "or" is understood to be inclusive.

The term "comprising", when used to define compositions and methods, is intended to mean that the compositions and methods include the recited elements, but do not exclude other elements. The term "consisting essentially of", when used to define compositions and methods, shall mean that the compositions and methods include the recited elements and exclude other elements of any essential significance to the compositions and methods. For example, "consisting essentially of" refers to administration of the pharmacologically active agents expressly recited and excludes pharmacologically active agents not expressly recited. The term consisting essentially of does not exclude pharmacologically inactive or inert agents, e.g., pharmaceutically acceptable excipients, carriers or diluents. The term "consisting of", when used to define compositions and methods, shall mean excluding trace elements of other ingredients and substantial method steps. Embodiments defined by each of these transition terms are within the scope of this invention.

As used herein, the term "agonist" refers to a compound that, in combination with a receptor, can produce a cellular response. An agonist may be a ligand that directly binds to the receptor. Alternatively, an agonist may combine with a receptor indirectly by, for example, (a) forming a complex with another molecule that directly binds to the receptor, or (b) otherwise resulting in the modification of another compound so that the other compound directly binds to the receptor.

As used herein, the term "antagonist" refers to a compound that competes with an agonist or inverse agonist for binding to a receptor, thereby blocking the action of an agonist or inverse agonist on the receptor. However, an antagonist has no effect on constitutive receptor activity.

As used herein, the term "antibody" refers to molecules that are capable of binding an epitope or antigenic determinant. The term is meant to include whole antibodies and antigen-binding fragments thereof. The term encompasses polyclonal, monoclonal, chimeric, Fabs, Fvs, single-chain antibodies and single or multiple immunoglobulin variable chain or CDR domain designs as well as bispecific and multispecific antibodies. Antibodies can be from any animal origin. Preferably, the antibodies are mammalian, e.g., human, murine, rabbit, goat, guinea pig, camel, horse and the like, or other suitable animals. Antibodies may recognize polypeptide or polynucleotide antigens. The term includes active fragments, including for example, an antigen binding fragment of an immunoglobulin, a variable and/or constant region of a heavy chain, a variable and/or constant region of a light chain, a complementarity determining region (cdr), and a framework region. The terms include polyclonal and monoclonal antibody preparations, as well as preparations including hybrid antibodies, altered antibodies, chimeric antibodies, hybrid antibody molecules, F(ab)$_2$ and F(ab) fragments; Fv molecules (for example, noncovalent heterodimers), dimeric and trimeric antibody fragment constructs; minibodies, humanized antibody molecules, and any functional fragments obtained from such molecules, wherein such fragments retain specific binding.

As used herein, the term "antigen" as used herein is meant any substance that causes the immune system to produce antibodies or specific cell-mediated immune responses against it. A disease associated antigen is any substance that is associated with any disease that causes the immune system to produce antibodies or a specific-cell mediated response against it. An antigen is capable of being recognized by the immune system and/or being capable of inducing a humoral immune response and/or cellular immune response leading to the activation of B- and/or T-lymphocytes. An antigen can have one or more epitopes (B- and/or T-cell epitopes). An antigen will preferably react, typically in a highly selective manner, with its corresponding antibody or TCR and not with the multitude of other antibodies or TCRs which may be evoked by other antigens. Antigens as used herein may also be mixtures of several individual antigens.

As used herein, the term "biologically active" entity, or an entity having "biological activity," is one having structural, regulatory, or biochemical functions of a naturally occurring molecule or any function related to or associated with a metabolic or physiological process. A biologically active polypeptide or fragment thereof includes one that can participate in a biological process or reaction and/or can produce a desired effect. The biological activity can include an improved desired activity, or a decreased undesirable activity. For example, an entity demonstrates biological activity when it participates in a molecular interaction with another molecule, when it has therapeutic value in alleviating a disease condition, when it has prophylactic value in inducing an immune response, or when it has diagnostic and/or prognostic value in determining the presence of a molecule. A biologically active protein or polypeptide can be naturally-occurring or it can be synthesized from known components, e.g., by recombinant or chemical synthesis and can include heterologous components.

As used herein, the terms "cancer" and "cancerous" refer to or describe the physiological condition in mammals that is typically characterized by unregulated cell growth. Examples of cancer include but are not limited to, carcinoma, lymphoma, sarcoma, blastoma and leukemia. More particular examples of such cancers include squamous cell carcinoma, lung cancer, pancreatic cancer, cervical cancer, bladder cancer, hepatoma, breast cancer, colon carcinoma, and head and neck cancer.

As used herein, the term "cell" refers to any prokaryotic, eukaryotic, primary cell or immortalized cell line, any group of such cells as in, a tissue or an organ. Preferably the cells are of mammalian (e.g., human) origin and can be infected by one or more pathogens.

As used herein, the term "co-administer" refers to the presence of two pharmacological agents in the blood at the same time. The two pharmacological agents can be administered concurrently or sequentially.

As used herein, the term "co-expressed" is intended to mean that two distinct polypeptides are expressed simultaneously in a host cell such that the two polypeptides can interact or bind either in the host cell or in the host cell culture medium and form a complex.

As used herein, the terms "disease" or "disorder" refer to a pathological condition, for example, one that can be identified by symptoms or other identifying factors as diverging from a healthy or a normal state. The term "disease" includes disorders, syndromes, conditions, and injuries. Diseases include, but are not limited to, proliferative, inflammatory, immune, metabolic, infectious, and ischemic diseases.

As used herein, the term "effective amount" of an active agent refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the patient.

As used herein, the term "expression of a nucleic acid molecule" refers to the conversion of the information contained in the nucleic acid molecule into a gene product. The gene product can be the direct transcriptional product of a gene (e.g., mRNA, tRNA, rRNA, antisense RNA, ribozyme, structural RNA, or any other type of RNA) or a peptide or polypeptide produced by translation of an mRNA. Gene products also include RNAs that are modified by processes such as capping, polyadenylation, methylation, and editing; and proteins modified by, for example, methylation, acetylation, phosphorylation, ubiquitination, ADP-ribosylation, myristilation, and glycosylation.

As used herein, the term "host cell" refers to an individual cell or a cell culture that can be or has been a recipient of any recombinant vector(s) or isolated polynucleotide(s). A host cell can be a transfected, transformed, transduced or infected cell of any origin, including prokaryotic, eukaryotic, mammalian, avian, insect, plant or bacteria cells, or it can be a cells of any origin that can be used to propagate a nucleic acid described herein. Host cells include progeny of a single host cell, and the progeny may not necessarily be completely identical (in morphology or in total DNA complement) to the original parent cell due to natural, accidental, or deliberate mutation and/or change. A host cell includes cells transfected or infected in vivo or in vitro with a recombinant vector or a polynucleotide of the invention. A host cell that comprises a recombinant vector of the invention may be called a "recombinant host cell."

Host cells include, without limitation, the cells of mammals, plants, insects, fungi and bacteria. Bacterial cells include, without limitation, the cells of Gram-positive bacteria such as species of the genus *Bacillus*, *Streptomyces* and *Staphylococcus* and cells of Gram-negative bacteria such as cells of the genus *Escherichia* and *Pseudomonas*. Fungal cells include, preferably, yeast cells such as *Saccharomyces*, *Pichia pastoris* and *Hansenula polymorpha*. Insect cells include, without limitation, cells of *Drosophila* and Sf9 cells. Plant cells include, among others, cells from crop plants such as cereals, medicinal or ornamental plants or bulbs. Suitable mammal cells for the present invention include epithelial cell lines (porcine, etc.), osteosarcoma cell lines (human, etc.), neuroblastoma cell lines (human, etc.), epithelial carcinomas (human, etc.), glial cells (murine, etc.), liver cell lines (monkey, etc.). CHO cells (Chinese Hamster Ovary), COS cells, BHK cells, cells HeLa, 911, AT1080, A549, 293 or PER.C6, human ECCs NTERA-2 cells, D3 cells of the line of mESCs, human embryonic stem cells such as HS293 and BGV01, SHEF1, SHEF2 and HS181, cells NIH3T3, 293T, REH and MCF-7 and hMSCs cells.

As used herein, the term "Fc" refers to a molecule or sequence comprising the sequence of a non-antigen-binding fragment of whole antibody, whether in monomeric or multimeric form. The original immunoglobulin source of the native Fc is preferably of human origin and may be any of the immunoglobulins (e.g., IgG1, IgG2). Native Fc's are made up of monomeric polypeptides that may be linked into dimeric or multimeric forms by covalent (i.e., disulfide bonds) and non-covalent association. The number of intermolecular disulfide bonds between monomeric subunits of native Fc molecules ranges from 1 to 4 depending on class (e.g., IgG, IgA, IgE) or subclass (e.g., IgG1, IgG2, IgG3, IgA1, IgGA2).

As used herein, the terms "Fc domain" or "Fc region" is meant to refer to the immunoglobulin heavy chain "fragment crystallizable" region. Generally, an Fc domain is capable of interacting with a second Fc domain to form a dimeric complex. The Fc domain may be capable of binding cell surface receptors called Fc receptors and/or proteins of the complement system or may be modified to reduce or augment these binding activities. The Fc domain may be derived from IgG, IgA, IgD, IgM or IgE antibody isotypes and effect immune activity including opsonization, cell lysis, degranulation of mast cells, basophils, and eosinophils, and other Fc receptor-dependent processes; activation of the complement pathway; and protein stability in vivo.

"Fc domain" encompasses native Fc and Fc variant molecules and sequences as defined herein. As with Fc variants and native Fc's, the term "Fc domain" includes molecules in monomeric or multimeric form, whether digested from whole antibody or produced by recombinant gene expression or by other means.

Fc Fusion proteins have been reported to combine the Fc regions of IgG with the domains of another protein, such as various cytokines and soluble receptors. (e.g., Capon et al. 1989 *Nature* 337:525-531; Chamow et al. 1996 *Trends Biotechnol.* 14:52-60; U.S. Pat. Nos. 5,116,964 and 5,541, 087).

The use of Fc fusions is known in the art (e.g., U.S. Pat. Nos. 7,754,855; 5,480,981; 5,808,029; WO7/23614; WO98/28427 and references cited therein. Fc fusion proteins can include variant Fc molecules (e.g., as described in U.S. Pat. No. 7,732,570). Fc fusion proteins can be soluble in the plasma or can associate to the cell surface of cells having specific Fc receptors.

As used herein, the term "Fc variant" refers to a molecule or sequence that is modified from a native Fc but still comprises a binding site for the salvage receptor, FcRn. International applications WO 97/34631 (published Sep. 25, 1997) and WO 96/32478 describe exemplary Fc variants, as well as interaction with the salvage receptor, and are hereby incorporated by reference. Thus, the term "Fc variant" comprises a molecule or sequence that is humanized from a non-human native Fc. Furthermore, a native Fc comprises sites that may be removed because they provide structural features or biological activity that are not required for the fusion molecules of the present invention. Thus, in certain embodiments, the term "Fc variant" comprises a molecule or sequence that lacks one or more native Fc sites or residues that affect or are involved in (1) disulfide bond formation, (2) incompatibility with a selected host cell (3) N-terminal heterogeneity upon expression in a selected host cell, (4) glycosylation, (5) interaction with complement, (6) binding to an Fc receptor other than a salvage receptor, or (7) antibody-dependent cellular cytotoxicity (ADCC). Fc variants are described in further detail hereinafter.

As used herein, the term "fusion protein" refers to polypeptides comprising two or more regions from different or heterologous proteins covalently linked (i.e., "fused") by recombinant, chemical or other suitable method. If desired, the fusion molecule can be fused at one or several sites through a peptide or other linker segment or sequence. For example, one or more peptide linkers may be used to assist in construction of a fusion protein.

As used herein, the term "GC content" refers to the percentage of a nucleic acid sequence comprised of deoxyguanosine (G) and/or deoxycytidine (C) deoxyribonucleosides, or guanosine (G) and/or cytidine (C) ribonucleoside residues.

As used herein, the term "high dosage" is meant at least 5% (e.g., at least 10%, 20%, 50%, 100%, 200%, or even 300%) more than the highest standard recommended dosage of a particular compound for treatment of any human disease or condition.

As used herein, the term "immune response" refers to a process whereby immune cells are stimulated and/or recruited from the blood to lymphoid as well as non-lymphoid tissues via a multifactorial process that involves distinct adhesive and/or activation steps. Activation conditions cause the release of cytokines, growth factors, chemokines and other factors, upregulate expression of adhesion and other activation molecules on the immune cells, promote adhesion, morphological changes, and/or extravasation concurrent with chemotaxis through the tissues, increase cell proliferation and cytotoxic activity, stimulate antigen presentation and provide other phenotypic changes including generation of memory cell types. Immune response is also meant to refer to the activity of immune cells to suppress or regulate inflammatory or cytotoxic activity of other immune cells. Immune response refers to the activity of immune cells in vivo or in vitro.

The terms "identical" or percent "identity," in the context of two or more nucleic acids or polypeptide sequences, refer to two or more sequences or subsequences that are the same or have a specified percentage of amino acid residues or nucleotides that are the same (i.e., about 70% identity, preferably 75%, 80%, 85%, 90%, 91%, 92%, 93%, 94%, 95%, 96%, 97%, 98%, 99%, or higher identity over a specified region (e.g., of a IL15 or IL15Rα sequence), when compared and aligned for maximum correspondence over a comparison window or designated region) as measured using a BLAST or BLAST 2.0 sequence comparison algorithms with default parameters described below, or by manual alignment and visual inspection. Such sequences are then said to be "substantially identical." This definition also refers to, or can be applied to, the compliment of a test sequence. The definition also includes sequences that have deletions and/or additions, as well as those that have substitutions. As described below, the preferred algorithms can account for gaps and the like. Preferably, identity exists over a region that is at least about 25, 50, 75, 100, 150, 200 amino acids or nucleotides in length, and oftentimes over a region that is 225, 250, 300, 350, 400, 450, 500 amino acids or nucleotides in length or over the full-length of an amino acid or nucleic acid sequences.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

A preferred example of algorithm that is suitable for determining percent sequence identity and sequence similarity are the BLAST algorithms, which are described in Altschul et al. 1977 *Nuc. Acids Res.* 25:3389-3402 and Altschul et al. 1990 *J. Mol. Biol.* 215:403-410, respectively. BLAST software is publicly available through the National Center for Biotechnology Information on the worldwide web at ncbi.nlm.nih.gov/. Both default parameters or other non-default parameters can be used. The BLASTN program (for nucleotide sequences) uses as defaults a wordlength (W) of 11, an expectation (E) of 10, M=5, N=−4 and a comparison of both strands. For amino acid sequences, the BLASTP program uses as defaults a wordlength of 3, and expectation (E) of 10, and the BLOSUM62 scoring matrix (see Henikoff & Henikoff, *Proc. Natl. Acad. Sci. USA* 89:10915 (1989)) alignments (B) of 50, expectation (E) of 10, M=5, N=−4, and a comparison of both strands.

As used herein, the term "inhibit" refers to any measurable reduction of biological activity. Thus, as used herein, "inhibit" or "inhibition" may be referred to as a percentage of a normal level of activity.

As used herein, the term "interleukin 15" or "IL15" refers to a polypeptide that has at least 90%, 91%, 92%, 93%, 94%, 95%, 96%, 97%, 98% or 99% sequence identity to a native mammalian IL15 amino acid sequence that is biologically active, meaning the mutated protein ("mutein") has functionality similar (75% or greater) to that of a native IL15 protein in at least one functional assay. Functionally, IL15 is a cytokine that regulates T cell and natural killer cell activation and proliferation.

IL15 and IL2 share many biological activities, including binding to CD122, the IL2β/IL15β receptor subunit. The number of CD8+ memory cells is controlled by a balance between this IL15 and IL2. IL15 induces the activation of JAK kinases, as well as the phosphorylation and activation of transcription activators STAT3, STAT5, and STAT6. IL15 also increases the expression of apoptosis inhibitor BCL2L1/BCL-x (L), possibly through the transcription activation activity of STAT6, and thus prevents apoptosis. Two alternatively spliced transcript variants of the IL15 gene encoding the same mature protein have been reported.

Exemplified functional assays of an IL15 polypeptide include proliferation of T-cells (e.g., Montes et al. 2005 *Clin Exp Immunol* 142:292), and activation of NK cells, macrophages and neutrophils. Methods for isolation of particular immune cell subpopulations and detection of proliferation (i.e., $^3$H-thymidine incorporation) are well known in the art. Cell-mediated cellular cytotoxicity assays can be used to measure NK cell, macrophage and neutrophil activation. Cell-mediated cellular cytotoxicity assays, including release of isotopes ($^{51}$Cr), dyes (e.g., tetrazolium, neutral red) or enzymes, are also well known in the art, with commercially available kits (Oxford Biomedical Research, Oxford, M; Cambrex, Walkersville, Md.; Invitrogen, Carlsbad, Calif). IL15 has also been shown to inhibit Fas mediated apoptosis (e.g., Demirci et al. 2004 *Cell Mol Immunol* 1:123). Apoptosis assays, including for example, TUNEL assays and annexin V assays, are well known in the art with commercially available kits (R&D Systems, Minneapolis, Minn.). (e.g., Coliga et al. 1991-2006 *Current Methods in Immunology* John Wiley & Sons.)

As used herein, the term "interleukin 15 receptor alpha" or "IL15Rα" refers to an interleukin 15 receptor alpha amino acid sequences from a mammalian species. Those of skill in the art will appreciate that interleukin-15 receptor alpha nucleic acid and amino acid sequences are publicly available in gene databases, for example, GenBank through the National Center for Biotechnological Information on the worldwide web at ncbi.nlm.nih.gov. Exemplified native mammalian IL-15 receptor alpha nucleic acid or amino acid sequences can be from, for example, human, primate, canine, feline, porcine, equine, bovine, ovine, rodentia, murine, rat, hamster, guinea pig, etc. Accession numbers for exemplary native mammalian IL-15 nucleic acid sequences include NM_172200.1 (human isoform 2); and NM_002189.2 (human isoform 1 precursor). Accession numbers for exemplary native mammalian IL-15 amino acid sequences include NP_751950.1 (human isoform 2); and NP_002180.1 (human isoform 1 precursor).

As used herein, "interleukin 15 receptor alpha" or "IL15Rα" may also refer to a polypeptide that has at least 90%, 91%, 92%, 93%, 94%, 95%, 96%, 97%, 98% or 99% sequence identity to a native mammalian IL15Rα amino acid sequence that is biologically active, having functionality similar (75% or greater) to that of a native IL15Rα protein in at least one functional assay. IL15Rα is a cytokine receptor that specifically binds IL15 with high affinity. One functional assay is specific binding to a native IL15 protein.

As used herein, the terms an "isolated" molecule (such as a polypeptide or polynucleotide) is one that has been manipulated to exist in a higher concentration than in nature or has been removed from its native environment. For example, a subject antibody is isolated, purified, substantially isolated, or substantially purified when at least 10%, or 20%, or 40%, or 50%, or 70%, or 90% of non-subject-antibody materials with which it is associated in nature have been removed. For example, a polynucleotide or a polypeptide naturally present in a living animal is not "isolated," but the same polynucleotide or polypeptide separated from the coexisting materials of its natural state is "isolated." Further, recombinant DNA molecules contained in a vector are considered isolated for the purposes of the present invention. Isolated RNA molecules include in vivo or in vitro RNA replication products of DNA and RNA molecules. Isolated nucleic acid molecules further include synthetically produced molecules. Additionally, vector molecules contained in recombinant host cells are also isolated. Thus, not all "isolated" molecules need be "purified."

As used herein, the terms "linker" or "linking segment" refer to a molecule or group that connects two other molecules or groups. A peptide linker may allow the connected molecules or groups to acquire a functional configuration. The linker peptide preferably comprises at least two amino acids, at least three amino acids, at least five amino acids, at least ten amino acids, at least 15 amino acids, at least 20 amino acids, at least 30 amino acids, at least 40 amino acids, at least 50 amino acids, at least 60 amino acids, at least 70 amino acids, at least 80 amino acids, at least 90 amino acids or approximately 100 amino acids.

Components of a fusion protein, such as cytokines or other bioactive molecules and any peptide linkers, can be organized in nearly any fashion provided that the fusion protein has the function for which it was intended. In particular, each component of a fusion protein can be spaced from another component by at least one suitable peptide linker segment or sequence if desired. Additionally, the fusion protein may include tags, e.g., to facilitate modification, identification and/or purification of the fusion protein. More specific fusion proteins are in the examples described below.

As used herein, the term "low dosage" refers to at least 5% less (e.g., at least 10%, 20%, 50%, 80%, 90%, or even 95%) than the lowest standard recommended dosage of a particular compound formulated for a given route of administration for treatment of any human disease or condition. For example, a low dosage of an agent that is formulated for administration by inhalation will differ from a low dosage of the same agent formulated for oral administration.

As used herein, the term "medium" or "media" includes any culture medium, solution, solid, semi-solid, or rigid support that may support or contain any host cell, including bacterial host cells, yeast host cells, insect host cells, plant host cells, eukaryotic host cells, mammalian host cells, CHO cells, prokaryotic host cells, *E. coli*, or *Pseudomonas* host cells, and cell contents. Thus, the term may encompass medium in which the host cell has been grown, e.g., medium into which a polypeptide has been secreted, including medium either before or after a proliferation step. The term also may encompass buffers or reagents that contain host cell lysates, such as in the case where a polypeptide is produced intracellularly and the host cells are lysed or disrupted to release the polypeptide.

As used herein, the term "modulate" refers to the production, either directly or indirectly, of an increase or a decrease, a stimulation, inhibition, interference, or blockage in a measured activity when compared to a suitable control. A "modulator" of a polypeptide or polynucleotide refers to a substance that affects, for example, increases, decreases, stimulates, inhibits, interferes with, or blocks a measured activity of the polypeptide or polynucleotide, when compared to a suitable control. For example, a "modulator" may bind to and/or activate or inhibit the target with measurable affinity, or directly or indirectly affect the normal regulation of a receptor activity.

The term "operably linked" refers to a functional linkage between a first nucleic acid sequence and a second nucleic acid sequence, such that the first and second nucleic acid sequences are transcribed into a single nucleic acid sequence. Operably linked nucleic acid sequences need not be physically adjacent to each other. The term "operably linked" also refers to a functional linkage between a nucleic acid expression control sequence (such as a promoter, or array of transcription factor binding sites) and a transcribable nucleic acid sequence, wherein the expression control sequence directs transcription of the nucleic acid corresponding to the transcribable sequence.

As used herein, the term "pharmaceutically acceptable" excipient, carrier, or diluent refers to a pharmaceutically acceptable material, composition or vehicle, such as a liquid or solid filler, diluent, excipient, solvent or encapsulating material, involved in carrying or transporting the subject pharmaceutical agent from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Wetting agents, emulsifiers and lubricants, such as sodium lauryl sulfate, magnesium stearate, and polyethylene oxide-polypropylene oxide copolymer as well as coloring agents, release agents, coating agents, sweetening, flavoring and perfuming agents, preservatives and antioxidants can also be present in the compositions.

As used herein, the terms "polynucleotide," "nucleic acid molecule," "nucleotide," "oligonucleotide," and "nucleic acid" are used interchangeably herein to refer to polymeric forms of nucleotides, including ribonucleotides as well as deoxyribonucleotides, of any length. They can include both double-, single-stranded or triple helical sequences and include, but are not limited to, cDNA from viral, prokaryotic, and eukaryotic sources; mRNA; genomic DNA sequences from viral (e.g., DNA viruses and retroviruses) or prokaryotic sources; RNAi; cRNA; antisense molecules; recombinant polynucleotides; ribozymes; and synthetic DNA sequences. The term also captures sequences that include any of the known base analogs of DNA and RNA. Nucleotides can be referred to by their commonly accepted single-letter codes.

Polynucleotides are not limited to polynucleotides as they appear in nature, and also include polynucleotides where unnatural nucleotide analogues and inter-nucleotide bonds appear. A nucleic acid molecule may comprise modified nucleic acid molecules (e.g., modified bases, sugars, and/or internucleotide linkers). Non-limitative examples of this type of unnatural structures include polynucleotides wherein the sugar is different from ribose, polynucleotides wherein the phosphodiester bonds 3'-5' and 2'-5' appear, polynucleotides wherein inverted bonds (3'-3' and 5'-5') appear and branched structures. Also, the polynucleotides of the invention include unnatural inter-nucleotide bonds such as peptide nucleic acids (PNA), locked nucleic acids (LNA), C1-C4 alkylphosphonate bonds of the methylphosphonate, phosphoramidate, C1-C6 alkylphosphotriester, phosphorothioate and phosphorodithioate type. In any case, the polynucleotides of the invention maintain the capacity to hybridise with target nucleic acids in a similar way to natural polynucleotides.

Unless otherwise indicated or obvious from context, a particular nucleic acid sequence also implicitly encompasses conservatively modified variants thereof (e.g., degenerate codon substitutions) and complementary sequences, as well as the sequence explicitly indicated. Degenerate codon substitutions can be achieved by generating sequences in which the third position of one or more selected (or all) codons is substituted with mixed-base and/or deoxyinosine residues. (Batzer et al. 1991 *Nucleic Acid Res.* 19:5081; Ohtsuka et al. 1985 *J. Biol. Chem.* 260:2605-2608; Rossolini et al. 1994 *Mol. Cell. Probes* 8:91-98.)

As used herein, the terms "prevent", "preventing", or "prevention" refer to a method for precluding, delaying, averting, or stopping the onset, incidence, severity, or recurrence of a disease or condition. For example, a method is considered to be a prevention if there is a reduction or delay in onset, incidence, severity, or recurrence of a disease or condition or one or more symptoms thereof in a subject susceptible to the disease or condition as compared to a subject not receiving the method. The disclosed method is also considered to be a prevention if there is a reduction or delay in onset, incidence, severity, or recurrence of one or more symptoms of a disease or condition in a subject susceptible to the disease or condition after receiving the method as compared to the subject's progression prior to receiving treatment. The reduction or delay in onset, incidence, severity, or recurrence of osteoporosis can be about a 5, 10, 20, 30, 40, 50, 60, 70, 80, 90, 100%, or any amount of reduction in between.

Prevention and the like do not mean preventing a subject from ever getting the specific disease or disorder. Prevention may require the administration of multiple doses. Prevention can include the prevention of a recurrence of a disease in a subject for whom all disease symptoms were eliminated, or prevention of recurrence in a relapsing-remitting disease.

As used herein, the term "promoter" refers to a DNA regulatory region capable of binding RNA polymerase in a mammalian cell and initiating transcription of a downstream (3' direction) coding sequence operably linked thereto. A promoter sequence includes the minimum number of bases or elements necessary to initiate transcription of a gene of interest at levels detectable above background. Within the promoter sequence may be a transcription initiation site, as well as protein binding domains (consensus sequences) responsible for the binding of RNA polymerase. Eukaryotic promoters will often, but not always, contain "TATA" boxes and "CAT" boxes. Promoters include those that are naturally contiguous to a nucleic acid molecule and those that are not naturally contiguous to a nucleic acid molecule. Additionally, the term "promoter" includes inducible promoters, conditionally active promoters such as a cre-lox promoter, constitutive promoters, and tissue specific promoters.

As used herein, the terms "protein" and "polypeptide" are used interchangeably to refer to a polymer of amino acid residues, and are not limited to a minimum length. Thus, peptides, oligopeptides, dimers, multimers, and the like, are included within the definition. Both full-length proteins and fragments thereof are encompassed by the definition. The terms also include post-expression modifications of the polypeptide, for example, glycosylation, acetylation, phosphorylation, and the like. Furthermore, a polypeptide may refer to a protein which includes modifications, such as deletions, additions, and substitutions (generally conservative in nature), to the native sequence, as long as the protein maintains the desired activity. These modifications may be deliberate or may be accidental. Amino acids can be referred to herein by either their commonly known three letter symbols or by the one-letter symbols recommended by the IUPAC-IUB Biochemical Nomenclature Commission.

As used herein, the term "purified" refers to a protein that may be substantially or essentially free of components that normally accompany or interact with the protein as found in its naturally occurring environment, i.e. a native cell, or host cell in the case of a recombinantly produced protein. A protein that may be substantially free of cellular material includes preparations of protein having less than about 30%, less than about 20%, less than about 15%, less than about 10%, less than about 5%, less than about 4%, less than about 3%, less than about 2%, or less than about 1% (by dry weight) of contaminating protein(s). When a protein or variant thereof is recombinantly produced by the host cells, the protein may be present at about 30%, at about 20%, about 15%, about 10%, about 5%, about 4%, about 3%, about 2%, or about 1% or less of the dry weight of the cells. When a protein or variant thereof is recombinantly produced by the host cells, the protein may be present in the culture medium at about 5 g/L, about 4 g/L, about 3 g/L, about 2 g/L, about 1 g/L, about 750 mg/L, about 500 mg/L, about 250 mg/L, about 100 mg/L, about 50 mg/L, about 10 mg/L, or about 1 mg/L or less of the dry weight of the cells. Thus, a "substantially purified" protein may have a purity level of at least at least about 80%, specifically, a purity level of at least about 85%, and more specifically, a purity level of at least about 90%, a purity level of at least about 95%, a purity level of at least about 99% or greater as determined by appropriate methods such as SDS/PAGE analysis, RP-HPLC, SEC, and capillary electrophoresis.

Proteins and prodrugs of the present invention are, subsequent to their preparation, preferably isolated and/or purified to obtain a composition containing an amount by weight equal to or greater than 80% ("substantially pure"), which is then used or formulated as described herein. In certain embodiments, the compounds of the present invention are more than 95% pure.

As used herein, the term "receptor" refers to proteins, including glycoproteins or fragments thereof, capable of interacting with another molecule, called the ligand. The ligand may belong to any class of biochemical or chemical compounds. The ligand is usually an extracellular molecule which, upon binding to the receptor, usually initiates a cellular response, such as initiation of a signal transduction pathway. The receptor need not necessarily be a membrane-bound protein.

As used herein, the term "recombinant," with respect to a nucleic acid molecule, means a polynucleotide of genomic, cDNA, viral, semisynthetic, and/or synthetic origin which, by virtue of its origin or manipulation, is not associated with all or a portion of the polynucleotide with which it is associated in nature. The term "recombinant", as used with respect to a protein or polypeptide, means a polypeptide produced by expression of a recombinant polynucleotide. The term "recombinant" as used with respect to a host cell means a host cell into which a recombinant polynucleotide has been introduced.

As used herein, the term "sample" refers to a sample from a human, animal, or to a research sample, e.g., a cell, tissue, organ, fluid, gas, aerosol, slurry, colloid, or coagulated material. The "sample" may be tested in vivo, e.g., without removal from the human or animal, or it may be tested in vitro. The sample may be tested after processing, e.g., by histological methods. "Sample" also refers, e.g., to a cell comprising a fluid or tissue sample or a cell separated from a fluid or tissue sample. "Sample" may also refer to a cell, tissue, organ, or fluid that is freshly taken from a human or animal, or to a cell, tissue, organ, or fluid that is processed or stored.

As used herein, the term "soluble" refers to a fusion molecule, particularly a fusion protein, that is not readily sedimented under low G-force centrifugation (e.g., less than about 30,000 revolutions per minute in a standard centrifuge) from an aqueous buffer, e.g., cell media. A fusion molecule is soluble if it remains in aqueous solution at a temperature greater than about 5-37° C. and at or near neutral pH in the presence of low or no concentration of an anionic or non-ionic detergent. Under these conditions, a soluble protein will often have a low sedimentation value, e.g., less than about 10 to 50 svedberg units.

Aqueous solutions referenced herein typically have a buffering compound to establish pH, typically within a pH range of about 5-9, and an ionic strength range between about 2 mM and 500 mM. Sometimes a protease inhibitor or mild non-ionic detergent is added. Additionally, a carrier protein may be added if desired (e.g., bovine serum albumin). Exemplary aqueous buffers include standard phosphate buffered saline, tris-buffered saline, or other well-known buffers and cell media formulations.

As used herein, the term "soluble IL15 Receptor alpha" refers to forms of IL15 Receptor alpha lacking the transmembrane anchor portion of the receptor and thus able to be secreted out of the cell without being anchored to the plasma membrane.

As used herein, the terms "stimulate" or "stimulating" refer to increase, to amplify, to augment, to boost a physiological activity, e.g., an immune response. Stimulation can be a positive alteration. For example, an increase can be by 5%, 10%, 25%, 50%, 75%, or even 90-100%. Other exemplary increases include 2-fold, 5-fold, 10-fold, 20-fold, 40-fold, or even 100-fold.

As used herein, the terms "subject" and "patient" are used interchangeably herein to refer to a living animal (human or non-human). The subject may be a mammal. The terms "mammal" or "mammalian" refer to any animal within the taxonomic classification mammalia. A mammal may be a human or a non-human mammal, for example, dogs, cats, pigs, cows, sheep, goats, horses, rats, and mice. The term "subject" does not preclude individuals that are entirely normal with respect to a disease or condition, or normal in all respects.

As used herein, the terms "suppress" or "suppressing" refer to decrease, to attenuate, to diminish, to arrest, or to stabilize a physiological activity, e.g., an immune response. Suppression can be a negative alteration. For example, a decrease can be by 5%, 10%, 25%, 50%, 75%, or even 90-100%. Exemplary decreases include 2-fold, 5-fold, 10-fold, 20-fold, 40-fold, or even 100-fold.

As used herein, the term "therapeutically effective amount" refers to the dose of a therapeutic agent or agents sufficient to achieve the intended therapeutic effect with minimal or no undesirable side effects. A therapeutically effective amount can be readily determined by a skilled physician, e.g., by first administering a low dose of the pharmacological agent(s) and then incrementally increasing the dose until the desired therapeutic effect is achieved with minimal or no undesirable side effects.

As used herein, the term "transfected" means possessing introduced DNA or RNA, with or without the use of any accompanying facilitating agents such as lipofectamine. Methods for transfection that are known in the art include, for example, calcium phosphate transfection, DEAE dextran transfection, protoplast fusion, electroporation, and lipofection.

As used herein, the terms "treatment" or "treating" a disease or disorder refers to a method of reducing, delaying or ameliorating such a condition, or one or more symptoms of such disease or condition, before or after it has occurred. Treatment may be directed at one or more effects or symptoms of a disease and/or the underlying pathology. The treatment can be any reduction and can be, but is not limited to, the complete ablation of the disease or the symptoms of the disease. As compared with an equivalent untreated control, such reduction or degree of prevention is at least 5%, 10%, 20%, 40%, 50%, 60%, 80%, 90%, 95%, or 100% as measured by any standard technique.

As used herein, the term "tumor" refers to any malignant or neoplastic cell.

As used herein, the term "vector" refers to a nucleic acid molecule that is able to transmit genetic material to a host cell or organism. A vector may be composed of either DNA or RNA. A vector carries its own origin of replication, one or more unique recognition sites for restriction endonucleases which can be used for the insertion of foreign DNA, and usually selectable markers such as genes coding for antibiotic resistance, and often recognition sequences (e.g., promoter) for the expression of the inserted DNA. Common vectors include plasmid vectors and phage vectors.

Any compositions or methods disclosed herein can be combined with one or more of any of the other compositions and methods provided herein.

DETAILED DESCRIPTION OF THE INVENTION

The invention provides novel fusion proteins and therapeutic uses thereof. More particularly, the invention provides novel fusion proteins of IL15 and prodrugs thereof, compositions and methods of preparation thereof, which are useful in treating various diseases and disorders, e.g., hyperplasia, solid tumor or hematopoietic malignancy with reduced off-target toxicities and side effects during treatment.

In one aspect, the invention generally relates to a fusion protein. The fusion protein comprises: a first structural unit: a subunit, or a fragment thereof, of interleukin 15 receptor (IL15R); a second structural unit: an active IL15; a third structural unit: an antibody Fc fragment, located at the C-terminus of the fusion protein; and a first linker segment covalently linking the first, second and third structural units, wherein at the N-terminus of the fusion protein is the first structural unit, and the second structural unit is located between the first structural unit and the third structural unit.

In another aspect, the invention generally relates to a fusion protein. The fusion protein comprises: a first structural unit: a subunit, or a fragment thereof, of interleukin 15 receptor (IL15R); a second structural unit: an active IL15; a third structural unit: an antibody Fc fragment, located at the C-terminus of the fusion protein; and a first linker segment covalently linking the first, second and third structural units, wherein at the N-terminus of the fusion protein is the second structural unit, the first structural unit is located between the second structural unit and the third structural unit.

In certain embodiments of the fusion protein, the subunit of the IL15R is selected from α subunit, β subunit and γ subunit.

In certain embodiments of the fusion protein, the subunit of the IL15R is an α subunit.

In certain embodiments of the fusion protein, the fragment is the sushi domain of α subunit of mouse IL15R, with the amino acid sequence set forth in SEQ ID No. 4.

In certain embodiments of the fusion protein, the fragment is the sushi domain of α subunit of human IL15R, with the amino acid sequence set forth in SEQ ID No. 5.

In certain embodiments of the fusion protein, the IL15 is human or murine IL15.

In certain embodiments of the fusion protein, the IL15 is mouse IL15. In certain embodiments of the fusion protein, the mouse IL15 has the amino acid sequence set forth in SEQ ID No. 1.

In certain embodiments of the fusion protein, the IL15 is human IL15. In certain embodiments of the fusion protein, the human IL15 has the amino acid sequence set forth in SEQ ID No. 2.

In certain embodiments of the fusion protein, the antibody Fc fragment comprises a human Fc fragment.

In certain embodiments of the fusion protein, the human Fc fragment comprises a human IgG1-Fc having the amino acid sequence set forth in SEQ ID No. 3.

In certain embodiments of the fusion protein, the linker segment L1 comprises a multiple of GGGS (SEQ ID NO: 43).

In certain embodiments of the fusion protein, the linker segment L1 linking the first structural unit to the third structural unit comprises the amino acid sequence set forth in SEQ ID No. 9.

In certain embodiments of the fusion protein, the linker segment L1 linking the first and second structural units comprises the amino acid sequence set forth in SEQ ID No. 8.

In certain embodiments, the fusion protein further comprises: a fourth structural unit located at the N-terminus of the fusion protein: an extracellular domain of the IL15 receptor β subunit (Rβ); and a linker segment L2 covalently linking the fourth structural unit and the remaining structural units of the fusion protein, wherein the first structural unit is covalently linked to the C-terminus of the fourth structural unit, and the second structural unit is located between the first structural unit and the third structural unit, and wherein the linker segment L2 is capable of being recognized and hydrolyzed by a proteolytic enzyme specifically expressed in a tumor microenvironment.

In certain embodiments, the fusion protein further comprises: a fourth structural unit located at the N-terminus of the fusion protein: an extracellular domain of the IL15 receptor β subunit (Rβ); and a linker segment L2 covalently linking the fourth structural unit and the remaining structural units of the fusion protein, wherein the second structural unit is covalently linked to the C-terminus of the fourth structural unit, and the first structural unit is located between the second structural unit and the third structural unit, and wherein the linker segment L2 is capable of being recognized and hydrolyzed by a proteolytic enzyme specifically expressed in a tumor microenvironment.

In certain embodiments, the amino acid sequence of mouse Rβ has the amino acid sequence set forth in SEQ ID No. 6.

In certain embodiments, the amino acid sequence of human Rβ has the amino acid sequence set forth in SEQ ID No. 7.

In certain embodiments of the fusion protein, the proteolytic enzyme specifically expressed in the tumor microenvironment is a matrix metalloproteinase.

In certain embodiments of the fusion protein, the matrix metalloproteinase is matrix metalloproteinase 9 (MMP9).

In certain embodiments of the fusion protein, the matrix metalloproteinase is matrix metalloproteinase 14 (MMP14).

In certain embodiments of the fusion protein, the linker segment L2 comprises an amino acid sequence set forth in SEQ ID Nos. 10-23.

In yet another aspect, the invention generally relates to a homodimeric or heterodimeric protein, comprising a fusion protein disclosed herein.

In certain embodiments, the homodimeric or heterodimeric protein comprises a monomer of RA-IL15-Fc: sushi domain of murine IL15 receptor α subunit, the linker segment L1, murine IL15, the linker segment L1, a fusion protein of human IgG1 Fc, e.g., having the amino acid sequence as set forth in SEQ ID No. 24.

In certain embodiments, the homodimeric or heterodimeric protein comprises a monomer of RA-IL15-Fc: sushi domain of human IL15 receptor α subunit, the linker segment L1, human IL15, the linker segment L1, a fusion protein of human IgG1 Fc, e.g., having the amino acid sequence as set forth in SEQ ID No. 25.

In certain embodiments, the homodimeric or heterodimeric protein comprises a monomer of IL15-RA-Fc: murine IL15, the linker segment L1, sushi domain of IL15 receptor α subunit, the linker segment L1, a fusion protein of human IgG1 Fc, e.g., having the amino acid sequence as set forth in SEQ ID No. 26.

In certain embodiments, the homodimeric or heterodimeric protein comprises a monomer of IL15-RA-Fc: human IL15, the linker segment L1, sushi domain of IL15 receptor α subunit, the linker segment L1, a fusion protein of human IgG1 Fc, e.g., having the amino acid sequence as set forth in SEQ ID No. 27.

In certain embodiments, the homodimeric or heterodimeric protein comprises a monomer of RB-IL15-RA-Fc: an extracellular domain of the mouse IL15 receptor β subunit, the linker segment L2, murine IL15, the linker segment L1, the sushi domain of IL15 receptor α subunit, the linker segment L1, a fusion protein of the human IgG1 Fc, e.g., having the amino acid sequence as set forth in SEQ ID No. 28.

In certain embodiments, the homodimeric or heterodimeric protein comprises a monomer of RB-IL15-RA-Fc: an extracellular domain of the human IL15 receptor β subunit, the linker segment L2, human IL15, the linker segment L1, the sushi domain of IL15 receptor α subunit, the linker segment L1, a fusion protein of the human IgG1 Fc, e.g., having an amino acid sequence as set forth in SEQ ID No. 29-41.

In certain embodiments, the homodimeric or heterodimeric protein comprises a monomer of RB-IL15-RA-Fc: an extracellular domain of the human IL15 receptor β subunit, the linker segment L1, human IL15, the linker segment L1, the sushi domain of IL15 receptor α subunit, the linker segment L1, a fusion protein of the human IgG1 Fc, e.g., having the amino acid sequence as set forth in SEQ ID No. 42.

In certain embodiments, the homodimeric or heterodimeric protein is hydrolyzed by a proteolytic enzyme specifically expressed in a tumor microenvironment.

In yet another aspect, the invention generally relates to a substantially purified protein, such as a fusion protein or a fragment, disclosed herein.

In yet another aspect, the invention generally relates to a polynucleotide encoding a protein, such as a fusion protein or a fragment thereof, disclosed herein.

In yet another aspect, the invention generally relates to an expression vector comprising a polynucleotide encoding a protein, such as a fusion protein or a fragment thereof, disclosed herein.

In yet another aspect, the invention generally relates to a pharmaceutical composition comprising a protein, such as a fusion protein or a fragment thereof, disclosed herein and a pharmaceutically acceptable excipient, carrier, or diluent.

In yet another aspect, the invention generally relates to a pharmaceutical composition comprising a polynucleotide encoding a protein, such as a fusion protein or a fragment thereof, disclosed herein and a pharmaceutically acceptable excipient, carrier, or diluent.

In yet another aspect, the invention generally relates to a method for treating a disease or condition. The method comprises administering to a patient in need thereof a therapeutically effective amount of a polynucleotide encoding a protein, such as a fusion protein or a fragment thereof, disclosed herein, wherein the disease or condition is selected from hyperplasia, solid tumor or hematopoietic malignancy.

In certain embodiments, the disease or condition being treated is hyperplasia.

In certain embodiments, the disease or condition being treated is a solid tumor.

In certain embodiments, the disease or condition being treated is a hematopoietic malignancy.

In certain embodiments, the subject being treated is further administered one or more of chemotherapy, radiotherapy, targeted therapy, immunotherapy or hormonal therapy.

In certain embodiments, the method further comprises administering a chemotherapeutic agent to the subject.

In certain embodiments, the method further comprises administering a radiotherapy to the subject.

In certain embodiments, the method further comprises administering a targeted therapy to the subject.

In certain embodiments, the method further comprises administering an immunotherapy to the subject.

In certain embodiments, the method further comprises administering hormonal therapy to the subject.

As used herein, the term "chemotherapeutic agent" refers to a chemical compound useful in the treatment of cancer. Examples of chemotherapeutic agents include Erlotinib (TARCEVA®, Genentech/OSI Pharm.), Bortezomib (VELCADE®, Millennium Pharm.), Fulvestrant (FASLODEX®, AstraZeneca), Sutent (SU11248, Pfizer), Letrozole (FEMARA®, Novartis), Imatinib mesylate (GLEEVEC®, Novartis), PTK787/ZK 222584 (Novartis), Oxaliplatin (Eloxatin®, Sanofi), 5-FU (5-fluorouracil), Leucovorin, Rapamycin (Sirolimus, RAPAMUNE®, Wyeth), Lapatinib (TYKERB®, GSK572016, Glaxo Smith Kline), Lonafarnib (SCH 66336), Sorafenib (BAY43-9006, Bayer Labs), and Gefitinib (IRESSA®, AstraZeneca), AG1478, AG1571 (SU 5271; Sugen), alkylating agents such as thiotepa and CYTOXAN® cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, triethylenephosphoramide, triethylenethiophosphoramide and trimethylomelamine; acetogenins (especially bullatacin and bullatacinone); a camptothecin (including the synthetic analog topotecan); bryostatin; callystatin; CC-1065 (including its adozelesin, carzelesin and bizelesin synthetic analogs); cryptophycins (particularly cryptophycin 1 and cryptophycin 8); dolastatin; duocarmycin (including the synthetic analogs, KW-2189 and CB1-TM1); eleutherobin; pancratistatin; a sarcodictyin; spongistatin; nitrogen mustards such as chlorambucil, chlornaphazine, chlorophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammaII and calicheamicin omegaII (Angew Chem. Intl. Ed. Engl. (1994) 33: 183-186); dynemicin, including dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, ADRIAMYCIN® (doxorubicin), morpholino-doxorubicin, cyanomorpholino-doxorubicin, 2-pyrrolino-doxorubicin and deoxydoxorubicin), epirubicin, esonibicin, idarubicin, marcellomycin, mitomycins such as mitomycin C, mycophenolic acid, nogalamycin, olivomycins, peplomycin, porfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogs such as denopterin, methotrexate, pteropterin, trimetrexate; purine analogs such as fludarabine, 6-mercaptopurine, thiamniprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK® polysaccharide complex (JHS Natural Products, Eugene, Oreg.); razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., TAXOL® (paclitaxel; Bristol-Myers Squibb Oncology, Princeton, N.J.), ABRAXANE® (Cremophor-free), albumin-engineered nanoparticle formulations of paclitaxel (American Pharmaceutical Partners, Schaumberg, 111.), and TAXOTERE® (doxetaxel; Rhone-Poulenc Rorer, Antony, France); chloranmbucil; GEMZAR® (gemcitabine); 6-thioguanine; mercaptopurine; methotrexate; platinum analogs such as cisplatin and carboplatin; vinblastine; etoposide (VP-16); ifosfamide; mitoxantrone; vincristine; NAVELBINE® (vinorelbine); novantrone; teniposide; edatrexate; daunomycin; aminopterin; capecitabine (XELODA®); ibandronate; CPT-11; topoisomerase inhibitor RFS 2000; difluoromethylomithine (DMFO); retinoids such as retinoic acid; and pharmaceutically acceptable salts, acids and derivatives of any of the above.

Examples of the second (or further) agent or therapy may include, but are not limited to, immunotherapies (e.g. PD-1 inhibitors (pembrolizumab, nivolumab, cemiplimab), PD-L1 inhibitors (atezolizumab, avelumab, durvalumab), CTLA4 antagonist, cell signal transduction inhibitors (e.g., imatinib, gefitinib, bortezomib, erlotinib, sorafenib, sunitinib, dasatinib, vorinostat, lapatinib, temsirolimus, nilotinib, everolimus, pazopanib, trastuzumab, bevacizumab, cetuximab, ranibizumab, pegaptanib, panitumumab and the like), mitosis inhibitors (e.g., paclitaxel, vincristine, vinblastine and the like), alkylating agents (e.g., cisplatin, cyclophosphamide, chromabucil, carmustine and the like), anti-metabolites (e.g., methotrexate, 5-FU and the like), intercalating anticancer agents, (e.g., actinomycin, anthracycline, bleomycin, mitomycin-C and the like), topoisomerase inhibitors (e.g., irinotecan, topotecan, teniposide and the like), immunotherapic agents (e.g., interleukin, interferon and the like) and antihormonal agents (e.g., tamoxifen, raloxifene and the like).

In yet another aspect, the invention generally relates to use of a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In certain embodiments, the medicament is an anticancer drug.

In certain embodiments, the disease or disorder is one or more selected from head and neck cancer, endometrial cancer, colorectal cancer, ovarian cancer, breast cancer, melanoma, lung cancer, renal cancer, liver cancer, anal cancer, sarcoma, lymphoma, leukemia, brain tumors, gastric cancer, testicular cancer, pancreatic cancer, and thyroid cancer.

In certain embodiments, the anticancer drug is effective for treating B-cell lymphoma or anti-colorectal cancer.

In yet another aspect, the invention generally relates to a cell line comprising a polynucleotide encoding a protein, such as a fusion protein or a fragment thereof, disclosed herein.

In yet another aspect, the invention generally relates to a method for making a protein, comprising culturing the cell line. In certain embodiments, the method further comprises purifying or isolating a produced protein, such as a fusion protein or a fragment thereof, disclosed herein.

In yet another aspect, the invention generally relates to a method for making a protein. The method comprises: providing an expression vector encoding a protein, such as a fusion protein or a fragment thereof, disclosed herein; introducing the expression vector into a host cell; culturing the host cell in media under conditions sufficient to express the protein; and purifying the protein from the host cell or media.

Any suitable expression vectors may be employed. An exemplary expression vector is pEE12.4 expression vector.

Any suitable host cell may be employed, for examples, 293F and CHO cells.

Introduction of the expression vector can be accomplished by any suitable transfection method and can be via a transient transfection or a stable cell line.

Any suitable purification method may be employed. An exemplary purification method is by affinity chromatography of ProteinA/G or size exclusion methods.

In yet another aspect, the invention generally relates to an isolated protein produced by a method disclosed herein.

In certain embodiments, the isolated protein is substantially pure.

As disclosed herein, linker sequences can be used to link two or more polypeptides of the biologically active polypeptide to generate a single-chain molecule with a desired functional activity.

Any suitable linkers may be adopted. Exemplary peptide linker sequences include those having from about 7 to 20 amino acids, e.g., from about 8 to 16 amino acids. The linker sequence is preferably flexible so as not hold the biologically active polypeptide or effector molecule in a single undesired conformation. The linker sequence can be used, e.g., to space the recognition site from the fused molecule. Specifically, the peptide linker sequence can be positioned so as to provide molecular flexibility. The linker preferably predominantly comprises amino acids with small side chains, such as glycine, alanine and serine, to provide for flexibility.

In general, preparation of the fusion protein complexes of the invention can be accomplished by procedures disclosed herein and by recognized recombinant DNA techniques involving, e.g., polymerase chain amplification reactions (PCR), preparation of plasmid DNA, cleavage of DNA with restriction enzymes, preparation of oligonucleotides, ligation of DNA, isolation of mRNA, introduction of the DNA into a suitable cell, transformation or transfection of a host, culturing of the host. Additionally, the fusion molecules can be isolated and purified using chaotropic agents and well known electrophoretic, centrifugation and chromatographic methods. (Sambrook, et al., *Molecular Cloning: A Laboratory Manual* (2nd ed. (1989); and Ausubel, et al., *Current Protocols in Molecular Biology*, John Wiley & Sons, New York (1989) for disclosure relating to these methods.)

The invention further provides nucleic acid sequences and DNA sequences that encode the present fusion proteins. The DNA sequence may be carried by a vector suited for extrachromosomal replication such as a phage, virus, plasmid, phagemid, cosmid, YAC, or episome. For example, a DNA vector that encodes a desired fusion protein can be used to facilitate preparative methods described herein and to obtain significant quantities of the fusion protein or components thereof. The DNA sequence can be inserted into an appropriate expression vector, i.e., a vector that contains the necessary elements for the transcription and translation of the inserted protein-coding sequence. A variety of host-vector systems may be utilized to express the protein-coding sequence. These may include mammalian cell systems infected with virus (e.g., vaccinia virus, adenovirus, etc.); insect cell systems infected with virus (e.g., baculovirus); microorganisms such as yeast containing yeast vectors, or bacteria transformed with bacteriophage DNA, plasmid DNA or cosmid DNA. Depending on the host-vector system utilized, any one of a number of suitable transcription and translation elements may be used. (Sambrook, et al., *Molecular Cloning: A Laboratory Manual* (2nd ed. (1989); and Ausubel, et al., *Current Protocols in Molecular Biology*, John Wiley & Sons, New York (1989) for disclosure relating to these methods.)

Fusion protein components encoded by the DNA vector can be provided in a cassette format. By the term "cassette" is meant that each component can be readily substituted for another component by standard recombinant methods. In particular, a DNA vector configured in a cassette format is particularly desirable when the encoded fusion complex is to be used against pathogens that may have or have capacity to develop serotypes.

To make the vector coding for a fusion protein complex, the sequence coding for the biologically active polypeptide is linked to a sequence coding for the effector peptide by use of suitable ligases. DNA coding for the presenting peptide can be obtained by isolating DNA from natural sources such as from a suitable cell line or by known synthetic methods, e.g. the phosphate triester method. (Oligonucleotide Synthesis, IRL Press, M. J. Gait, ed., 1984). Synthetic oligonucleotides also may be prepared using commercially available automated oligonucleotide synthesizers. Once isolated, the gene coding for the biologically active polypeptide can be amplified by PCR or other means known in the art. Suitable PCR primers to amplify the biologically active polypeptide gene may add restriction sites to the PCR product. The PCR product preferably includes splice sites for the effector peptide and leader sequences necessary for proper expression and secretion of the biologically active polypeptide-effector fusion complex. The PCR product also preferably includes a sequence coding for the linker sequence, or a restriction enzyme site for ligation of such a sequence.

The fusion proteins described herein may be produced by standard recombinant DNA techniques. For example, once a DNA molecule encoding the biologically active polypeptide is isolated, sequence can be ligated to another DNA molecule encoding the effector polypeptide. The nucleotide sequence coding for a biologically active polypeptide may be directly joined to a DNA sequence coding for the effector peptide or, more typically, a DNA sequence coding for the linker sequence as discussed herein may be interposed between the sequence coding for the biologically active polypeptide and the sequence coding for the effector peptide and joined using suitable ligases. The resultant hybrid DNA molecule can be expressed in a suitable host cell to produce the fusion protein complex. The DNA molecules are ligated to each other in a 5' to 3' orientation such that, after ligation, the translational frame of the encoded polypeptides is not altered (i.e., the DNA molecules are ligated to each other in-frame). The resulting DNA molecules encode an in-frame fusion protein.

Other nucleotide sequences also can be included in the gene construct. For example, a promoter sequence, which controls expression of the sequence coding for the biologically active polypeptide fused to the effector peptide, or a leader sequence, which directs the fusion protein to the cell surface or the culture medium, can be included in the construct or present in the expression vector into which the construct is inserted.

In obtaining variant biologically active polypeptide, IL15, IL15R or Fc domain coding sequences, those of ordinary skill in the art will recognize that the polypeptides may be modified by certain amino acid substitutions, additions, deletions, and post-translational modifications, without loss or reduction of biological activity. In particular, it is well-known that conservative amino acid substitutions, that is, substitution of one amino acid for another amino acid of similar size, charge, polarity and conformation, are unlikely to significantly alter protein function. The 20 standard amino acids that are the constituents of proteins can be broadly categorized into four groups of conservative amino acids as follows: the nonpolar (hydrophobic) group includes alanine, isoleucine, leucine, methionine, phenylalanine, proline, tryptophan and valine; the polar (uncharged, neutral) group includes asparagine, cysteine, glutamine, glycine, serine, threonine and tyrosine; the positively charged (basic) group contains arginine, histidine and lysine; and the negatively charged (acidic) group contains aspartic acid and glutamic acid. Substitution in a protein of one amino acid for another within the same group is unlikely to have an adverse effect on the biological activity of the protein. In other instance, modifications to amino acid positions can be made to reduce or enhance the biological activity of the protein. Such changes can be introduced randomly or via site-specific mutations based on known or presumed structural or functional properties of targeted residue(s). Following expression of the variant protein, the changes in the biological activity due to the modification can be readily assessed using binding or functional assays.

Homology between nucleotide sequences can be determined by DNA hybridization analysis, wherein the stability of the double-stranded DNA hybrid is dependent on the extent of base pairing that occurs. Conditions of high temperature and/or low salt content reduce the stability of the hybrid, and can be varied to prevent annealing of sequences having less than a selected degree of homology. For instance, for sequences with about 55% G-C content, hybridization and wash conditions of 40-50 C, 6×SSC (sodium chloride/sodium citrate buffer) and 0.1% SDS (sodium dodecyl sulfate) indicate about 60-70% homology, hybridization and wash conditions of 50-65 C, 1×SSC and 0.1% SDS indicate about 82-97% homology, and hybridization and wash conditions of 52 C, 0.1×SSC and 0.1% SDS indicate about 99-100% homology. A wide range of computer programs for comparing nucleotide and amino acid sequences (and measuring the degree of homology) are also available. Readily available sequence comparison and multiple sequence alignment algorithms are, respectively, the Basic Local Alignment Search Tool (BLAST) and ClustalW programs.

A number of strategies can be employed to express protein fusion complexes of the invention. For example, the fusion protein construct described above can be incorporated into a suitable vector by known means such as by use of restriction enzymes to make cuts in the vector for insertion of the construct followed by ligation. The vector containing the gene construct is then introduced into a suitable host for expression of the fusion protein. (Sambrook et al., *Molecular Cloning: A Laboratory Manual* (2nd ed. (1989) for disclosure relating to these methods.)

Selection of suitable vectors can be made empirically based on factors relating to the cloning protocol. For example, the vector should be compatible with, and have the proper replicon for the host that is being employed. Further the vector must be able to accommodate the DNA sequence coding for the fusion protein complex that is to be expressed. Suitable host cells include eukaryotic and prokaryotic cells, preferably those cells that can be easily transformed and exhibit rapid growth in culture medium. Specifically, preferred hosts cells include prokaryotes such as *E. coli, Bacillus subtillus*, etc. and eukaryotes such as animal cells and yeast strains, e.g., *S. cerevisiae*. Mammalian cells are generally preferred, particularly J558, NSO, SP2-O or CHO. Other suitable hosts include, e.g., insect cells such as Sf9. Conventional culturing conditions are employed. See Sambrook, supra. Stable transformed or transfected cell lines can then be selected. Cells expressing a fusion protein complex of the invention can be determined by known procedures. For example, expression of a fusion protein complex linked to an immunoglobulin can be determined by an ELISA specific for the linked immunoglobulin and/or by immuno-blotting. Other methods for detecting expression of fusion proteins comprising biologically active polypeptides linked to IL12 or IL12R domains are disclosed in the Examples.

A host cell can be used for preparative purposes to propagate nucleic acid encoding a desired fusion protein or a component thereof. A host cell can include a prokaryotic or eukaryotic cell in which production of the fusion protein is specifically intended. Thus, host cells specifically include yeast, fly, worm, plant, frog, mammalian cells and organs that are capable of propagating nucleic acid encoding the fusion. Non-limiting examples of mammalian cell lines which can be used include CHO dhfr-cells (Urlaub and Chasm, 1980 *Proc. Natl. Acad. Sci. USA,* 77:4216), 293 cells (Graham et al. 1977 J Gen. Virol., 36:59) or myeloma cells like SP2 or NSO (Galfre and Milstein, 1981 *Meth. Enzymol.,* 73(B):3).

Host cells capable of propagating nucleic acid encoding a desired fusion protein complex encompass non-mammalian eukaryotic cells as well, including insect (e.g., Sp. *frugiperda*), yeast (e.g., *S. cerevisiae, S. pombe, P. pastoris, K. lactis, H. polymorpha*; as generally reviewed by Fleer, R., 1992 *Current Opinion in Biotechnology,* 3(5):486496), fungal and plant cells. Also contemplated are certain prokaryotes such as *E. coli* and *Bacillus*.

Nucleic acid encoding a desired fusion protein can be introduced into a host cell by standard techniques for transfecting cells. The term "transfecting" or "transfection" is intended to encompass all conventional techniques for introducing nucleic acid into host cells, including calcium phosphate co-precipitation, DEAE-dextran-mediated transfection, lipofection, electroporation, microinjection, viral transduction and/or integration.

Various promoters (transcriptional initiation regulatory region) may be used according to the invention. The selection of the appropriate promoter is dependent upon the proposed expression host. Promoters from heterologous sources may be used as long as they are functional in the chosen host.

Promoter selection is also dependent upon the desired efficiency and level of peptide or protein production. Inducible promoters such as tac are often employed in order to dramatically increase the level of protein expression in *E. coli*. Overexpression of proteins may be harmful to the host cells. Consequently, host cell growth may be limited. The use of inducible promoter systems allows the host cells to be cultivated to acceptable densities prior to induction of gene expression, thereby facilitating higher product yields.

Various signal sequences may be used according to the invention. A signal sequence which is homologous to the biologically active polypeptide coding sequence may be used. Alternatively, a signal sequence which has been selected or designed for efficient secretion and processing in the expression host may also be used. A signal sequence may be joined directly through the sequence encoding the signal peptidase cleavage site to the protein coding sequence, or through a short nucleotide bridge.

The expression construct can be assembled by employing known recombinant DNA techniques. Restriction enzyme digestion and ligation are the basic steps employed to join two fragments of DNA. Polylinkers and adaptors may be employed to facilitate joining of selected fragments. The expression construct can typically be assembled in stages employing rounds of restriction, ligation, and transformation of *E. coli*. Numerous cloning vectors suitable for construction of the expression construct are known in the art (λZAP and pBLUESCRIPT SK-1, Stratagene, La Jolla, Calif, pET, Novagen Inc., Madison, Wis., pEE12.4, Lonza Biologics, Basel, Switzerland).

The expression construct may be transformed into the host as the cloning vector construct, either linear or circular, or may be removed from the cloning vector and used as is or introduced onto a delivery vector. The delivery vector facilitates the introduction and maintenance of the expression construct in the selected host cell type. The expression construct is introduced into the host cells by any of a number of known gene transfer systems (e.g., natural competence, chemically mediated transformation, protoplast transformation, electroporation, biolistic transformation, transfection, or conjugation). The gene transfer system selected depends upon the host cells and vector systems used.

The present invention further provides a production process for isolating a fusion protein of interest. In the process, a host cell (e.g., a yeast, fungus, insect, bacterial or animal cell), into which has been introduced a nucleic acid encoding the protein of the interest operatively linked to a regulatory sequence, is grown at production scale in a culture medium to stimulate transcription of the nucleotides sequence encoding the fusion protein of interest. Subsequently, the fusion protein of interest is isolated from harvested host cells or from the culture medium. Standard protein purification techniques can be used to isolate the protein of interest from the medium or from the harvested cells. In particular, the purification techniques can be used to express and purify a desired fusion protein on a large-scale (i.e. in at least milligram quantities) from a variety of implementations including roller bottles, spinner flasks, tissue culture plates, bioreactor, or a fermentor.

An expressed protein fusion complex can be isolated and purified by known methods. Typically, the culture medium is centrifuged or filtered and then the supernatant is purified by affinity or immunoaffinity chromatography, e.g. Protein-A or Protein-G affinity chromatography or an immunoaffinity protocol comprising use of monoclonal antibodies that bind the expressed fusion complex such as a linked TCR or immunoglobulin region thereof. The fusion proteins of the present invention can be separated and purified by appropriate combination of known techniques. These methods include, for example, methods utilizing solubility such as salt precipitation and solvent precipitation, methods utilizing the difference in molecular weight such as dialysis, ultra-filtration, gel-filtration, and SDS-polyacrylamide gel electrophoresis, methods utilizing a difference in electrical charge such as ion-exchange column chromatography, methods utilizing specific affinity such as affinity chromatography, methods utilizing a difference in hydrophobicity such as reverse-phase high performance liquid chromatography and methods utilizing a difference in isoelectric point, such as isoelectric focusing electrophoresis, metal affinity columns such as Ni-NTA. (Sambrook et al., *Molecular Cloning: A Laboratory Manual* (2nd ed. (1989); and Ausubel et al., *Current Protocols in Molecular Biology*, John Wiley & Sons, New York (1989) for disclosure relating to these methods.)

It is preferred that the fusion proteins of the present invention be substantially pure. That is, the fusion proteins have been isolated from cell substituents that naturally accompany it so that the fusion proteins are present preferably in at least 80% or 90% to 95% homogeneity (w/w). Fusion proteins having at least 98 to 99% homogeneity (w/w) are most preferred for many pharmaceutical, clinical and research applications. Once substantially purified the fusion protein should be substantially free of contaminants for therapeutic applications. Once purified partially or to substantial purity, the soluble fusion proteins can be used therapeutically, or in performing in vitro or in vivo assays as disclosed herein. Substantial purity can be determined by a variety of standard techniques such as chromatography and gel electrophoresis.

The invention also provides a pharmaceutical preparation comprising a therapeutically effective amount of a composition, a fusion protein, a polynucleotide, a gene construct, a vector or a host cell according to the invention and a pharmaceutically acceptable excipient or vehicle.

Preferred excipients for use in the present invention include sugars, starches, celluloses, gums and proteins. In a preferred embodiment, the pharmaceutical composition of the invention is formulated in a pharmaceutical form for administration as a solid (for example tablets, capsules, lozenges, granules, suppositories, crystalline or amorphous sterile solids that can be reconstituted to provide liquid forms, etc.), liquid (for example solutions, suspensions, emulsions, elixirs, lotions, unguents, etc.) or semi-solid (gels, ointments, creams and similar). The pharmaceutical compositions of the invention can be administered by any route, including, without limitation, oral, intravenous, intramuscular, intraarterial, intramedullary, intratecal, intraventricular, transdermic, subcutaneous, intraperitoneal, intranasal, enteric, topical, sublingual or rectal route. A revision of the different forms of administration of active principles, the excipients to be used and their manufacturing procedures can be found in Remington's Pharmaceutical Sciences (A.

R. Gennaro, Ed.), 20*th* edition, Williams & Wilkins PA, USA (2000) Examples of pharmaceutically acceptable vehicles are known in the state of the technique and include saline solutions buffered with phosphate, water, emulsions, such as oil/water emulsions, different types of humidifying agents, sterile solutions, etc. The compositions comprising said vehicles can be formulated by conventional procedures known in the state of the technique.

In the case of the pharmaceutical composition of the invention comprising nucleic acids (the polynucleotides of the invention, vectors or gene constructs), the invention contemplates specially prepared pharmaceutical compositions for administering said nucleic acids. The pharmaceutical compositions can comprise said nucleic acids in naked form, in other words, in the absence of compounds protecting the nucleic acids from degradation by the organism's nucleases, which entails the advantage of eliminating the toxicity associated to the reagents used for transfection. Suitable routes of administration for the naked compounds include intravascular, intratumoral, intracraneal, intraperitoneal, intrasplenic, intramuscular, subretinal, subcutaneous, mucous, topical and oral route (Templeton, 2002 *DNA Cell Biol.*, 21:857-867). Alternatively, the nucleic acids can be administered forming part of liposomes, conjugated to cholesterol or conjugated to compounds capable of promoting translocation through cell membranes such as the Tat peptide derived from the TAT protein of HIV-1, the third helix of the homeodomain of the Antennapedia protein of *D. melanogaster*, the VP22 protein of the herpes simplex virus, oligomers of arginine and peptides such as those described in WO07069090 (Lindgren, et al. 2000 *Trends Pharmacol. Sci* 21:99-103; Schwarze, et al. 2000 *Trends Pharmacol. Sci.* 21:45-48; Lundberg, et al. 2003 *Mol. Therapy* 8:143-150; and Snyder, et al. 2004 *Pharm. Res.* 21:389-393). Alternatively, the polynucleotide can be administered forming part of a plasmidic vector or of a viral vector, preferably vectors based on an adenovirus, in adeno-associated viruses or in retroviruses, such as viruses based on the virus of murine leukaemia (MLV) or on lentiviruses (HIV, FIV, EIAV).

The compositions of the invention can be administered at doses of less than 10 mg per kilogram of body weight, preferably less than 5, 2, 1, 0.5, 0.1, 0.05, 0.01, 0.005, 0.001, 0.0005, 0.0001, 0.00005 or 0.00001 mg per each kg of body weight and less than 200 nmol of agent, in other words, approximately $4.4 \times 10^{16}$ copies per kg of body weight or less than 1500, 750, 300, 150, 75, 15, 7.5, 1.5, 0.75, 0.15 or 0.075 nmol per Kg of body weight. The unitary dose can be administered by injection, by inhalation or by topical administration. The bifunctional polynucleotides and compositions of the invention can be administered directly into the organ in which the target mRNA is expressed in which case doses will be administered of between 0.00001 mg and 3 mg per organ, or preferably between 0.0001 and 0.001 mg per organ, about 0.03 and 3.0 mg per organ, about 0.1 and 3.0 mg per organ or between 0.3 and 3.0 mg per organ.

The dose will depend on the severity and response to the condition to be treated and may vary between several days and several months or until the condition is seen to remit. The optimum dose can be determined by periodically measuring the agent's concentrations in the patient's organism. The optimum dose can be determined from the EC50 values obtained through previous in vitro or in vivo tests in animal models. The unitary dose can be administered once a day or less than once a day, preferably, less than once every 2, 4, 8 or 30 days. Alternatively, it is possible to administer an initial dose followed by one or several maintenance doses, generally in a lesser amount that the initial dose. The maintenance regime may involve treating the patient with doses ranging between 0.01 µg and 1.4 mg/kg of body weight per day, for example, 1, 0.1, 0.01, 0.001, or 0.00001 mg per kg of body weight per day. Maintenance doses are administered, preferably, at most once every 5, 10 or 30 days. The treatment must continue for a time that will vary according to the type of alteration suffered by the patient, its severity and the patient's condition. Following treatment, the patient's evolution must be monitored in order to determine whether the dose ought to be increased in the case of the disease not responding to the treatment or whether the dose ought to be decreased in the case of observing an improvement in the disease or unwanted secondary effects.

The daily dose can be administered in a single dose or in two or more doses according to the particular circumstances. If a repeated administration or frequent administrations are required, it is advisable to implant an administration device, such as a pump, a semi-permanent catheter (intravenous, intraperitoneal, intracisternal or intracapsular) or a reservoir.

The compositions of the invention are administered according to methods known to an expert in the art, including, without limitation, intravenous, oral, nasal, parenteral, topical, transdermic, rectal and similar.

The following examples are meant to be illustrative of the practice of the invention and not limiting in any way.

EXAMPLES

The below Examples describe certain exemplary embodiments of compounds prepared according to the disclosed invention. It will be appreciated that the following general methods, and other methods known to one of ordinary skill in the art, can be applied to compounds and subclasses and species thereof, as disclosed herein.

Example 1. Construction of Fusion Proteins

A. Construction of the Four Fusion Proteins
Construction of Control Protein: IL15-Fc Mouse IL15 was fused to the N terminal of hIgG Fe (named as IL15-Fc), FIG. 1A. The amino acid sequence of mouse IL15 was SEQ ID No. 1. The amino acid sequence of hIgG Fc was SEQ ID No. 3.
Two Formats of Super IL15:

The schematic representations of IL15Rαsushi-IL15-Fc (named as RA-IL15-Fc) and IL15-IL15Rαsushi-Fc (named as IL15-RA-Fc) are showed as FIG. 1B and FIG. 1C. Similar in biological activity, both structures are referred to interchangeably as super IL15. The amino acid sequence of mouse IL15Rαsushi is SEQ ID No. 4. The amino acid sequence of human IL15Rαsushi is SEQ ID No. 5. The sequence of the linker between IL15Rαsushi and IL15 is SEQ ID No. 8. Mouse RA-IL15-Fc and IL15-RA-Fc are fully represented by SEQ ID No. 24 and SEQ ID No. 26. Human RA-IL15-Fc and IL15-RA-Fc are fully represented by SEQ ID No. 25 and SEQ ID No. 27.
Prodrugs:

The ECD (extracellular domain) of IL15Rβ was fused to the N terminal of IL15-RA-Fe, connected by a linker segment L2.

The schematic representation of IL15RβECD-L2-IL15-IL15Rαsushi-Fc (named as RB-IL15-RA-Fc) is shown in FIG. 1D. The amino acid sequence of mouse IL15RβECD is SEQ ID No. 6. The amino acid sequence of human IL15RβECD is SEQ ID No. 7. Linker segment L2 is a substrate of MMP9 or MMP14. The amino acid sequence of the MMP9 substrate linker is SEQ ID No. 10. The MMP14 substrate linker amino acid sequences are SEQ ID Nos. 11-23.

B. Construction, Transfection, Expression and Purification of Fusion Protein

The genes were cloned into an expression vector, such as pEE12.4. Plasmids were transiently transfected into 293F cells. Supernatants were collected on days 4-7 post-transfection. The fusion protein was purified using a Protein A Sepharose. All protein was quantified by ELISA and SDS-PAGE.

The detailed protocols were as follows.

Construction of Fusion Protein

IL15, IL15RA and IL15RB ECD were synthesized and cloned into a pEE12.4-IgGκ-hIgG1 Fc plasmid, which contained the mouse IgGκ leading sequence and human IgG1 Fc. Plasmids were extracted using a standard commercial plasmid extraction kit and stored in −80° C.

Transfection of Fusion Protein 293F cells were cultured in using CD OptiCHO™ medium and incubated in a 37° C., 8% $CO_2$ incubator shaking at 135 rpm. Cells were plated at a density of $0.6$-$0.8 \times 10^6$ cells/mL 2 days before transfection. Cells were collected at density of about $2.5$-$3.5 \times 10^6$ cells/mL, washed using Freestyle 293 medium then resuspended in 200 mL of Freestyle 293. DNA (600 μg) was diluted using 5 mL Freestyle 293 and filtered through a 0.22 μm filter. PEI (1.8 mg) was diluted using 5 mL Freestyle 293 and filtered through a 0.22 μm filter. DNA and PEI were mixed and incubated for 5 min. at room temperature then mixed in a flask with the cells. Flasks were placed into a 37° C., 8% $CO_2$ incubator shaking at 85 rpm. 200 mL EX-CELL™ 293 medium was added four hours after transfection at 135 rpm. Twenty hours after transfection, 3.8 mM VPA was added. Supernatants were collected on day 4 to 7 after transfection while cell viability was above 70%.

Purification of Fusion Protein

The fusion protein was purified using a Protein A-Sepharose column according to the manual (Repligen Corporation).

Binding buffer: 20 mM sodium phosphate, pH 7.0
Elution buffer: 0.1 M Glycine, pH2.7
Regeneration Buffer: 1M NaOH
Neutralizing buffer: 1 M Tris-HCl, pH 9.0
All buffers were filtered with 0.45 μm filter.
(1) Samples were centrifuged at 8000×rpm for 2 hr to remove cells then filtered through a 0.45 μm filter. $NaN_3$ was added to the final concentration of 0.05% to prevent bacterial growth.
(2) If the column was preserved using 20% ethanol, it was washed with 5 column volumes of distilled water at a linear flow rate of 50 to 100 cm/h.
(3) The column was washed with 5 to 10 column volumes of Elution Buffer to wash away impurities;
(4) The column was equilibrated with 5 to 10 column volumes of Binding Buffer at a linear flow rate of 50 to 100 cm/hr.
(5) The pretreated sample was applied to the column.
(6) The column was washed with 5 to 10 column volumes Binding Buffer.
(7) Columns were eluted into 1.5 mL collection tubes.

Figure 2:
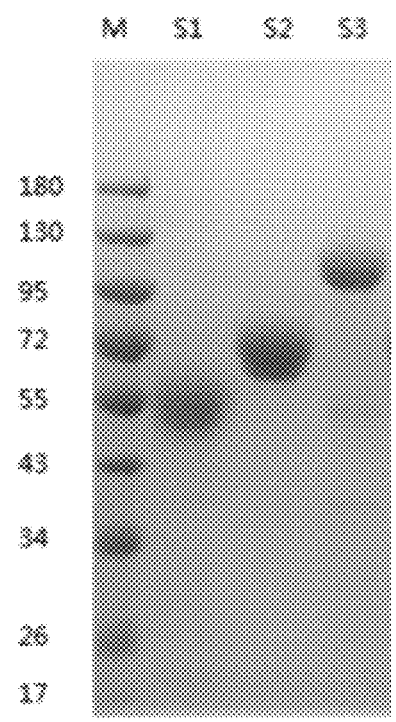
FIG. 2 shows an exemplary SDS-PAGE electropherogram of three fusion proteins.

The results of SDS-PAGE electrophoresis of the purified fusion protein are shown in FIG. 2, in which lane S1 was loaded with IL15-Fc, lane S2 was loaded with super IL15, and the lane S3 was loaded with RB-IL15-RA-Fc.

Example 2. Biological Function of Super IL15 Fusion Protein

A. The Function of Promoting Lymphocyte Proliferation

Interleukin 15 (IL-15) was first characterized by its ability to stimulate proliferation of the murine T cell line CTLL-2. In this protocol, CTLL-2 cells are cultured in the presence of serial dilutions of murine IL-15 and their growth is measured by CCK8.

The following procedure was used:
(1) Use CTLL-2 assay medium supplemented with 100U/mL recombinant human IL-2 to culture CTLL2 cells.
(2) Collect CTLL-2 cells in log-phase growth 24 to 48 h after passage and wash them twice to remove residual IL-2. Resuspend cells in 5 to 10 mL CTLL-2 assay medium, count cells, and adjust to a concentration of $2 \times 10^4$ cells/mL.
(3) Use CTLL-2 assay medium to dilute samples. The first top concentration is 10 μg/mL. Perform 1:10 serial dilutions over 7 tubes.
(4) Add 100 μL of cell suspension to each flat-bottom 96-well plate ($2 \times 10^3$ cells/well); Add 100 μL of samples to each well. Include a row of wells containing 200 μL assay medium only as a negative control.
(5) Cover plate and incubate 48 to 72 hrs.
(6) Add 20 μL of CCK8. After 2~4 hrs, Read the OD450 and OD630 of each well using a microtiter plate reader.

Figure 3:
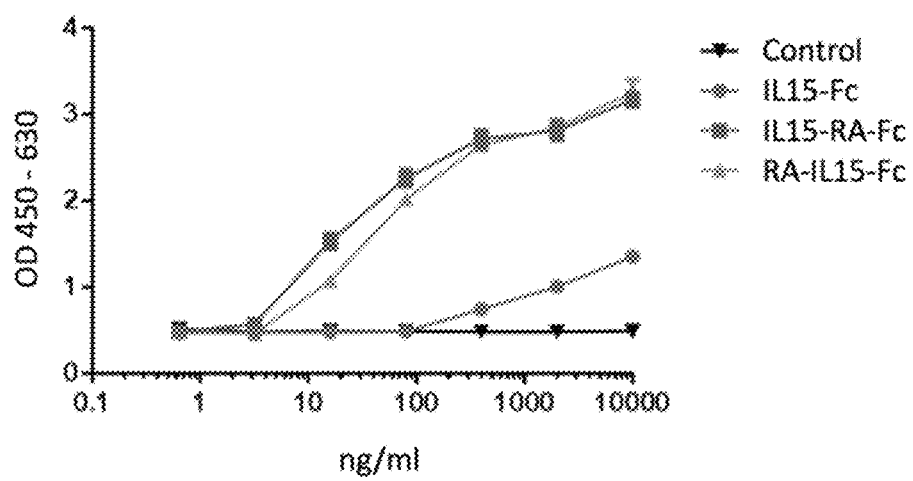
FIG. 3 shows exemplary results of lymphocyte proliferation assays by IL15-Fc and super IL15.

The results are shown in FIG. 3, which indicate that (1) the biological activities of the two forms of super IL15 were similar, that is, in the fusion protein, regardless of the IL15 fragment first, or the IL15Rαsushi fragment, the function of super IL15 was not affected; and (2) Super IL15 had an approximately 100-fold increase in biological activity compared to IL15-Fc.

B. The Fusion Fragment of IL15RβECD can Block the Biological Function of Super IL15

Figure 4:
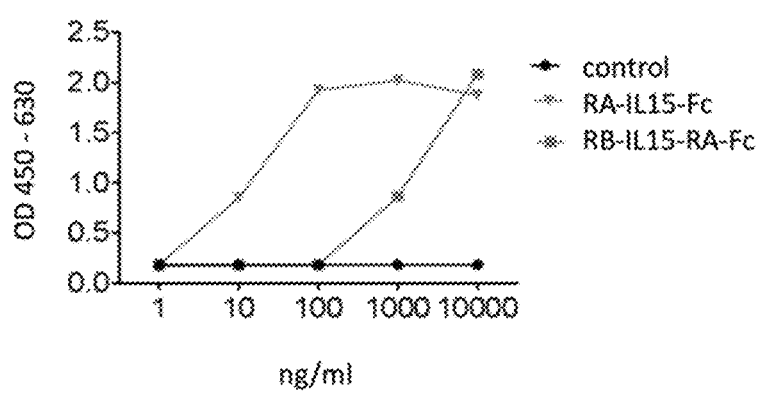
FIG. 4 shows exemplary results of lymphocyte proliferation assay by RB-IL15-RA-Fc and super IL15.

The proliferative ability of murine RB-IL15-RA-Fc and super IL15 to CTLL2 was examined by CCK8 assay. The results shown in FIG. 4 indicate the biological activity of RB-IL15-RA-Fc is reduced 100 times. This indicates that the extracellular domain of IL-15RD can block the biological function of super IL-15.

C. Anti-Tumor Effect and Systemic Toxicity in Different Tumor Models

A20 Model

Experiment 1 (25 μg): A20 cells ($3 \times 10^6$) were subcutaneously injected into the right flank of Balb/c mice. Mice bearing tumors (60-80 mm³) were treated intratumorally (i.t.) and intravenously (i.v.) with 25 μg super IL15 on day 10 and day 13. The control group were treated with PBS. Tumor volume=length×width×height/2. The tumor growth curve was recorded.

Figure 5A:
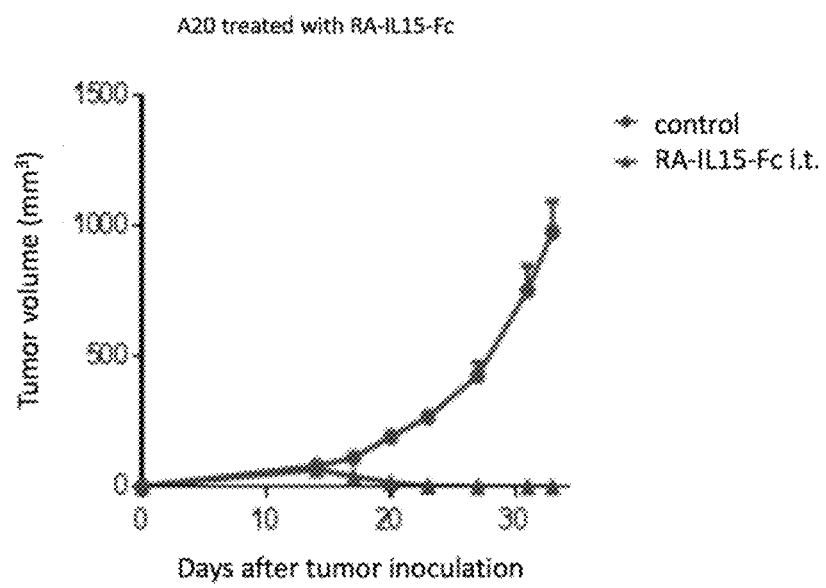
FIG. 5A shows exemplary data of super IL15 therapeutic effects through intratumoral injection.
Figure 5B:
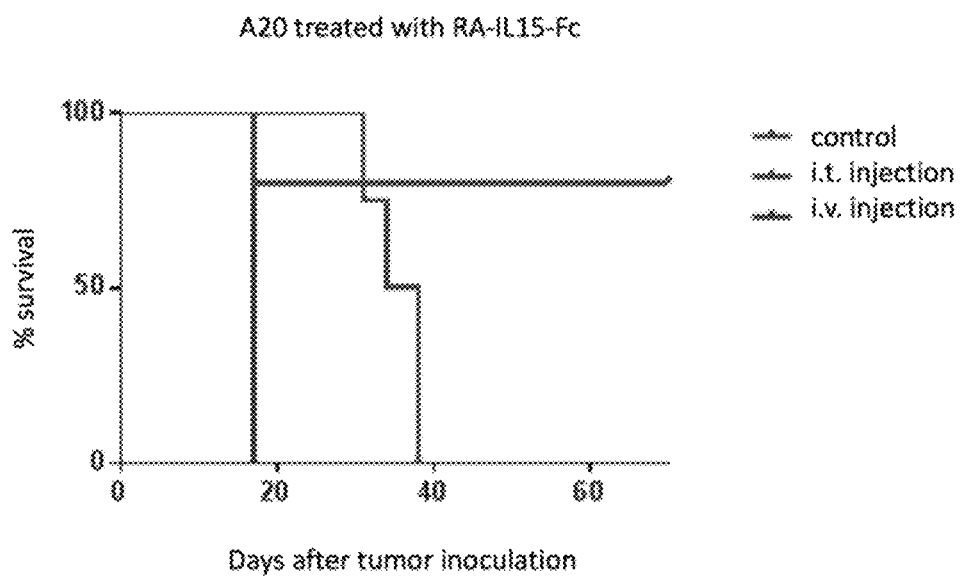
FIG. 5B shows exemplary data of survival of mice after intratumoral and intraperitoneal injection.
Figure 5C:
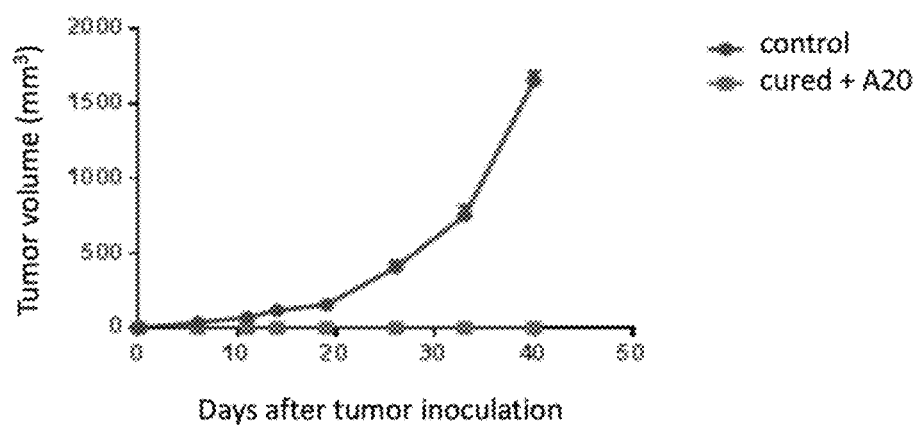
FIG. 5C shows exemplary data on tumor-cured mice re-challenged with A20 tumor cells.

Results: (1) In the intratumoral treatment group, tumors from all mice showed complete regression (FIG. 5A). Mice that had already undergone complete tumor regression were re-challenged with a lethal amount of A20 cells. All mice rejected the re-challenged tumor, indicating a strong memory response. (FIG. 5C). (2) All mice died at the second dose of iv treatment indicating severe systemic toxicity (FIG. 5B).

Experiment 2 (12.5 μg): A20 cells ($3 \times 10^6$) were subcutaneously injected into the right flank of Balb/c mice. Mice bearing tumors (60-80 mm³) were treated intratumorally (i.t.) and intravenously (i.v.) with 12.5 g super IL15 on day 10 and day 13. The control group was treated with PBS. Tumor volume was defined as length×width×height/2. The tumor growth curve was recorded.

Figure 7:
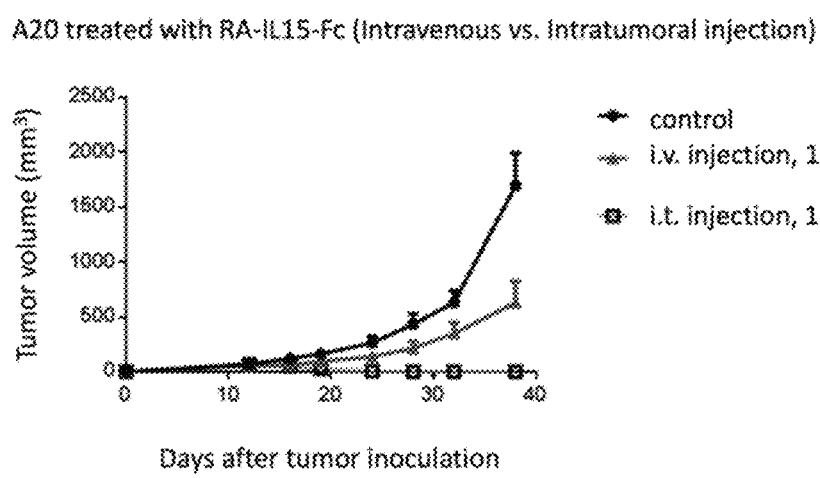
FIG. 7 shows exemplary data on the therapeutic effects of super IL15 in the A20 mouse model given a lower dose.

Result (FIG. 7): In the treatment group administered intratumorally, 100% of the mice had complete regression.

In contrast, 20% of mice that were treated intravenously had complete regression and the remaining mouse tumors were partially controlled.

MC38 Model

Experiment: MC38 cells ($5\times10^5$) were subcutaneously injected into the right flank of C57 mice. Mice bearing tumors (60 mm$^3$) were treated intratumorally (i.t.) and intravenously (i.v.) with 25 μg super IL15 on day 7 and day 10. The control group were treated with PBS. Tumor volume=length×width×height/2. The tumor growth curve was recorded.

Figure 6A:
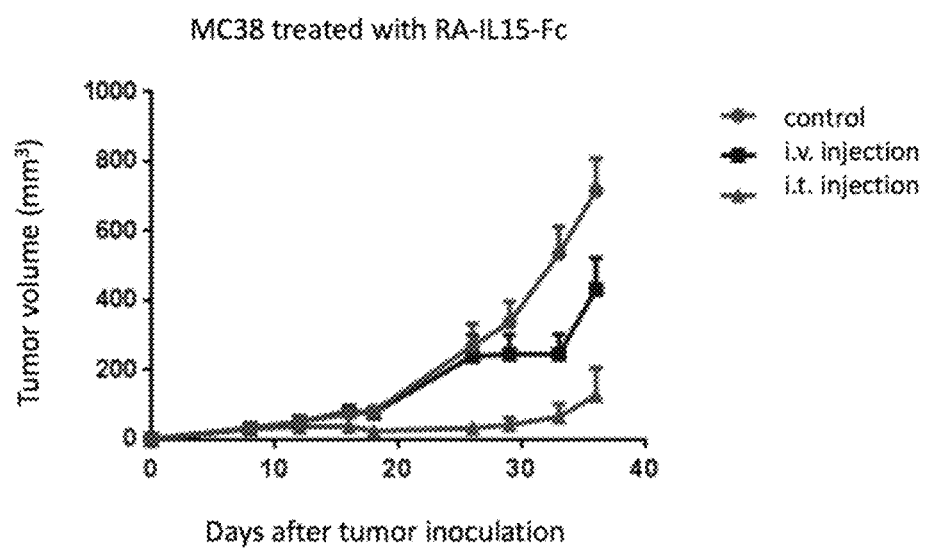
FIG. 6A shows exemplary data on super IL15 therapeutic effects through intratumoral and intravenous injection.
Figure 6B:
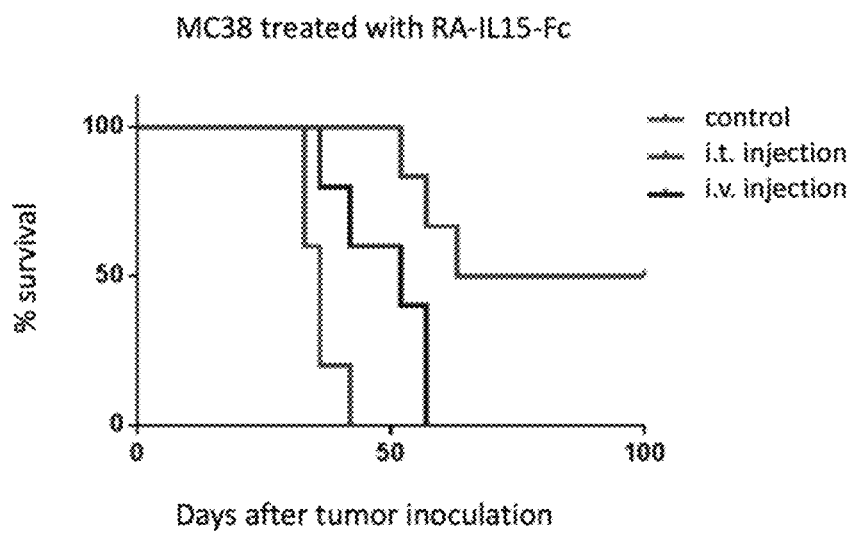
FIG. 6B shows exemplary data on survival of mice after treatment.

Result: in the treatment group administered intratumorally, 50% of the mice had complete regression (FIG. 6A), and the survival was significantly increased (FIG. 6B). In contrast, mice administered intravenously did not have complete tumor regression (FIG. 6A) and mice survival increased slightly (FIG. 6B).

The above results indicate that super IL15 seems to function locally in the tumor microenvironment (TME)

Example 3. Comparison of Tumor Treatment Effects and Side Effects of Super IL15 and RB-IL15-RA-Fc A20 cells ($3\times10^6$) were subcutaneously injected into the right flank of Balb/c mice. Mice bearing tumors (60~80 mm$^3$) were treated intraperitoneally (i.p.) with 12.5 μg of super IL15 or Rβ-IL15-RA-Fc on day 10 and day 13. Tumor growth was measured twice per week. Serum was collected at 20 hr after the second injection. Cytokine levels in the serum were measured by Cytometric Bead Array (CBA) and the tumor curve was recorded.

The following CBA protocol was used:
(1) Serum was collected from the ophthalmic vein and stored in −80° C.;
(2) IL12p70, IL-6, IFN-γ, TNFα, MCP1 and IL-10 in the serum were evaluated using a CBA kit from BD
(3) The standard was reconstituted with 2.0 mL of Assay Diluent then recalibrated for at least 15 min. at room temperature. The standard was serially diluted at ratios: 1:2, 1:4, 1:8, 1:16, 1:32, 1:64, 1:128, and 1:256.
(4) Th1/Th2/Th17 Cytokine Capture Beads were mixed. The number of assay tubes (including standards and controls) required for the experiment was determined. Each Capture Bead suspension was vigorously vortexed for 3 to 5 seconds before mixing. Add a 2 μL aliquot of each Capture Bead, for each assay tube to be analyzed, into a single tube. 10 μL aliquots of the Mouse Th1/Th2/Th17 PE Detection Reagent were added to the tube and vortexed thoroughly.
(5) The Th1/Th2/Th17 Cytokine Assay was performed: The mixed Capture Beads was vortexed and 20 μL was added to all assay tubes. 50 μL of the Mouse Th1/Th2/Th17 Cytokine Standard dilutions was added to the control tubes. 50 μL of each unknown sample was added to the appropriately labeled sample assay tubes. Assay tubes were incubated for 2 hr at room temperature, protected from light.
(6) 1 mL of Wash Buffer was added to each assay tube and centrifuged at 300 g for 5 min.
(7) Supernatant was carefully aspirated and discard from each assay tube. 300 μL of Wash Buffer was added to each assay tube to resuspend the bead pellet.
(8) Samples were analyzed via flow cytometry and the level of cytokine was calculated according the standard.

Figure 8A:
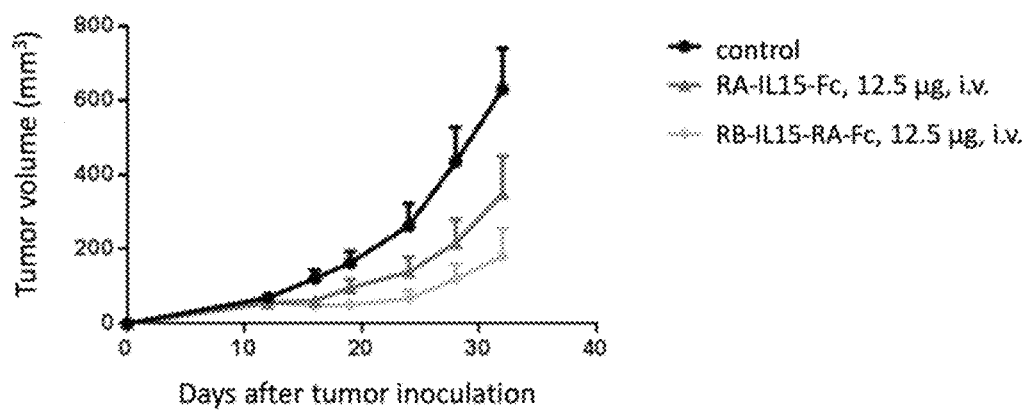
FIG. 8A shows exemplary tumor growth curve of mice after treatment.

The therapeutic effect is shown in FIG. 8A, indicating that the therapeutic effect of RB-IL15-RA-Fc administered intravenously is similar to that of super IL15.

Figure 8B:
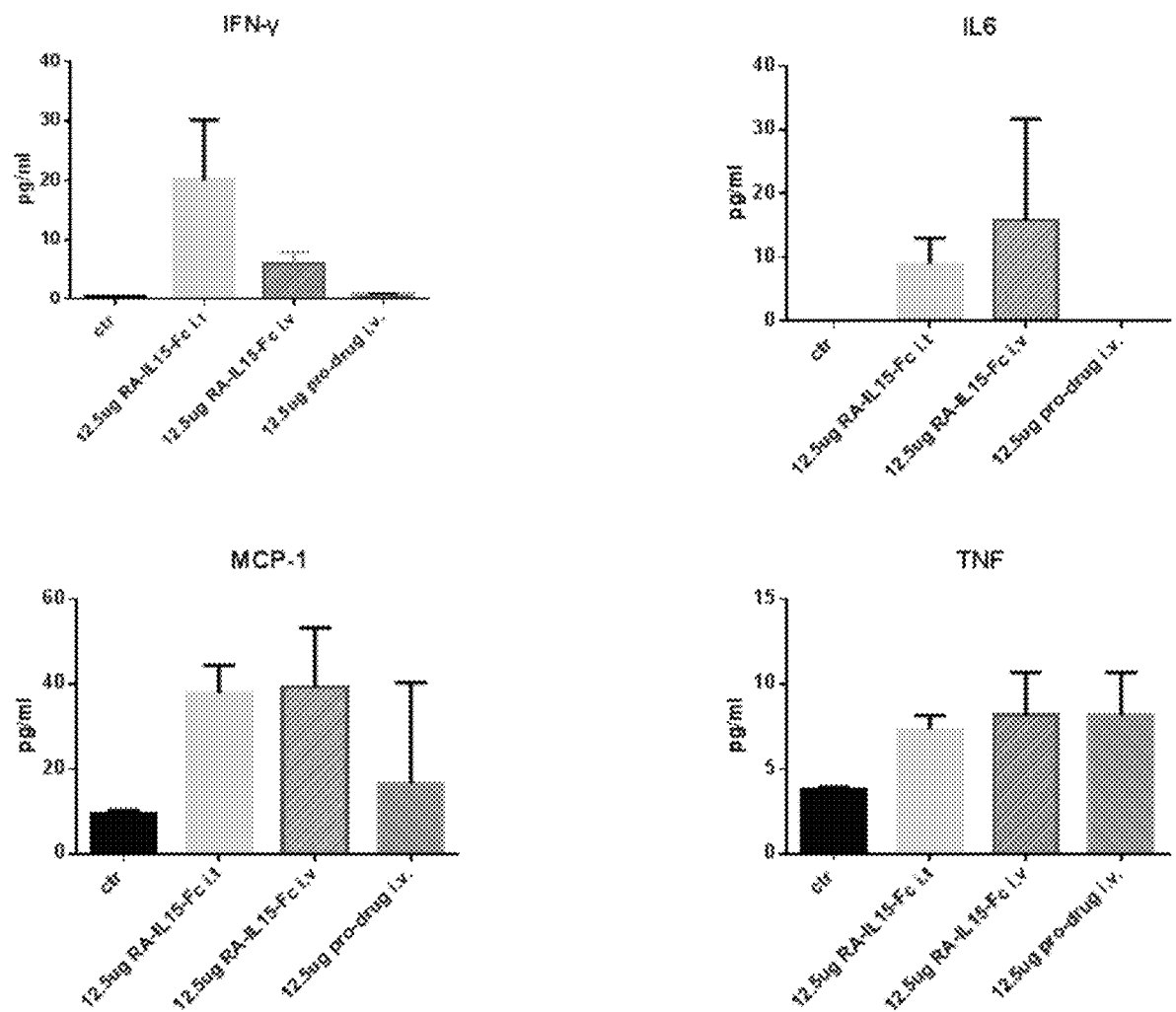
FIG. 8B shows exemplary level of cytokines in the serum after treatment.

The results of the comparison of serum inflammatory factor levels are shown in FIG. 8B, indicating that the toxic side effects of RB-IL15-RA-Fc are significantly reduced compared to super IL15.

A20 cells ($3\times10^6$) were subcutaneously injected into the right flank of Balb/c mice. Mice bearing tumors (60~80 mm$^3$) were treated intraperitoneally (i.p.) with 25 μg of super IL15 or RB-IL15-RA-Fc on day 10 and day 13. Tumor growth was measured twice per week. Serum was collected at 20 hrs after the second injection. Cytokine levels in the serum were measured by Cytometric Bead Array (CBA) and the tumor curve was recorded.

Figure 9A:
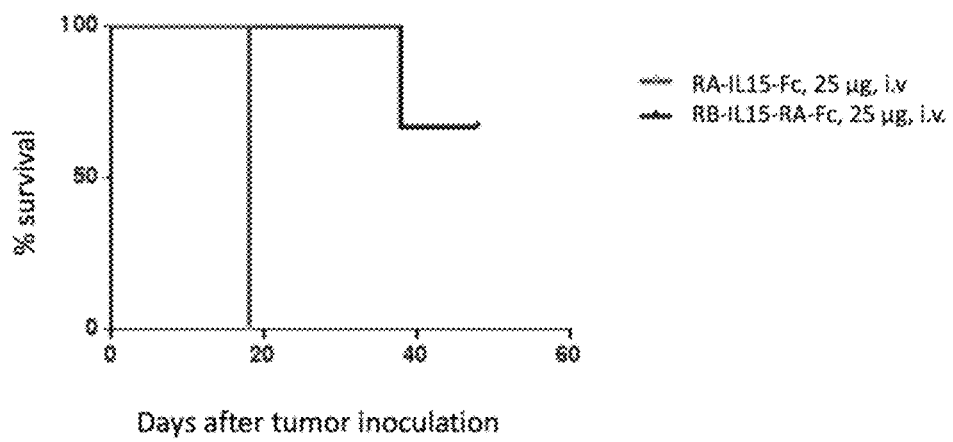
FIG. 9A shows exemplary survival of mice after treatment.
Figure 9B:
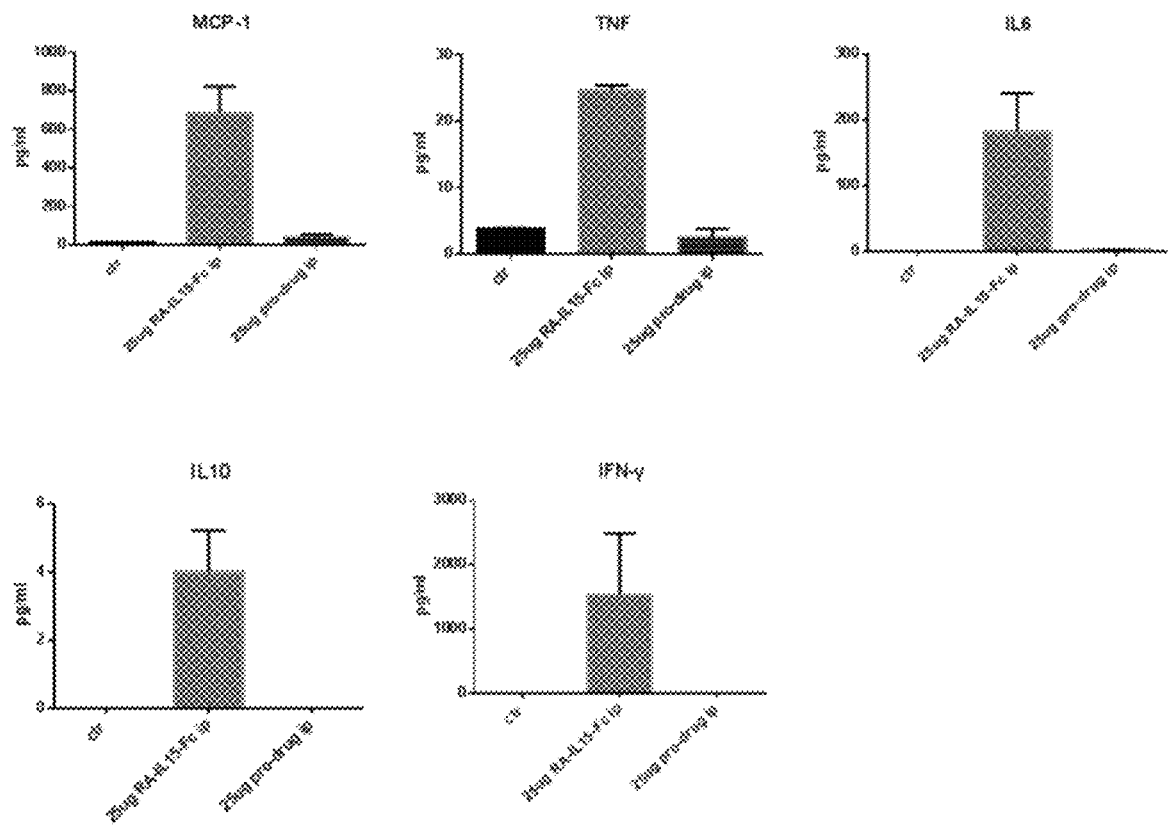
FIG. 9B shows exemplary level of cytokines in the serum after treatment.

Result: After tumor re-challenge and treatment with super IL15, tumor-bearing mice were significantly sick with severe weight loss, reduced mobility, ruffled fur, and all died within one day after the second treatment. In contrast, none of the mice treated with RB-IL15-RA-Fc died and none of the mice appeared unhealthy. The survival curve of RB-IL15-RA-Fc was significantly longer than the super IL15. The survival curve is shown in FIG. 9A, and the serum inflammatory factor levels are shown in FIG. 9B.

Taken together, RB-IL15-RA-Fc reduced the toxic side-effects of super IL15.

Analogous human versions of various IL15 fusion proteins and prodrugs were also produced and tested in vitro. Human protein production was done following the cloning, transfection and purification protocol described previously for murine protein production.

Recombinant Human MMP-14/MT1-MMP (R&D Systems) was activated and incubated with IL15 fusion proteins to confirm prodrug activation and cleavage at the L2 linker site at 37° C. for 24 hrs.

Figure 10:
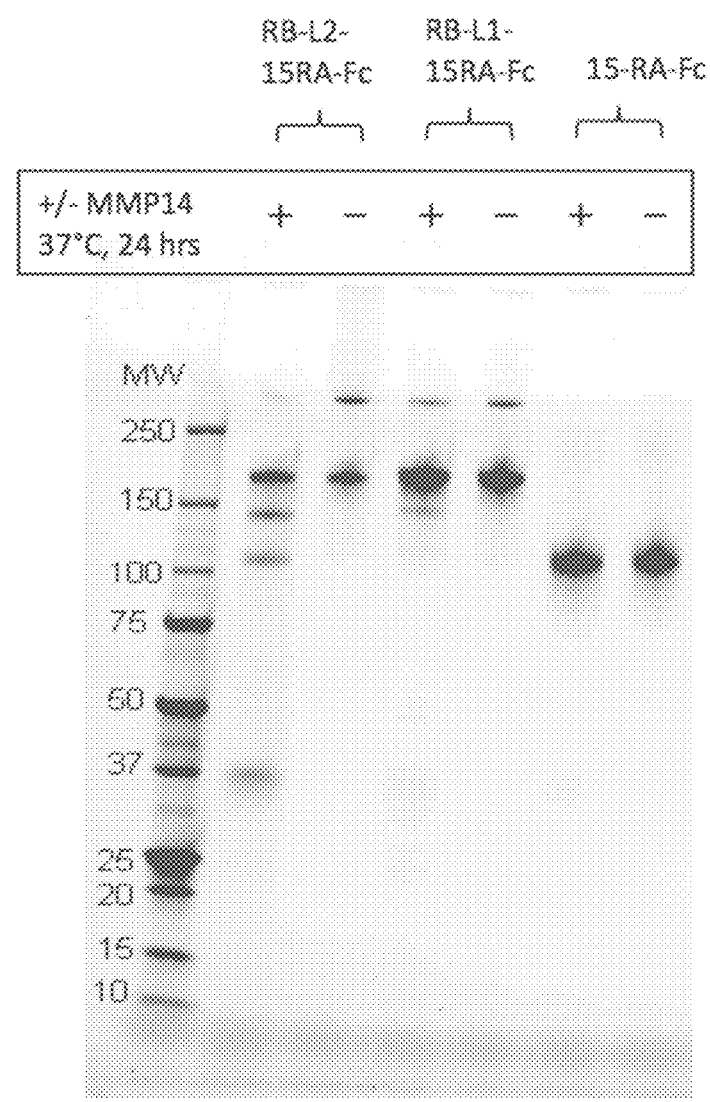
FIG. 10 shows an exemplary SDS-PAGE electropherogram of the purified human IL15 fusion proteins with or without MMP14 digestion. RB-IL15-RA-Fc is displayed as RB-L1-15RA-Fc or RB-L2-15RA-Fc to emphasize whether L1 or L2 is used as the linker segment attached to RB. IL15-RA-Fc is displayed as 15RA-Fc.

The results of SDS-PAGE electrophoresis of the purified human fusion protein incubated with or without MMP14 at 37° C. for 24 hrs are shown in FIG. 10.

Human RB-IL15-RA-Fc functionality was measured using the HEK-Blue™ IL2 reporter cell assay (Invivogen). Upon IL-2 stimulation, HEK-Blue™ IL-2 cell trigger the activation of STAT5 and the subsequence secretion of SEAP. The levels of STAT5-induced SEAP can be readily monitored using QUANTI-Blue™. Since IL15 binds to and signals through a complex composed of IL-2/IL-15 receptor β chain and the common γ chain, the HEK-Blue™ IL-2 cell line could also be used to measure IL15 and/or pro-IL15 functional activity.

The following HEK-Blue IL-2 reporter assay was used:
(1) HEK-Blue IL-2 cells were gently rinsed in PBS and suspended in fresh, pre-warmed test medium (DMEM, 4.5 g/L glucose, 2 mM L-glutamine, 10% (v/v) heat-inactivated PBS (30 mins at 56° C. at ~$1\times10^6$ cells/mL.
(2) Samples were serially diluted in a flat-bottom 96-well plate and incubated in a CO$_2$ incubator with 50 μL of cell suspension (~50,000 cells) per well at 37° C. for 20-24 hrs.
(3) Incubate 20 μL of induced HEK-Blue IL-2 cell supernatant per well of a flat-bottom 96-well plate with 100 μL of resuspended QUANTI-Blue™ Solution per well in a 37° C. incubator for 15-min to 1 hr.
(4) Determine SEAP levels using a spectrophotometer at 650 nm.

Figure 11:
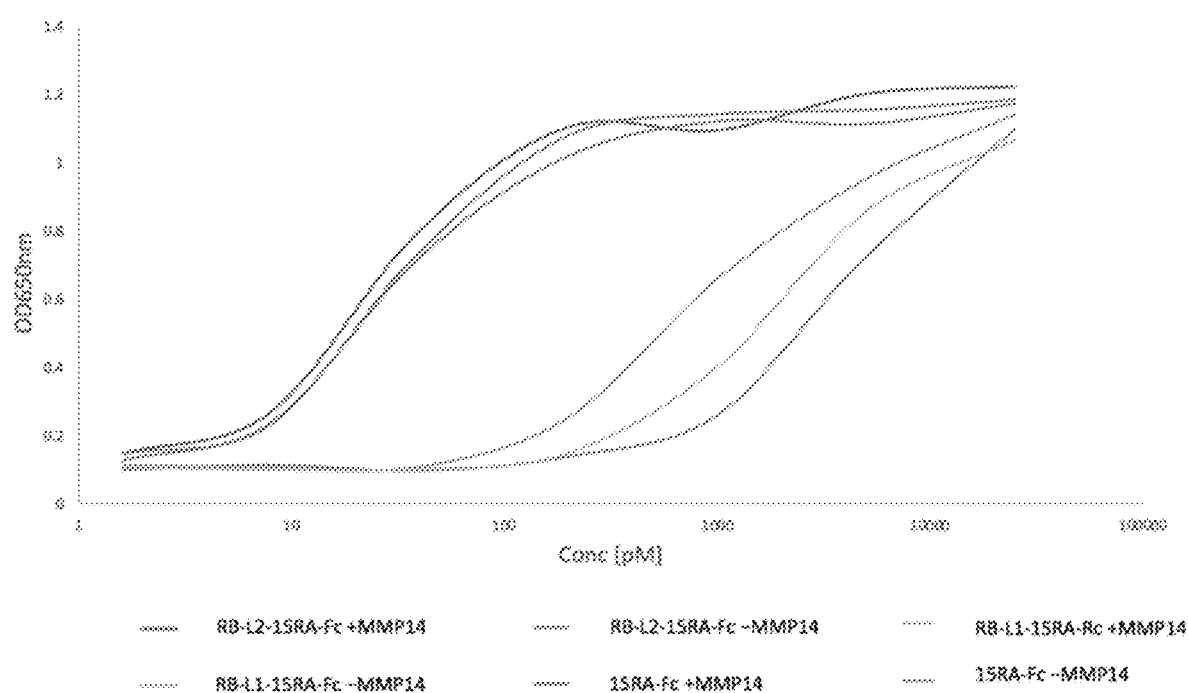
FIG. 11 shows exemplary results of human IL15 fusion protein activity with or without MMP14 incubation evaluated using a HEK-Blue™ IL2 reporter cell assay.

Result: FIG. 11 demonstrates that the RB-L2-15RA-Fc, constructed with an MMP14 substrate sequence embedded in the linker segment (L2) and incubated with MMP14, displayed function at the same level as 15RA-Fc with or without MMP14. Concordantly, RB-L1-15RA-Fc, constructed without an MMP14 substrate sequence embedded in the linker segment (L1), performed similarly to samples without MMP14. The construct notation 15RA is short for IL15-L1-RA.

```
SEQ Listing
SEQ ID No. 1: mouse IL15
NWIDVRYDLEKIESLIQSIHIDTTLYTDSDFHPSCKVTAMNCFLL

ELQVILHEYSNMTLNETVRNVLYLANSTLSSNKNVAESGCKECEE

LEEKTFTEFLQSFIRIVQMFINTS

SEQ ID No. 2: human IL15
NWVNVISDLKKIEDLIQSMHIDATLYTESDVHPSCKVTAMKCFLL

ELQVISLESGDASIHDTVENLIILANNSLSSNGNVTESGCKECEE

LEEKNIKEFLQSFVHIVQMFINTS

SEQ ID No. 3: human IgG1-Fc
EPKSSDKTHTCPPCPAPELLGGPSVFLFPPKPKDTLMISRTPEVT

CVVVDVSHEDPEVKFNWYVDGVEVHNAKTKPREEQYNSTYRVVSV

LTVLHQDWLNGKEYKCKVSNKALPAPIEKTISKAKGQPREPQVYT

LPPSRDELTKNQVSLTCLVKGFYPSDIAVEWESNGQPENNYKTTP

PVLDSDGSFFLYSKLTVDKSRWQQGNVFSCSVMHEALHNHYTQKS

LSLSPGK

SEQ ID No. 4: mouse Rα-sushi domain
GTTCPPPVSIEHADIRVKNYSVNSRERYVCNSGFKRKAGTSTLIE

CVINKNTNVAHWTTPSLKCIRDPSLAHYSPVPT

SEQ ID No. 5: human Rα-sushi domain
ITCPPPMSVEHADIWVKSYSLYSRERYICNSGFKRKAGTSSLTEC

VLNKATNVAHWTTPSLKCIRDPALVHQRPAPP

SEQ ID No. 6: mouse Rβ extracellular domain
AVKNCSHLECFYNSRANVSCMWSHEEALNVTTCHVAKSNLRHWN

KTCELTLVRQASWACNLILGSFPESQSLTSVDLLDINVVCWEEKG

WRRVKTCDFHPFDNLRLVAPHSLQVLHIDTQRCNISWKVSQVSHY

IEPYLEFEARRRLLGHSWEDASVLSLKQRQQWLFLEMLIPSTSYE

VQVRVKAQRNNTGTWSPWSQPLTFRTRPADPMKE

SEQ ID No. 7: human Rβ extracellular domain
AVNGTSQFTCFYNSRANISCVWSQDGALQDTSCQVHAWPDRRRWN

QTCELLPVSQASWACNLILGAPDSQKLTTVDIVTLRVLCREGVRW

RVMAIQDFKPFENLRLMAPISLQVVHVETHRCNISWEISQASHYF

ERHLEFEARTLSPGHTWEEAPLLTLKQKQEWICLETLTPDTQYEF

QVRVKPLQGEFTTWSPWSQPLAFRTKPAALGKDT

SEQ ID No. 8: linker segment L1
SGGGSGGGGSGGGGSGGGGSGGGSLQ

SEQ ID No. 9: linker segment L1
GGGGS

SEQ ID No. 10: linker segment L2 (MMP9)
GGGGSPVGLIGGGGGS

SEQ ID No. 11: linker segment L2 (MMP14)
GGGGSSGARYRWLTAGGGGS

SEQ ID No. 12: linker segment L2 (MMP14)
GGGGSSGRIGFLRTAGGGGS

SEQ ID No. 13: linker segment L2 (MMP14)
GGGGSSGAIGFLRTAGGGGS

SEQ ID No. 14: linker segment L2 (MMP14)
GGGGSSGRAMHMYTAGGGGS

SEQ ID No. 15: linker segment L2 (MMP14)
GGGGSSGAAMHMYTAGGGGS

SEQ ID No. 16: linker segment L2 (MMP14)
GGGGSSGRSENIRTAGGGGS

SEQ ID No. 17: linker segment L2 (MMP14)
GGGGSSGASENIRTAGGGGS

SEQ ID No. 18: linker segment L2 (MMP14)
GGGGSSGRPENIRTAGGGGS

SEQ ID No. 19: linker segment L2 (MMP14)
GGGGSSGAPENIRTAGGGGS

SEQ ID No. 20: linker segment L2 (MMP14)
GGGGSSGLISHSITAGGGGS

SEQ ID No. 21: linker segment L2 (MMP14)
GGGGSSGNLRSKLTAGGGGS

SEQ ID No. 22: linker segment L2 (MMP14)
GGGGSSGVFSIPLTAGGGGS

SEQ ID No. 23: linker segment L2 (MMP14)
GGGGSSGIKYHSLTAGGGGS

SEQ ID No. 24: mouse RA-IL 15-Fc
GTTCPPPVSIEHADIRVKNYSVNSRERYVCNSGFKRKAGTSTLIE

CVINKNTNVAHWTTPSLKCIRDPSLAHYSPVPTSGGGSGGGGSGG

GGSGGGGSGGGSLQNWIDVRYDLEKIESLIQSIHIDTTLYTDSDF

HPSCKVTAMNCFLLELQVILHEYSNMTLNETVRNVLYLANSTLSS

NKNVAESGCKECEELEEKTFTEFLQSFIRIVQMFINTSGGGGSEP

KSSDKTHTCPPCPAPELLGGPSVFLFPPKPKDTLMISRTPEVTCV

VVDVSHEDPEVKENWYVDGVEVHNAKTKPREEQYNSTYRVVSVLT

VLHQDWLNGKEYKCKVSNKALPAPIEKTISKAKGQPREPQVYTLP

PSRDELTKNQVSLTCLVKGFYPSDIAVEWESNGQPENNYKTTPPV

LDSDGSFFLYSKLTVDKSRWQQGNVFSCSVMHEALHNHYTQKSLS

LSPGK

SEQ ID No. 25: human RA-IL 15-Fc
ITCPPPMSVEHADIWVKSYSLYSRERYICNSGFKRKAGTSSLTEC

VLNKATNVAHWTTPSLKCIRDPALVHQRPAPPGGGSGGGGGGGS

GGGGSGGGSLQNWVNVISDLKKIEDLIQSMHIDATLYTESDVHPS

CKVTAMKCFLLELQVISLESGDASIHDTVENLIILANNSLSSNGN

VTESGCKECEELEEKNIKEFLQSFVHIVQMFINTSEPKSSDKTHT

CPPCPAPELLGGPSVFLFPPKPKDTLMISRTPEVTCVVVDVSHED

PEVKFNWYVDGVEVHNAKTKPREEQYNSTYRVVSVLTVLHQDWLN

GKEYKCKVSNKALPAPIEKTISKAKGQPREPQVYTLPPSRDELTK

NQVSLTCLVKGFYPSDIAVEWESNGQPENNYKTTPPVLDSDGSFF

LYSKLTVDKSRWQQGNVFSCSVMHEALHNHYTQKSLSLSPGK
```

SEQ ID No. 26: mouse IL 15-RA-Fc
NWIDVRYDLEKIESLIQSIHIDTTLYTDSDFHPSCKVTAMNCFLL
ELQVILHEYSNMTLNETVRNVLYLANSTLSSNKNVAESGCKECEE
LEEKTFTEFLQSFIRIVQMFINTSSGGGSGGGGSGGGGSGGGGSG
GGSLQGTTCPPPVSIEHADIRVKNYSVNSRERYVCNSGFKRKAGT
STLIECVINKNTNVAHWTTPSLKCIRDPSLAHYSPVPTGGGGSEP
KSSDKTHTCPPCPAPELLGGPSVFLFPPKPKDTLMISRTPEVTCV
VVDVSHEDPEVKENWYVDGVEVHNAKTKPREEQYNSTYRVVSVLT
VLHQDWLNGKEYKCKVSNKALPAPIEKTISKAKGQPREPQVYTLP
PSRDELTKNQVSLTCLVKGFYPSDIAVEWESNGQPENNYKTTPPV
LDSDGSFFLYSKLTVDKSRWQQGNVFSCSVMHEALHNHYTQKSLS
LSPGK SEQ ID No. 27: human IL 15-RA-Fc
NWVNVISDLKKIEDLIQSMHIDATLYTESDVHPSCKVTAMKCFLL
ELQVISLESGDASIHDTVENLIILANNSLSSNGNVTESGCKECEE
LEEKNIKEFLQSFVHIVQMFINTSSGGGSGGGGSGGGGSGGGGSG
GGSLQITCPPPMSVEHADIWVKSYSLYSRERYICNSGFKRKAGTS
SLTECVLNKATNVAHWTTPSLKCIRDPALVHQRPAPPGGGGSEPK
SSDKTHTCPPCPAPELLGGPSVFLFPPKPKDTLMISRTPEVTCVV
VDVSHEDPEVKENWYVDGVEVHNAKTKPREEQYNSTYRVVSVLTV
LHQDWLNGKEYKCKVSNKALPAPIEKTISKAKGQPREPQVYTLPP
SRDELTKNQVSLTCLVKGFYPSDIAVEWESNGQPENNYKTTPPVL
DSDGSFFLYSKLTVDKSRWQQGNVFSCSVMHEALHNHYTQKSLSL
SPGK SEQ ID No. 28: mouse RB-L2-IL 15-RA-Fc
AVKNCSHLECFYNSRANVSCMWSHEEALNVTTCHVAKSNLRHWN
KTCELTLVRQASWACNLILGSFPESQSLTSVDLLDINVVCWEEKG
WRRVKTCDFHPFDNLRLVAPHSLQVLHIDTQRCNISWKVSQVSHY
IEPYLEFEARRRLLGHSWEDASVLSLKQRQQWLFLEMLIPSTSYE
VQVRVKAQRNNTGTWSPWSQPLTFRTRPADPMKEGGGGSPVGLIG
GGGGSNWIDVRYDLEKIESLIQSIHIDTTLYTDSDFHPSCKVTAM
NCFLLELQVILHEYSNMTLNETVRNVLYLANSTLSSNKNVAESGC
KECEELEEKTFTEFLQSFIRIVQMFINTSSGGGSGGGGSGGGGSG
GGSGGGSLQGTTCPPPVSIEHADIRVKNYSVNSRERYVCNSGFK
RKAGTSTLIECVINKNTNVAHWTTPSLKCIRDPSLAHYSPVPTGG
GGSEPKSCDKTHTCPPCPAPELLGGPSVFLFPPKPKDQLMISRTP
EVTCVVVDVSHEDPEVKENWYVDGVEVHNAKTKPREEQYNSTYRV
VSVLTVLHQDWLNGKEYKCKVSNKALPAPIEKTISKAKGQPREPQ
VYTLPPSRDELTKNQVSLTCLVKGFYPSDIAVEWESNGQPENNYK
TTPPVLDSDGSFFLYSKLTVDKSRWQQGNVFSCSVLHEALHNHYTQ
KSLSLSPGK SEQ ID No. 29: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGARYR
WLTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 30: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGRIGF
LRTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 31: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGAIGF
LRTAGGGGSNWVNVISDLKKIEDLIQSMHIDATLYTESDVHPSCK
VTAMKCFLLELQVISLESGDASIHDTVENLIILANNSLSSNGNVT -continued
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 32: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGRAMH
MYTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 33: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGAAMH
MYTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 34: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGRSEN
IRTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 35: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGASEN
IRTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 36: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGRPEN

```
IRTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKFNWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK

SEQ ID No. 37: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGAPEN
IRTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGGGG
GSGGGGSGGGSLQITCPPPMSVEHADIWVKSYSLYSRERYICNSG
FKRKAGTSSLTECVLNKATNVAHWTTPSLKCIRDPALVHQRPAPP
GGGGSEPKSSDKTHTCPPCPAPELLGGPSVFLFPPKPKDTLMISR
TPEVTCVVVDVSHEDPEVKENWYVDGVEVHNAKTKPREEQYNSTY
RVVSVLTVLHQDWLNGKEYKCKVSNKALPAPIEKTISKAKGQPRE
PQVYTLPPSRDELTKNQVSLTCLVKGFYPSDIAVEWESNGQPENN
YKTTPPVLDSDGSFFLYSKLTVDKSRWQQGNVFSCSVMHEALHNH
YTQKSLSLSPGK SEQ ID No. 38: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGLISH
SITAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 39: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGNLRS
KLTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKFNWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 40: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
QVRVKPLQGEFTTWSPWSQPLAFRTKPAALGKDTGGGGSSGVFSI
PLTAGGGGSNWVNVISDLKKIEDLIQSMHIDATLYTESDVHPSCK
VTAMKCFLLELQVISLESGDASIHDTVENLIILANNSLSSNGNVT
ESGCKECEELEEKNIKEFLQSFVHIVQMFINTSSGGGSGGGGSGG
GGSGGGGSGGGSLQITCPPPMSVEHADIWVKSYSLYSRERYICNS
GFKRKAGTSSLTECVLNKATNVAHWTTPSLKCIRDPALVHQRPAP
PGGGGSEPKSSDKTHTCPPCPAPELLGGPSVFLFPPKPKDTLMIS
RTPEVTCVVVDVSHEDPEVKENWYVDGVEVHNAKTKPREEQYNST
YRVVSVLTVLHQDWLNGKEYKCKVSNKALPAPIEKTISKAKGQPR
EPQVYTLPPSRDELTKNQVSLTCLVKGFYPSDIAVEWESNGQPEN
NYKTTPPVLDSDGSFFLYSKLTVDKSRWQQGNVFSCSVMHEALHN
HYTQKSLSLSPGK SEQ ID No. 41: human RB-L2-IL15-RA-Fc
AVNGTSQFTCFYNSRANISCVWSQDGALQDTSCQVHAWPDRRRWN
QTCELLPVSQASWACNLILGAPDSQKLTTVDIVTLRVLCREGVRW
RVMAIQDFKPFENLRLMAPISLQVVHVETHRCNISWEISQASHYF
ERHLEFEARTLSPGHTWEEAPLLTLKQKQEWICLETLTPDTQYEF
```

-continued

```
QVRVKPLQGEFTTWSPWSQPLAFRTKPAALGKDTGGGGSSGIKYH

SLTAGGGGSNWVNVISDLKKIEDLIQSMHIDATLYTESDVHPSCK

VTAMKCFLLELQVISLESGDASIHDTVENLIILANNSLSSNGNVT

ESGCKECEELEEKNIKEFLQSFVHIVQMFINTSSGGGSGGGGSGG

GGSGGGGSGGGSLQITCPPPMSVEHADIWVKSYSLYSRERYICNS

GFKRKAGTSSLTECVLNKATNVAHWTTPSLKCIRDPALVHQRPAP

PGGGGSEPKSSDKTHTCPPCPAPELLGGPSVFLFPPKPKDTLMIS

RTPEVTCVVVDVSHEDPEVKENWYVDGVEVHNAKTKPREEQYNST

YRVVSVLTVLHQDWLNGKEYKCKVSNKALPAPIEKTISKAKGQPR

EPQVYTLPPSRDELTKNQVSLTCLVKGFYPSDIAVEWESNGQPEN

NYKTTPPVLDSDGSFFLYSKLTVDKSRWQQGNVFSCSVMHEALHN

HYTQKSLSLSPGK

SEQ ID No. 42: human RB-L1-IL15-RA-Fc
AVNGTSQFTCFYNSRANISCVWSQDGALQDTSCQVHAWPDRRRWN

QTCELLPVSQASWACNLILGAPDSQKLTTVDIVTLRVLCREGVRW

RVMAIQDFKPFENLRLMAPISLQVVHVETHRCNISWEISQASHYF

ERHLEFEARTLSPGHTWEEAPLLTLKQKQEWICLETLTPDTQYEF

QVRVKPLQGEFTTWSPWSQPLAFRTKPAALGKDTGGGGSGGGGSG

GGGSGGGGSNWVNVISDLKKIEDLIQSMHIDATLYTESDVHPSCK

VTAMKCFLLELQVISLESGDASIHDTVENLIILANNSLSSNGNVT

ESGCKECEELEEKNIKEFLQSFVHIVQMFINTSSGGGSGGGGSGG

GGSGGGGSGGGSLQITCPPPMSVEHADIWVKSYSLYSRERYICNS

GFKRKAGTSSLTECVLNKATNVAHWTTPSLKCIRDPALVHQRPAP

PGGGGSEPKSSDKTHTCPPCPAPELLGGPSVFLFPPKPKDTLMIS

RTPEVTCVVVDVSHEDPEVKENWYVDGVEVHNAKTKPREEQYNST

YRVVSVLTVLHQDWLNGKEYKCKVSNKALPAPIEKTISKAKGQPR

EPQVYTLPPSRDELTKNQVSLTCLVKGFYPSDIAVEWESNGQPEN

NYKTTPPVLDSDGSFFLYSKLTVDKSRWQQGNVFSCSVMHEALHN

HYTQKSLSLSPGK
```

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A fusion protein, comprising:
   a first structural unit: a subunit, or a fragment thereof, of interleukin 15 receptor (IL15R);
   a second structural unit: an active interleukin 15 (IL15);
   a third structural unit: an antibody Fc fragment, located at the C-terminus of the fusion protein;
   two first linker segments covalently linking the first, second and third structural units, wherein the second structural unit is located between the first structural unit and the third structural unit;
   a fourth structural unit located at the N-terminus of the first structural unit: an extracellular domain of the IL 15 receptor subunit (RB);
   a linker segment L2 covalently linking the fourth structural unit to the first structural unit,
   wherein the first structural unit is covalently linked to the C-terminus of the fourth structural unit, and
   wherein the linker segment L2 is capable of being recognized and hydrolyzed by a proteolytic enzyme specifically expressed in a tumor microenvironment.

2. The fusion protein of claim 1, wherein the subunit of the IL15R is selected from α subunit, β subunit and γ subunit.

3. The fusion protein of claim 2, wherein the subunit of the IL15R is an α subunit.

4. The fusion protein of claim 1, wherein the fragment is the sushi domain of a subunit of IL15R, with the amino acid sequence set forth in SEQ ID NO. 4.

5. The fusion protein of claim 1, wherein the IL15 is human or murine IL15.

6. The fusion protein of claim 5, wherein the IL15 is mouse IL15.

7. The fusion protein of claim 1, wherein the antibody Fc fragment comprises a human Fc fragment.

8. The fusion protein of claim 1, wherein the first linker segments comprise a multiple of GGGGS (SEQ ID NO:9), or SGGGSGGGGSGGGGSGGGGSGGGSLQ (SEQ ID NO:8), or combinations thereof.

9. The fusion protein of claim 1, wherein the proteolytic enzyme specifically expressed in the tumor microenvironment is a matrix metalloproteinase.

10. A homodimeric or heterodimeric protein, comprising a fusion protein of claim 1.

11. A substantially purified protein of claim 1.

12. A polynucleotide encoding a protein of claim 1.

13. An expression vector comprising the polynucleotide of claim 12.

14. A pharmaceutical composition comprising a protein according to claim 1 and a pharmaceutically acceptable excipient, carrier, or diluent.

15. A method for treating a disease or condition, comprising: administering to a patient in need thereof a therapeutically effective amount of a protein according to claim 1, wherein the disease or condition is selected from hyperplasia, solid tumor or hematopoietic malignancy.

16. A cell line comprising a polynucleotide encoding a protein of claim 1.

17. A method for making a protein, comprising:
    providing an expression vector encoding a protein according to claim 1;
    introducing into a host cell the expression vector;
    culturing the host cell in media under conditions sufficient to express the protein; and
    purifying the protein from the host cell or media.

18. A fusion protein, comprising:
    a first structural unit: a subunit, or a fragment thereof, of interleukin 15 receptor (IL15R);
    a second structural unit: an active IL15;
    a third structural unit: an antibody Fc fragment, located at the C-terminus of the fusion protein;
    two linker segments covalently linking the first, second and third structural units, wherein the first structural unit is located between the second structural unit and the third structural unit;
    a fourth structural unit located at the N-terminus of the fusion protein: an extracellular domain of the IL 15 receptor subunit (RB);
    a linker segment L2 covalently linking the fourth structural unit and the second structural unit;
    wherein the second structural unit is covalently linked to the C-terminus of the fourth structural unit, and
    wherein the linker segment L2 is capable of being recognized and hydrolyzed by a proteolytic enzyme specifically expressed in a tumor microenvironment.

19. The fusion protein of claim 18, wherein the proteolytic enzyme specifically expressed in the tumor microenvironment is a matrix metalloproteinase.

20. A fusion protein, comprising:
    a first structural unit: a subunit, or a fragment thereof, of interleukin 15 receptor (IL15R);
    a second structural unit: an active IL15;

a third structural unit: an antibody Fc fragment;
two first linker segments covalently linking the first, second and third structural units;
a fourth structural unit: an extracellular domain of the IL15 receptor subunit (RB); and
a linker segment L2 covalently linking the fourth structural unit and the second structural unit; and the first structural unit is located between the second structural unit and the third structural unit, and wherein the linker segment L2 is capable of being recognized and hydrolyzed by a proteolytic enzyme specifically expressed in a tumor microenvironment, or
a linker segment L2 covalently linking the fourth structural unit and the first structural unit;
and the second structural unit is located between the first structural unit and the third structural unit, and wherein the linker segment L2 is capable of being recognized and hydrolyzed by a proteolytic enzyme specifically expressed in a tumor microenvironment.

21. The fusion protein of claim 20, wherein the third structural unit is located at the N-terminus of the fusion protein; the fourth structural unit is located at the C-terminus of the first structural unit;
wherein the second structural unit is covalently linked to the N-terminus of the fourth structural unit, or the first structural unit is covalently linked to the N-terminus of the fourth structural unit.

* * * * *